United States Patent [19]

Haddick et al.

[11] 4,433,345
[45] Feb. 21, 1984

[54] VIDEO IMAGE RECORDING METHODS AND DEVICES

[75] Inventors: David H. Haddick, Berkeley; George E. Lyon, San Francisco; David A. Menzimer, Morgan Hill, all of Calif.

[73] Assignee: LogE/Dunn Instruments, Inc., San Francisco, Calif.

[21] Appl. No.: 275,257

[22] Filed: Jun. 19, 1981

[51] Int. Cl.³ ............................................. H04N 5/84
[52] U.S. Cl. ..................................... 358/244; 358/345
[58] Field of Search ..................... 358/244, 244.2, 345, 358/348; 346/110 R; 355/20; 369/124, 125

[56] References Cited

U.S. PATENT DOCUMENTS

| | | | |
|---|---|---|---|
| 3,177,764 | 4/1965 | Akins | 355/20 |
| 3,281,861 | 10/1966 | Simopoulos | 346/110 R |
| 3,400,632 | 9/1968 | Wohli | 355/20 |
| 3,610,119 | 10/1971 | Gerber | 354/4 |
| 3,684,886 | 8/1972 | Muehllegner | 250/105 |
| 3,700,329 | 10/1972 | Mason | 355/20 |
| 3,738,242 | 6/1973 | Lee | 355/68 |
| 3,852,602 | 12/1974 | Gramm | 250/369 |
| 4,027,315 | 5/1977 | Barney | 346/110 R |
| 4,344,699 | 8/1982 | McIntosh | 355/20 |

FOREIGN PATENT DOCUMENTS 2303800 10/1973 Fed. Rep. of Germany ...... 358/244
1585063 2/1981 United Kingdom ................ 358/244

OTHER PUBLICATIONS

Instruction Manual for Model 108F film Recorder.
Log E/Dunn Instruments, Inc. Advertisement.
Nasa Tech. Briefs, Fall 1978, p. 327.
*Softwhere*, Apr.–May, 1981, pp. 1–8.
"Ultrasound Backgrounds" by Gasson, *Radiology Today*, Feb.–Mar. 1980, pp. 24–33.

*Primary Examiner*—Alan Faber
*Attorney, Agent, or Firm*—Pollock, Vande Sande & Priddy

[57] ABSTRACT

Video image recording device for photographically recording video images selected from video input signals on sheets of film, provided with means for reducing or completely eliminating recorded image drift. Recorded image parameter controls are provided which are calibrated in terms of Dunn Density Index numbers, which are related to the densities of the recorded video images. Image polarity inversion control means are provided for the recorded image and for each individual video input signal channel.

20 Claims, 25 Drawing Figures

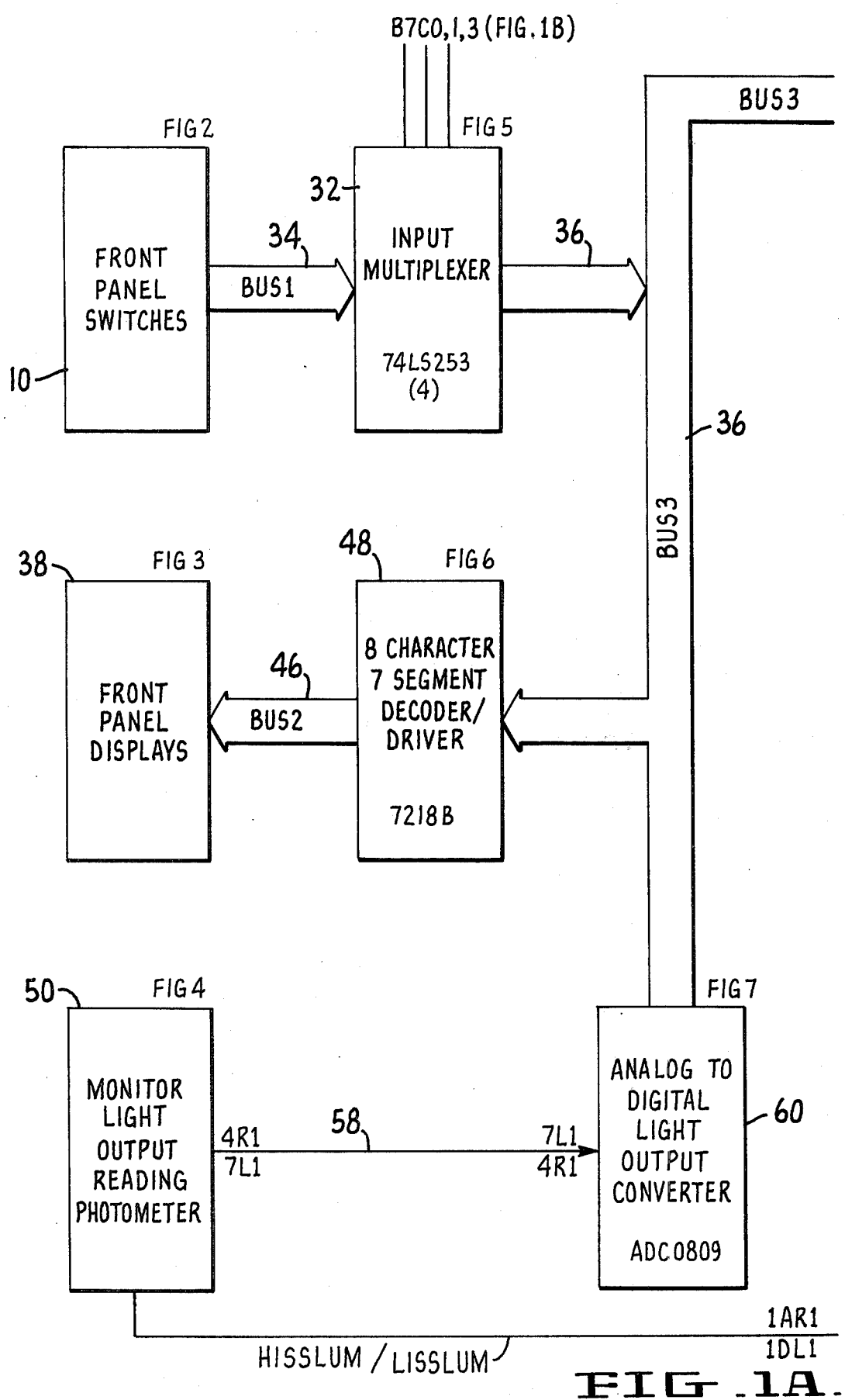

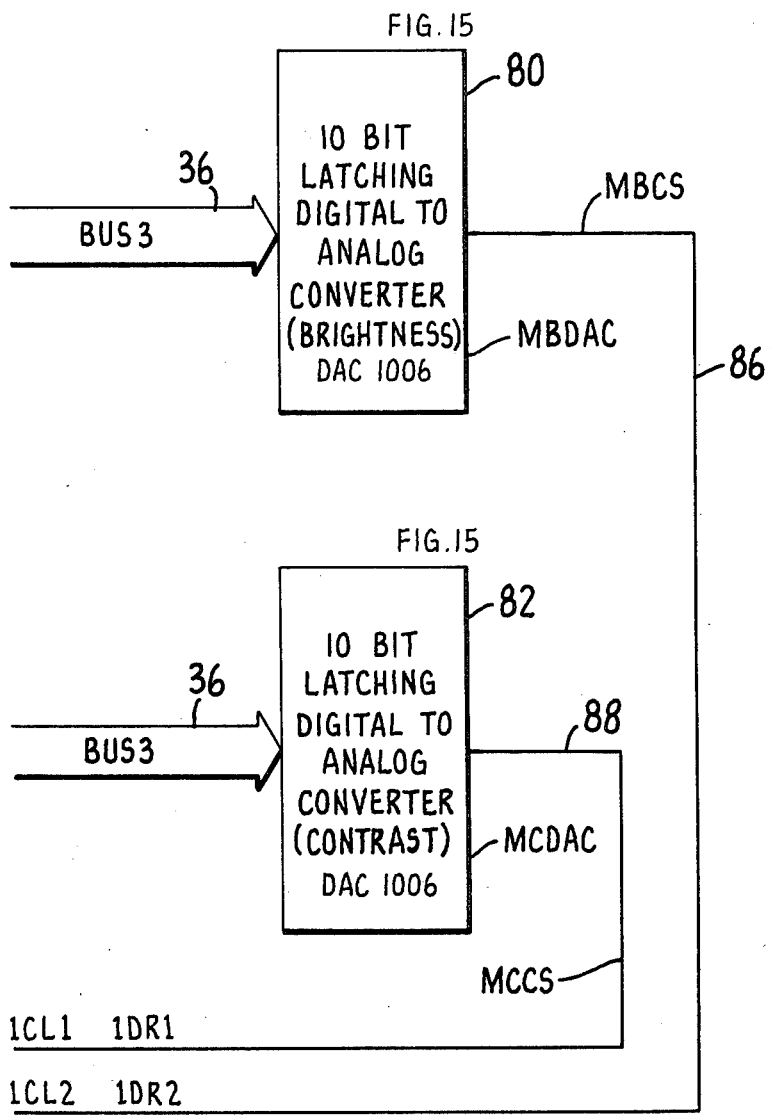
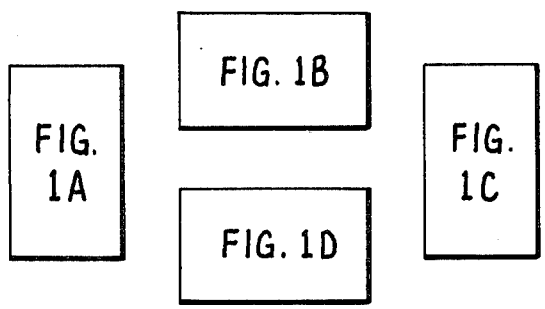
FIG. 1C.

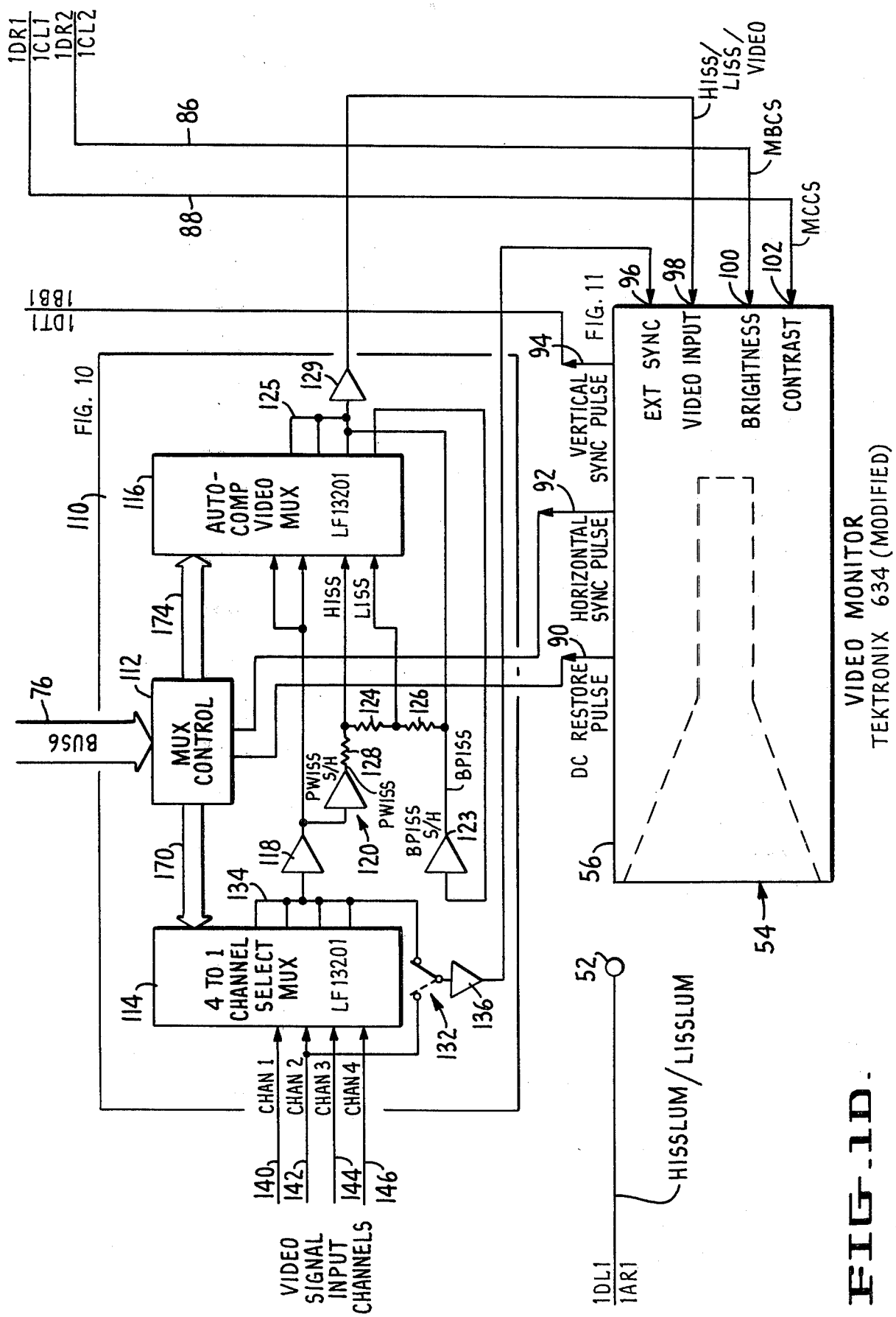

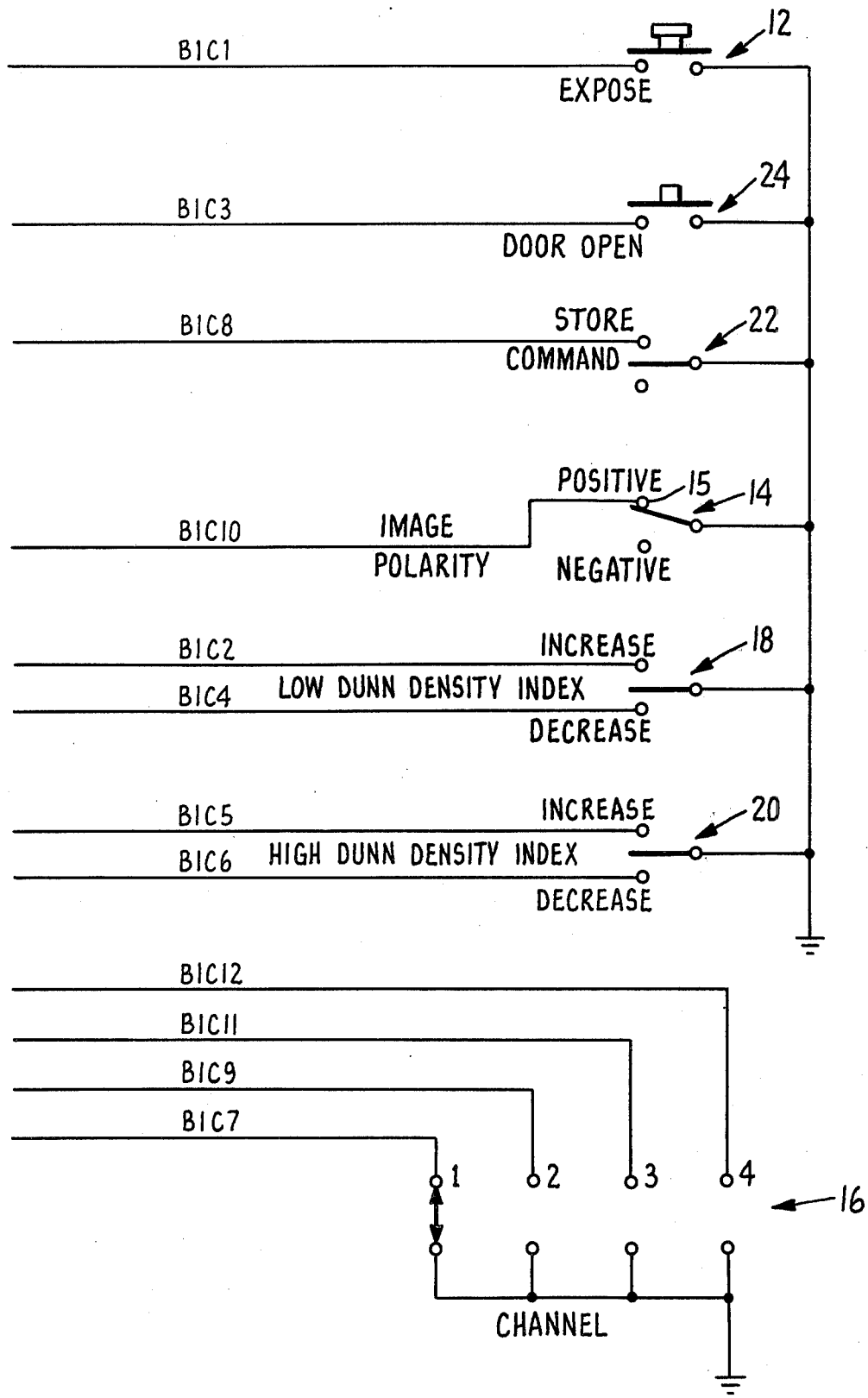
FIG_2.

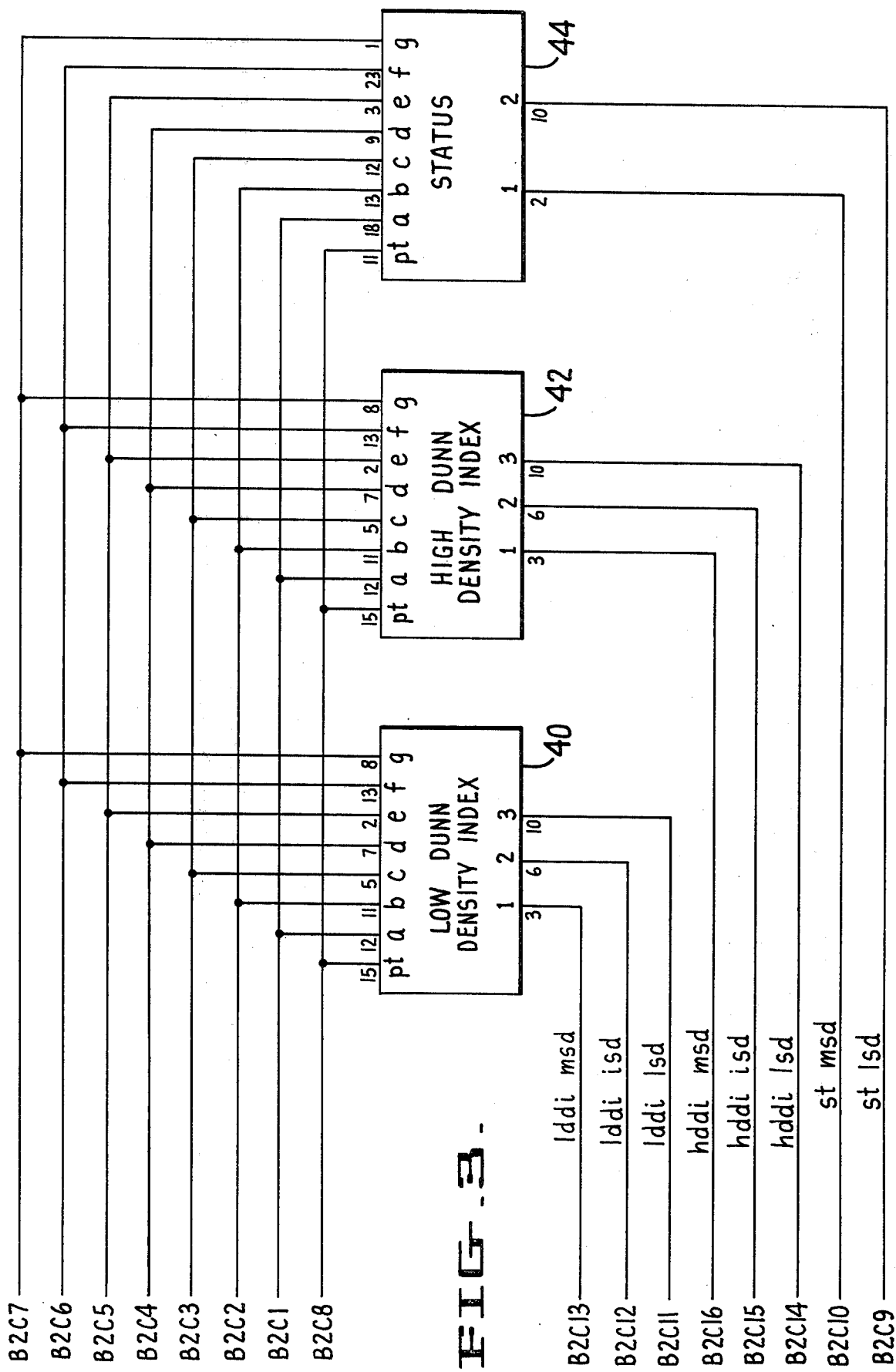

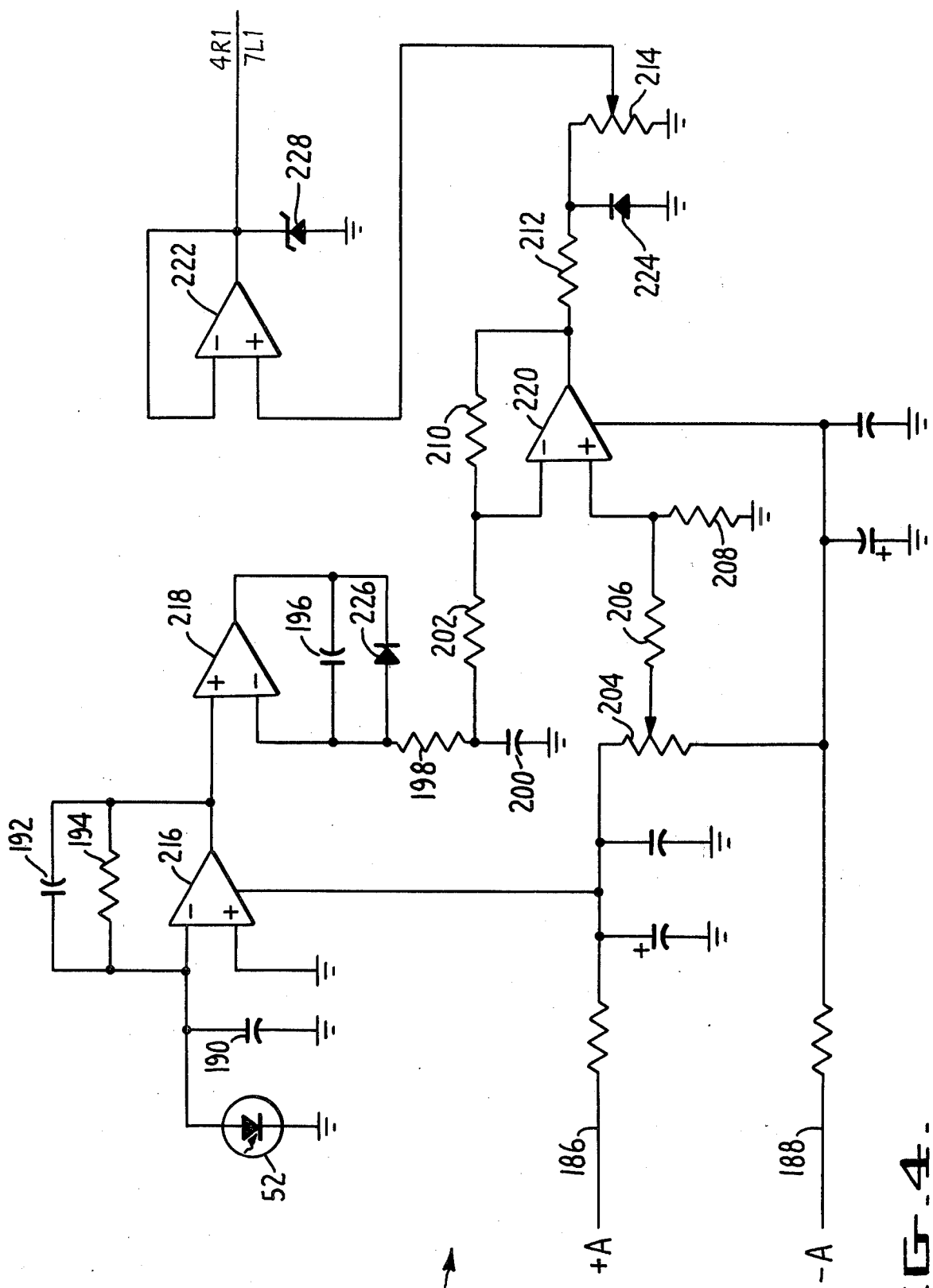

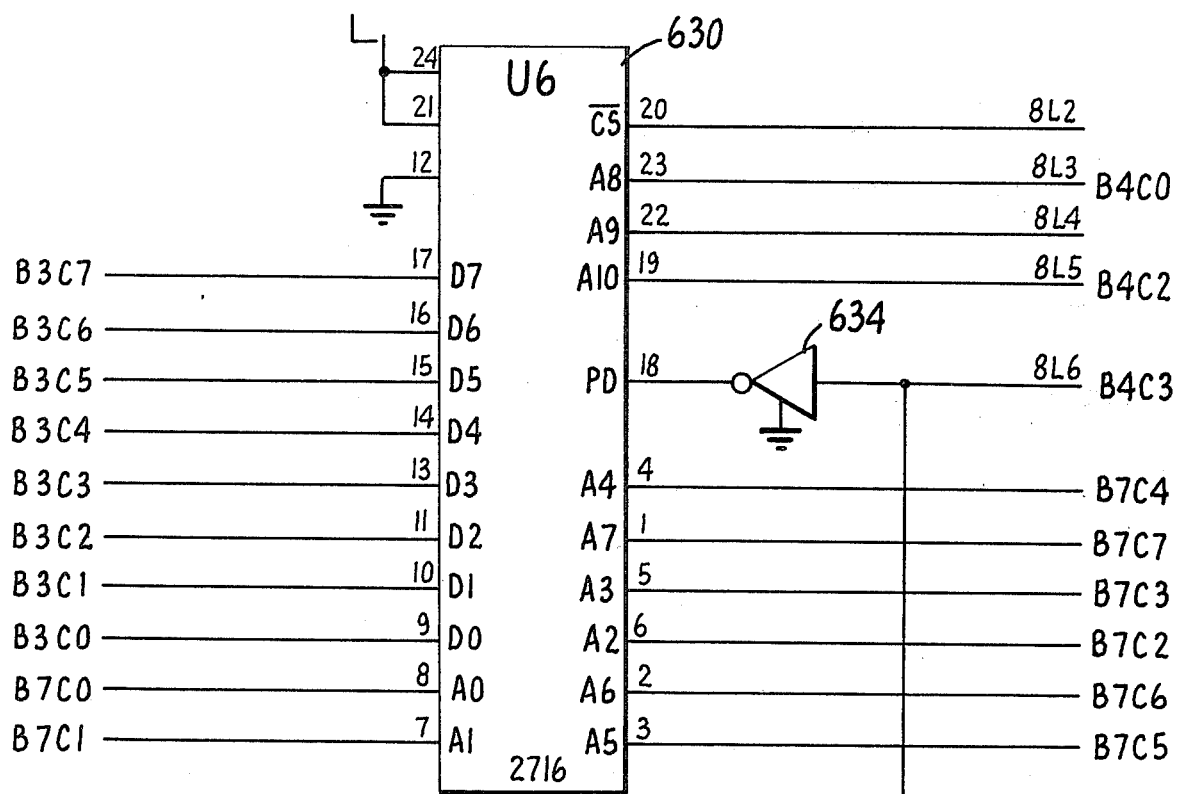
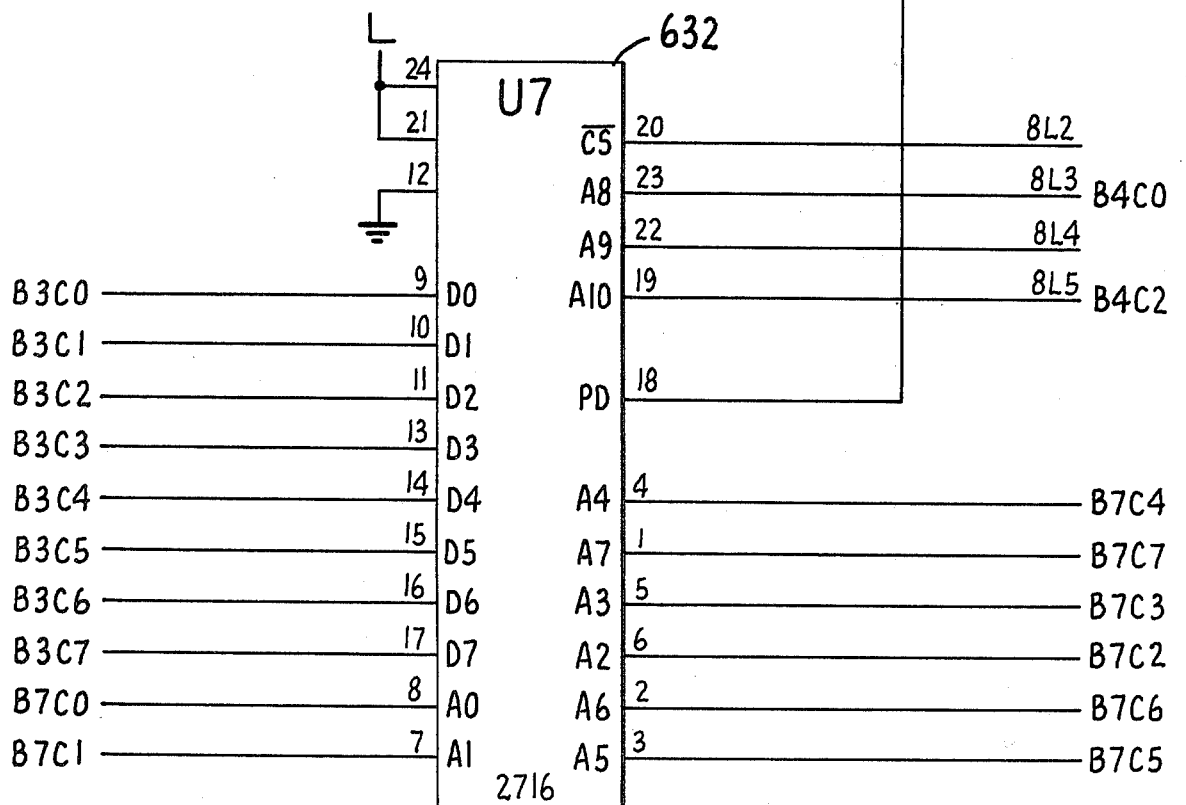
FIG. 12.

VIDEO IMAGE RECORDING METHODS AND DEVICES

BACKGROUND OF THE INVENTION

1. Field of the Invention

The present invention relates to video image recording methods and devices, and more particularly to video image recording apparatus of the type adapted to receive input video signals from host video signal generating devices and to photographically record video images corresponding to selected portions thereof, and the methods executed by such devices and the operators thereof.

2. Description of the Prior Art

Video image recording methods and devices for photographically recording, seriatim, selected pluralities of the images borne by input video signals on x-ray type sheet film or the like in predetermined collocation are known in the prior art. For example, a video image recording device of this type is shown and described in U.S. Pat. No. 4,027,315, issued to Howard Hunter Barney on May 31, 1977.

Such prior art video image recording methods and devices have in general been characterized by the problem of "recorded image drift", i.e., changes over time in the relationship between the density of any particular photographically recorded pixel or image element and the magnitude of the corresponding portion of the input video signal, due to thermal variations in component values, component aging, line voltage fluctuations, and other equipment variables, the control of all of which is not economically feasible.

Prior art video image recording methods and devices have attempted to deal with the recorded image drift problem, e.g., by varying the exposure time, the lens aperture, or the mean light output of the internal monitor in accordance with the brightness of the image produced on the monitor screen by an internally generated, single-valued signal applied to the monitor cathode ray tube control grid, which internally generated signal was not a function of the input video signal.

Further, the image parameter control means of such prior art video image recording devices have in general merely been monitor brightness and contrast controls which in the manner common to broadcast television monitors were uncalibrated.

Some prior art video image recording devices of this type have been provided with simple photometers arranged to "view" part of the monitor screen and externally accessible pushbuttons, automatic devices, or the like for applying a fixed-level, internally generated signal to the monitor cathode ray tube control grid while the photometer output signal is read on an externally viewable meter.

Despite the provision of these expedients, however, the operation of such prior art video image recording devices has involved the carrying out of expensive, time-consuming manual calibration procedures (analogous to the monitor aligning procedures established in European Broadcasting Union technical recommendation E.B.U.R. 23-1980(E) and ASMPTE recommended practice RP71-1977, in the course of which recordings are made at various image parameter control settings and those recordings developed and cross-compared by the human operator to determine which image parameter control settings produce the desired density and photographic contrast in the recorded images.

Related Art

The documents listed immediately below contain information which is or might be considered to be material to the examination of this patent application.

U.S. Pat. No. 3,852,602
U.S. Pat. No. 4,027,315
German Offenlegungsschrift No. 2,303,800
"Ultrasound Backgrounds Black or White?" by Margaret R. Gasson, page 24, et seq., *Radiology Today*, February-March, 1980.

No representation is made that any of the above-listed documents is part of the prior art, or that a search has been made, or that no more pertinent information exists.

SUMMARY OF THE INVENTION

Accordingly, it is an object of the present invention to provide video image recording devices in which the parameters of the image displayed on the screen of the internal monitor are automatically regulated in accordance with characteristics of the input video signal, whereby the need for manual calibration procedures is greatly reduced or completely eliminated.

It is another object of the present invention to provide improved video image recording devices in which the polarity of the image displayed on the internal monitor screen may be reversed by the manipulation of externally accessible manual control means without manually adjusting the externally accessible monitor image control means.

Other objects of the present invention will in part be obvious and will in part appear hereinafter.

The present invention, accordingly, comprises the several steps and the relations of said steps with respect to each other, and the apparatus embodying features of construction, combinations of elements, and arrangements of parts which are adapted to effect the steps of the methods of video image recording disclosed herein, all as exemplified in the following disclosure, and the scope of the present invention will be indicated in the appended claims.

In accordance with a principal feature of the present invention, video image recording devices are provided in which the video brightness and video contrast of the internal monitor display are automatically regulated in accordance with characteristics of the video input signal and the setting of at least one externally accessible video image parameter control.

In accordance with another principal feature of the present invention, video image recording devices are provided in which the video brightness and video contrast of the internal monitor display are automatically regulated in accordance with characteristics of the video input signal and the settings of plural externally accessible video image parameter controls.

In accordance with yet another principal feature of the present invention, video image recording devices are provided in which the video brightness and video contrast of the internal monitor display are regulated in accordance with two values of the same image parameter, each of which is manually settable on a different one of two externally accessible image parameter controls.

In accordance with another principal feature of the present invention, the image signal levels which are applied to the internal monitor control grid to provoke said measured values of the same image parameter are selectable by the user of the video image recording device.

In accordance with an additional principal feature of the present invention, said same image parameter is a parameter of the video image on the screen of the internal monitor and said externally accessible image parameter controls are calibrated in accordance with a photographic parameter of the corresponding recorded images, which photographic parameter itself varies in accordance with said same image parameter.

In accordance with another principal feature of the present invention, said externally accessible image parameter controls are calibrated in terms of an index number called herein the "Dunn Density Index" or "Dunn Number".

In accordance with an additional feature of the present invention, said externally accessible image parameter controls are calibrated in terms of a "High Dunn Density Index" or "HDDI" and a "Low Dunn Density Index" or "LDDI", respectively. The High Dunn Density Index will sometimes be called the "High Dunn Number" or "HDN" herein, and the Low Dunn Density Index will sometimes be called the "Low Dunn Number" or "LDN" herein.

In accordance with yet another principal feature of the present invention, video image recording devices embodying the present invention are also provided with an additional externally accessible control by means of which the polarity of the images displayed on the screen of the internal monitor can be reversed, and the operation of said additional externally accessible control automatically revises the indications on said externally accessible image parameter controls to corresponding values for reverse polarity image conditions.

In accordance with a yet further principal feature of the present invention, certain embodiments of the present invention having said additional externally accessible control means are provided with a plurality of video input channels for receiving different video input signals from different host devices, or duplicate video input signals from the same host device, or both, and a separate image polarity reversal switch is provided for each of said video input channels.

For a fuller understanding of the nature and objects of the present invention, reference should be had to the following detailed description, taken in connection with the accompanying drawings.

BRIEF DESCRIPTION OF THE DRAWINGS

FIGS. 1A through 1D, when juxtaposed in the manner indicated in FIG. 1C, constitute a schematic block diagram of a video image recording device embodying the present invention;

FIGS. 2 through 15 together constitute a circuit diagram of said video image recording device embodying the present invention;

DESCRIPTION OF THE PREFERRED EMBODIMENTS

Glossary

Figure 1B:
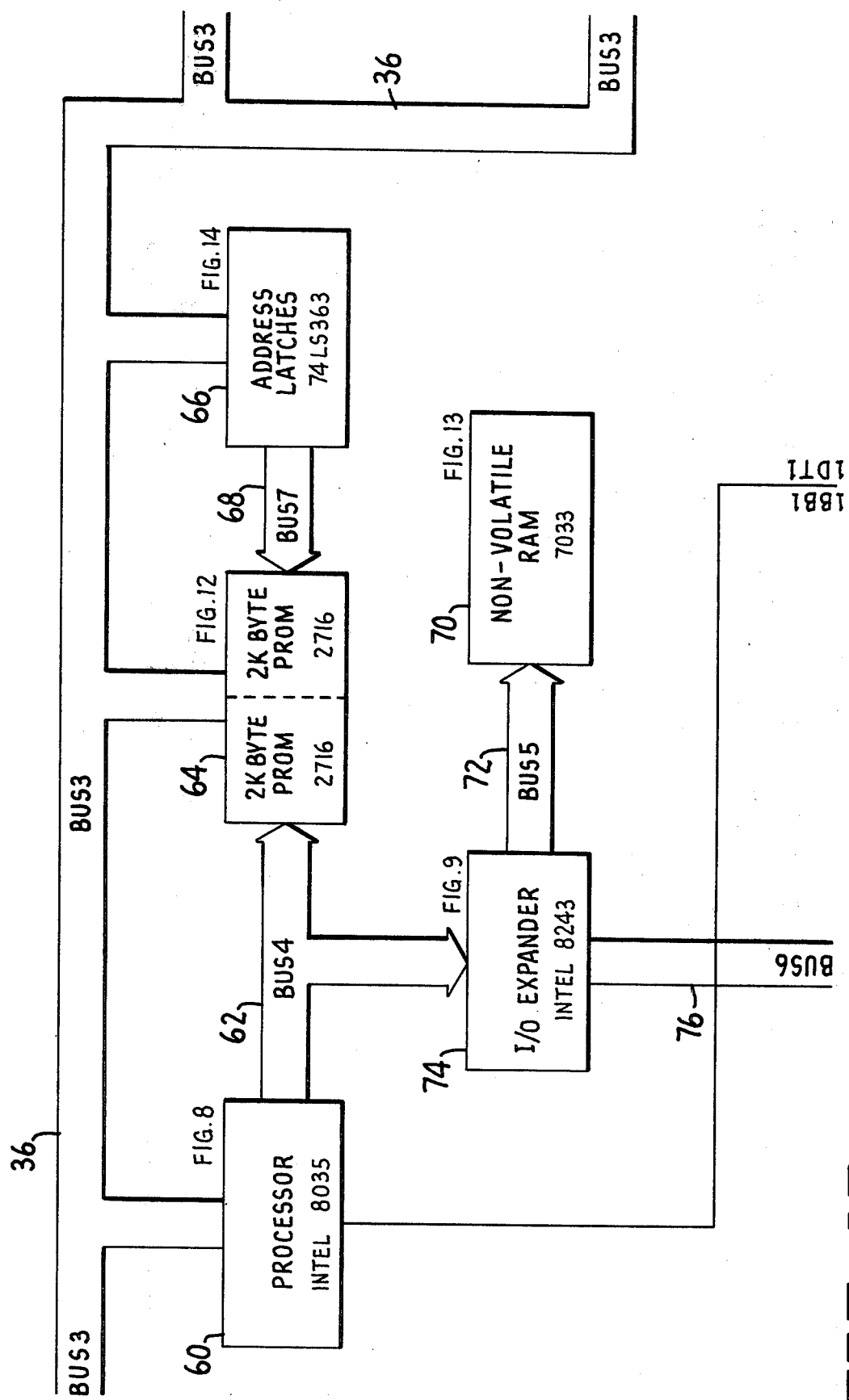

Before discussing the preferred embodiment in detail, it is to be noted that the following terms are used herein in the manner defined below.

The term "video signal" as used herein denotes any signal or group of associated signals capable of exciting a video image recording device embodying the present invention to produce a corresponding video image or video images on the display screen of its internal video image display device.

Thus, the term "video signal" as used herein is not limited to signals or sets of signals carried by a single conductor or carrier wave, or to sets of signals all carried by the same transmission medium.

The term "video signal" as used herein embraces not only video signals of the type found in broadcast and closed-circuit television practice, but also specialized signals or sets of signals of the kind provided by certain host devices known in the prior art, including but not limited to x-y type signals of the kind sometimes produced, e.g., by scinticameras, signals of the kind produced by slow-action or stop-action video systems, including storage vidicon systems, signals of the kind produced by charge-coupled retinas or cameras, storage devices, and the like, and signals of the type produced by polar and vector scan type video systems.

The term "video signal" as used herein is not limited to monochrome signals, but also embraces color video signals, including but not limited to the standard color television broadcast signals comprising luminance signals, chrominance signals, and color burst signals.

The term "format signal" as used herein denotes the part of parts of a video signal which carry information regarding the collocation of the elements of the corresponding video image or images, whether separately defined as pixels or not, and also denotes the part or parts of a video signal which carry information regarding the significance of the magnitude of the signal or signals corresponding to the tone or brightness levels, gray levels, hue levels, and saturation levels of the corresponding video image or images. Thus, format signals, as that term is used herein, include sweep-synchronizing signals, blanking signals, "back porch" signals, and color burst signals.

The term "image signal" as used herein denotes the part or parts of a video signal which carry information regarding the tone or brightness of the individual elements of the corresponding video image, and the hue and saturation of the corresponding video image elements when the corresponding video image is in color, whether or not said elements are separately defined as pixels.

As will now be evident to those having ordinary skill in the art, informed by the present disclosure, the signal or signal set called the "video signal" herein is sometimes called the "composite video signal" by those having ordinary skill in the art, and the signal or signal set called the "image signal" herein is sometimes called the "video signal" by those having ordinary skill in the art. Thus, the terms "video" and "video signal" may sometimes be used to denote a signal or signal set which preferably is called the "image signal" according to the terminology established herein.

While the term "video signal" is used herein in its broadest acceptation, as defined immediately above, it is to be understood that in certain embodiments of the present invention the format of the video input signals preferably conforms to Revision TR-135 of Electronic Industries Association Standard RS-170, which was promulgated by that association in Novenber of 1957. In particular, it is to be preferred in certain embodiments of the present invention that in the video signals processed thereby the reference black level differs from the blanking level by the voltage difference indicated in FIG. 2 of that standard, i.e., that the reference black level differs from the blanking level by 7.5% of Beta plus or minus 2.5% of Beta, where Beta is the voltage difference between the blanking level and the reference white level. This is not to say that devices embodying the present invention cannot be successfully operated with video input signals not conforming to said RS-170 standard, but rather that certain especially convenient and desirable features of the present invention can be relatively easily provided when the video input signals conform to this standard, or at least the part thereof emphasized directly hereinabove.

In accordance with the principles of the present invention, this standard for input video signals to devices embodying the present invention is adopted so that when the reference black level of the standard obtains in the video input signal the developed film density corresponding to the reference black level will be equal to or slightly greater than gross fog plus camera flare, and the first step above black of a uniform ten-step gray scale extending between the black and white levels of the developed film will lie substantially at 0.1 above gross fog.

The term "peak white image signal sample" (PWISS) as used herein denotes a signal corresponding in amplitude to the peak white level of a video signal received by a video image recording device embodying the present invention.

The term "back porch image signal sample" (BPISS) as used herein denotes a signal corresponding in amplitude to the "back porch" level of a video signal received by a video signal recording device embodying the present invention.

The term "low image signal sample" as used herein denotes a signal corresponding in amplitude to the back porch level of a video signal received by a video signal recording device embodying the present invention, augmented by a first predetermined percentage of the difference between the peak white level and the back porch level of that video signal.

The term "high image signal sample" as used herein denotes a signal corresponding in amplitude to the back porch level of a video signal received by a video signal recording device embodying the present invention, augmented by a second predetermined percentage of the difference between the peak white level and the back porch level of that video signal, which second predetermined percentage is greater than said first predetermined percentage.

The term "high image signal sample" will sometimes be designated by the expression "HISS" herein and the term "low image signal sample" will sometimes be designated by the expression "LISS" herein. Said first predetermined percentage will sometimes be called the "LISS level" herein, and said second predetermined percentage will sometimes be called the "HISS level" herein.

The terms "host video signal generating device", "host video device", and "host device" are used synonymously herein to denote any device which provides video signals capable of exciting any video image recording device embodying the present invention to provide corresponding video images on its internal monitor screen. Such host devices include, but are not limited to, medical diagnostic devices such as gamma ray, x-ray, ultrasound, and thermographic imaging cameras. As is well known to those having ordinary skill in the art, the video signals provided by some host devices differ in some ways from standard broadcast television or closed-circuit television video signals, and sometimes do not consist of a single signal, but rather also include one or more auxiliary signals. It is to be understood that the term "video signal" as used herein embraces not only video signals of the type found in broadcast and closed-circuit television practice, but also specialized signals or sets of signals of the kind provided by certain host devices known in the art.

The term "video image" as used herein generally denotes the image produced on the display screen of a video signal monitor or the like when the video signal monitor is excited by means of a corresponding video signal, unless the context indicates otherwise.

The term "video image recording device" as used herein denotes a device adapted to receive one or more input video signals from one or more host video signal generating devices, and to photographically record selected ones of the video images carried thereby.

As the term "image polarity" is used herein, two video images of the same object have the same image polarity if one of them does not appear to be a photonegative of the other, i.e., if the lights and shades or pixel tones of the two video images do not appear to be in inverse order.

As is known to those having ordinary skill in the art, the great majority of host devices, if not all of them, are provided with built-in viewing monitors on which are displayed the video images corresponding to the video signals on the output terminals thereof. Thus, the term "normal image polarity host device" as used herein denotes a host device which when connected to supply its output video signal to a video image recording device embodying the present invention, which has its image polarity switch set to NEG, and its channel image polarity switches open, produces on the internal video monitor screen of that video image recording device video images having the same image polarity as the corresponding images appearing on its own built-in viewing monitor screen. Further, the term "reverse image polarity host device" as used herein denotes a host device which when connected to supply its output video signal to a video image recording device embodying the present invention, which has its image polarity switch set to NEG, produces on the internal video monitor screen of that video image recording device a video image having the opposite image polarity from the video image viewed on its own built-in viewing monitor screen.

INTERCONNECTION CONVENTIONS

The schematic diagram and the circuit diagram of the preferred embodiment of the present invention shown and described in detail herein are both divided between pluralities of different figures of the drawings. The schematic diagram is in FIGS. 1A through 1D. The circuit diagram is in FIGS. 2 through 15.

Each link (i.e., interconnection having negligible impedance) extending between circuit points located in different ones of those figures of the drawings is specified herein by means of the following conventions:

1. From each of such circuit points there extends a lead which terminates adjacent an edge of the figure in which the point lies.

Example: The lead extending from switch 14 to the left-hand edge of FIG. 2.

2. Each figure is assumed to have four of such edges (not shown) which together form a rectangle which is the locus of the ends of all such leads.

3. One of said four edges is arbitrarily designated as the top (or T) edge, and the other three edges are then designated the right-hand (or R), bottom (or B), and left-hand (or L) edges, in clockwise order.

4. Any lead which terminates adjacent an edge of a figure is considered to be, and is called, a terminal of that figure.

5. Each terminal of a figure of the drawings may be uniquely identified by a code designation, sometimes called a "home number", which may be easily deduced from the figure itself if not written adjacent that terminal.

6. Each home number consists of three terms: the first term, the middle (or alphabetic) term, and the third term.

7. The right-hand letter of the alphabetic term of every home number (or the single letter if there is only one letter) at the T-edge of every figure is T. The right-hand letter (or single letter if there is only one letter) of every home number at the R-edge of every figure is R. The right-hand letter of the alphabetic term (or single letter if there is only one letter in the alphabetic term) of the home numbers at the B and L edges are B and L, respectively. When the alphabetic term consists of more than one letter, all the letters of the alphabetic term but the right-hand letter are part of the figure designation.

Example: The home number 1DR1 is located adjacent the uppermost lead extending to the right-hand edge of FIG. 1D.

8. Every home number in each figure has as its first term the numerical part of the designation of that figure. When the alphabetic term is made up of more than one letter, all of the letters except the rightmost letter are part of the figure designation.

9. The third terms of the home numbers at any figure edge are identifying numerals assigned to the terminals at that edge. Along the R and L edges these identifying numerals generally increase in order from the T-edge toward the B-edge. Similarly, the identifying numerals (third terms) of the home numbers along the T and B edges increase in order from the L-edge toward the R-edge.

10. The home numbers of one or more other terminals will be found near certain terminals in the figures of these drawings. These remote terminal home numbers are called "remote numbers: and each serves to indicate the remote terminal to which the terminal adjacent it is linked, i.e., interconnected by an interconnection having negligible impedance. By "terminal adjacent it" in the previous sentence is meant the terminal adjacent to which the remote number is located.

The expression "terminal number" is used when a term generic to both home numbers and remote numbers is required. Specifying more than one link to interconnect any pair of points does not imply that more than one such link is to be used in constructing an embodiment of the invention; the redundant links are specified merely for convenience in circuit tracing and not to indicate necessary structure.

Bus Conductors

In the circuit diagram (FIGS. 2 through 15) bus conductors linking figure terminals of different figures are specified by bus conductor designations of the form B$x$C$y$, where $x$ is the bus number, and $y$ is the conductor number within that bus. A bus conductor designation located adjacent a figure terminal indicates that the designated bus conductor is directly, conductively connected to the circuit point associated with that figure terminal.

Example: As shown in FIG. 2, conductor 10 of bus 1 is connected to terminal 15 of image polarity switch 14.

The Dunn Density Indexes

In order to be able to operate video image recording devices embodying the present invention with maximum efficiency the significance of the Dunn Density Indices must be understood.

The immediate practical application of the Dunn Density Indices arises from the fact that the common logarithm of the High Dunn Density Index/Low Dunn Density Index ratio, or Dunn Ratio, is related to the H & D or characteristic curve of any particular film which may be selected to be used in a video image recording device embodying the present invention in such a way that the operator of that device can readily determine the Dunn Ratio corresponding to any desired maximum and minimum film image density when given the H & D curve of the film.

Given that most monochrome photographic transparency film viewing is known to be facilitated by a density range from 0.1 above gross fog to 2.0, due to the well-known phenomenon of brightness adaptation, it is convenient to denominate these two densities as the High Standard Density of HSD and Low Standard Density or LSD for each particular film which might be used in a video image recording device embodying the present invention, and this nomenclature is adopted herein.

For any particular film, processed in accordance with the processing mode used in preparing a corresponding H & D curve, a pair of Log E values corresponding to the HSD and LSD of that film can be determined from said corresponding curve. These Log E values will be called, respectively, the High Standard Log E or HSLE and the Low Standard Log E or LSLE herein.

Given the HSLE and the LSLE in any particular case, i.e., film and processing mode, the Dunn Radio may easily be determined by subtracting the LSLE from the HSLE and looking up the antilogarithm of the difference in a table of common logarithms. The antilogarithm of the difference, determined as just described, will be the desired value of Dunn Ratio. The conversion of HSLE, LSLE pairs to their corresponding Dunn Ratios may, of course, be carried out by the use of a so-called scientific pocket calculator of well-known type, or by easily provided special tables or nomographs.

The application of the Dunn Ratio of the present invention in the practice of video image recording using video image recording devices embodying the present invention closely parallels the development of the zone system of photography by Weston, Adams, et al. According to that system the photographic subject is analyzed with a light meter to determine its brightness range and appropriate exposure and development adjustments are made in accordance with the brightness range data to fit a selected portion of the light values of the photographic subject into the linear region of the H & D curve of the film on which the photographic subject is to be recorded.

In a somewhat similar but at the same time uniquely different and inventive manner the Dunn Density Index technique of the present invention makes it possible for the operator of a video image recording device embodying the present invention to simply and rapidly adjust the brightness range of the internal video image display device to fit the relatively fixed parameters of exposure and processing dictated by the H & D curve of the film or other photographic medium being employed.

As will be evident to those having ordinary skill in the art, informed by the present disclosure, the Dunn Ratio technique of the present invention is not limited to the employment of the abovedescribed High Standard Densities and Low Standard Densities. Other density pairs may be settled upon and corresponding tables or nomographs supplied, or the operator may determine the Dunn Ratio from the H & D curve of the film (and processing mode) being used and a table of common antilogarithms or a "scientific" pocket calculator. Further, it is to be understood that the incorporation of suitable means for calculating Dunn Ratio in video image recording devices embodying the present invention falls within the scope of the present invention.

The application of the Dunn Ratio technique of the present invention using non-standard density values may be described as follows:

1. The operator examines the H & D curve corresponding to the selected film and processing mode and determines therefrom the desired high and low density values.
2. The operator draws a horizontal line on the H & D curve from each desired density value on the vertical axis to the corresponding point on the H & D curve itself.
3. From the points of intersection of the horizontal lines with the H & D curve the operator draws vertical lines to the horizontal axis, and there reads off the values of Log E corresponding to the desired density values.
4. The operator then subtracts the smaller Log E value just determined from the larger Log E value just determined and finds the common antilogarithm of the resulting difference in a table of common antilogarithms. The common antilogarithm of the difference is the Dunn Ratio corresponding to the density values determined in Step 1.
5. The operator then consults a suitable set of tables, such as may be provided by those having ordinary skill in the art, informed by the present disclosure, and determines therefrom a suitable High Dunn Density Index (HDDI) value, and enters this value into the HDDI indicator on the control panel of the video image recording device of the present invention being employed.
6. The operator then divides the HDDI value just obtained by the Dunn Ratio (DR) obtained in Step 4 and gets, as the quotient, the corresponding LDDI, which he immediately enters into the LDDI indicator on the control panel of the video image recording device of the present invention which is being employed.

As will be evident to those having ordinary skill in the art, it may be necessary in some cases to make a trial exposure and thereafter make minor adjustments in order to achieve the desired photographic density and contrast, because of variations from the ideal experienced in both available films and processor characteristics.

It is to be understood that further adaptation of the Dunn Ratio technique to automatic operation of video image recording devices also lies within the scope of the present invention. For example, it lies within the scope of the present invention to provide a video image recording device with a built-in densitometer and an operating mode wherein the display screen of the internal video image display device is excited to produce a known overall light output. When a film area exposed to the known overall light output is processed in a predetermined processing mode and inserting into said built-in densitometer, the effects of film selection and processing can be correctly determined in the form of an index numbed called the Dunn Film and Processing Index or DFPI, in terms of which said densitometer is calibrated. It is yet further to be understood that the provision of additional operating means and methods to cause the Dunn Indices to be directly entered into their corresponding storage locations in video image recording devices embodying the present invention when a selected film has been exposed to a standard display screen light output, processed, and submitted to the built-in densitometer is within the scope of the present invention.

Figure 17:
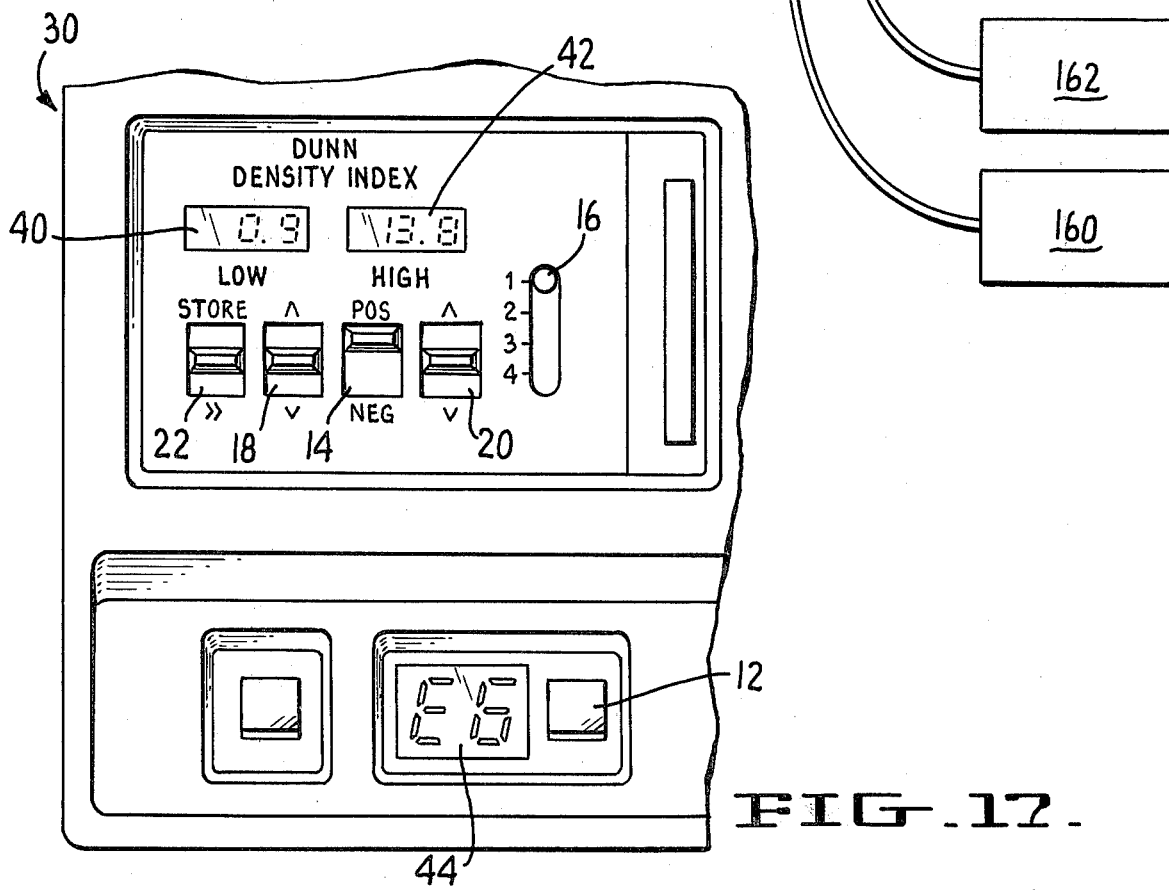
FIG. 17 represents the control panel of said video image recording device embodying the present invention.

In accordance with a preferred method of the present invention for operating video image recording devices embodying the present invention, which devices are provided with LDDI and HDDI indicators similar to indicators 40 and 42 of FIG. 17, and corresponding Dunn Density Index control switches, similar to control switches 18 and 20 of FIG. 17, the operator of this video image recording device prepares the device for recording video images on a particular type of film by (1) selecting the standard Exposure Value (EV) from the following Exposure Value Selection Table in accordance with the existing or selected f-stop and exposure time values set in the device;

| EXPOSURE VALUE SELECTION TABLE | | | | | | |
|---|---|---|---|---|---|---|
| EV | f5.6 | f8 | f11 | f16 | f22 | f32 |
| 6 | ½ | 1 | 2 | — | — | — |
| 7 | ¼ | ½ | 1 | 2 | — | — |
| 8 | ⅛ | ¼ | ½ | 1 | 2 | — |
| 9 | 1/15 | ⅛ | ¼ | ½ | 1 | 2 |
| 10 | 1/30 | 1/15 | ⅛ | ¼ | ½ | 1 |
| 11 | — | 1/30 | 1/15 | ⅛ | ¼ | ½; |

(2) determining from a suitable corresponding H & D or characteristic curve, or from prior experience, the desired maximum density of the developed film; (3) selecting the LDDI and HDDI corresponding to the selected film type and maximum density value from the following Dunn Density Index table;

| Maximum Density | DUNN DENSITY INDEX TABLE | | | | | |
| --- | --- | --- | --- | --- | --- | --- |
| | MRF 31 | NMB/NMC | Ortho-M | MR-1 | GTA | FUJI-US |
| *Exposure Value 6* | | | | | | |
| 2.0 | — | .2/4.0 | — | .2/7.0 | .1/4.0 | — |
| 1.8 | — | — | — | .2/5.6 | .1/3.5 | .1/5.2 |
| 1.6 | — | — | — | .2/4.0 | — | — |
| *Exposure Value 7* | | | | | | |
| 2.0 | .3/5.5 | .4/7.8 | .6/5.2 | .5/13.8 | .2/9.0 | — |
| 1.8 | .3/4.5 | .4/6.8 | .6/4.5 | .5/11.2 | .2/7.0 | .1/10.5 |
| 1.6 | .3/3.5 | .4/5.8 | .6/3.8 | .5/9.0 | .2/5.2 | .1/6.0 |
| *Exposure Value 8* | | | | | | |
| 2.0 | .6/11 | .9/15.5 | 1.2/10.5 | 1.0/27.5 | .5/18 | — |
| 1.8 | .6/9 | .9/13.8 | 1.2/9 | 1.0/22.5 | .5/14 | .3/21 |
| 1.6 | .6/7 | .9/11.5 | 1.2/7.5 | 1.0/18 | .5/10.5 | .3/12 |
| *Exposure Value 9* | | | | | | |
| 2.0 | 1.2/22 | 1.8/31 | 2.4/21 | 2.0/55 | 1.0/36 | — |
| 1.8 | 1.2/18 | 1.8/27.5 | 2.4/18 | 2.0/45 | 1.0/28 | .6/42 |
| 1.6 | 1.2/14 | 1.8/23 | 2.4/15 | 2.0/36 | 1.0/21 | .6/24 |
| *Exposure Value 10* | | | | | | |
| 2.0 | 2.4/44 | 3.6/62 | 4.8/42 | — | 2.0/72 | — |
| 1.8 | 2.4/36 | 3.6/55 | 4.8/36 | 4.0/90 | 2.0/56 | 1.2/84 |
| 1.6 | 2.4/28 | 3.6/46 | 4.8/30 | 4.0/72 | 2.0/42 | 1.2/48 |
| *Exposure Value 11* | | | | | | |
| 2.0 | 4.8/88 | — | 9.6/84 | — | — | — |
| 1.8 | 4.8/72 | — | 9.6/72 | — | — | — |
| 1.6 | 4.8/56 | 6.0/94 | 9.6/60 | — | 4.0/84 | 2.4/96; | and (4) manipulating the LDDI and HDDI control switches of the device to cause the tabulated LDDI and HDDI value to appear on the corresponding LDDI and HDDI indicators of the device.

As an example, entering the preceding table with the film type NMB/NMC, Exposure Value 8, and maximum density 1.8, the corresponding LDDI will be found to be 0.9, and the corresponding HDDI will be found to be 13.8.

It is to be understood that the provision of more extended tabulations of the same type falls within the scope of the present invention. E.g., it is within the scope of the present invention to provide a Dunn Density Index Table like the preceding, except that the tabulated values of maximum density differ by 0.1, rather than 0.2.

It is to be particularly noted that in accordance with the principles underlying this method of the present invention the tabulated LDDI and HDDI values are so selected, empirically, that the corresponding minimum developed film density lies substantially at 0.05 above gross fog.

The data tabulated in the above Dunn Density Index Table were determined under particular conditions of exposure and film processing, viz., exposure of the films in a Dunn Camera Model 627 TLC and processing thereof in a PAKO 14 film processor, using Dupont CRONEX$^R$ MCD chemicals. As will be understood by those having ordinary skill in the art, those data are to be regarded as representative only, and thus will not necessarily apply directly in any particular installation of a video image recording device embodying the present invention. It is believed, however, that those data may be adapted for use in such installations by making a few representative tests for any given film type and accordingly modifying the tabulated values by the application of a simple correction factor.

It is further to be understood that it falls within the scope of the present invention to implement the values of the above Dunn Density Index Table, or any similarly constructed table, in the memory of a particular video image recording device embodying the present invention, and to provide that particular video image recording device with manually settable means (e.g., pushbuttons) corresponding to particular film types, and other manually settable means corresponding to maximum developed film density values, and yet other manually settable means corresponding to exposure value (EV) values, whereby the operator need not consult that table in preparing the device to record video images on films of particular types (indicated on certain ones of said manually settable means).

Schematic Diagram

Referring now to FIGS. 1A through 1D, there is shown a schematic diagram of the preferred embodiment of the present invention, it being understood that some of the conductors shown in these figures are interconnected in accordance with the interconnection conventions defined hereinabove.

It is to be particularly noted that the principal elements or blocks of the schematic diagram of FIGS. 1A through 1D are cross-referenced to the substantially corresponding figures of the detailed circuit drawing of FIGS. 2 through 15 by means of figure numbers located at the upper right-hand corner of each block. Thus, it may be seen from FIG. 1D that the portions of the video monitor 56 of the preferred embodiment which are of particular significance in relation to the invention claimed herein are shown in FIG. 11 of the present drawings.

It is further to be understood that not all of the control bus conductors or control lines which in fact extend between the combinations of circuit elements represented by the blocks of FIGS. 1A through 1D are shown in FIGS. 1A through 1D. Rather, for clearness of illustration, a number of control bus conductors and the like are not represented in FIGS. 1A through 1D, and reference must be had to FIGS. 2 through 15 and the corresponding text of the present specification for a detailed description and showing of these deleted control bus conductors, etc.

For the greatest facility in understanding the schematic diagram of FIGS. 1A through 1D, these figures should be juxtaposed as shown below FIG. 1C.

Referring now to FIG. 1A, it will be seen that the device of the preferred embodiment comprises a plurality of front panel switches, collectively represented by the rectangle or block 10. As also seen in FIG. 1A, the front panel switches represented by block 10 are shown in detail in FIG. 2.

By reference to FIG. 2 it can be seen that these front panel switches include an exposure switch 12, an image polarity selection switch 14, an input channel selection switch 16, a Low Dunn Density Index selection switch 18, and a High Dunn Density Index selection switch 20. As will be explained hereinafter, the switches represented by block 10 also include a store command switch 22 by means of which selected values of High Dunn Density Index and Low Dunn Density Index are entered into corresponding memory locations, and a monitor display screen viewing door safety switch 24 by means of which the film exposing operation of the device of the preferred embodiment is prevented whenever the door which normally covers the monitor display screen viewing port is open.

Figure 5A:
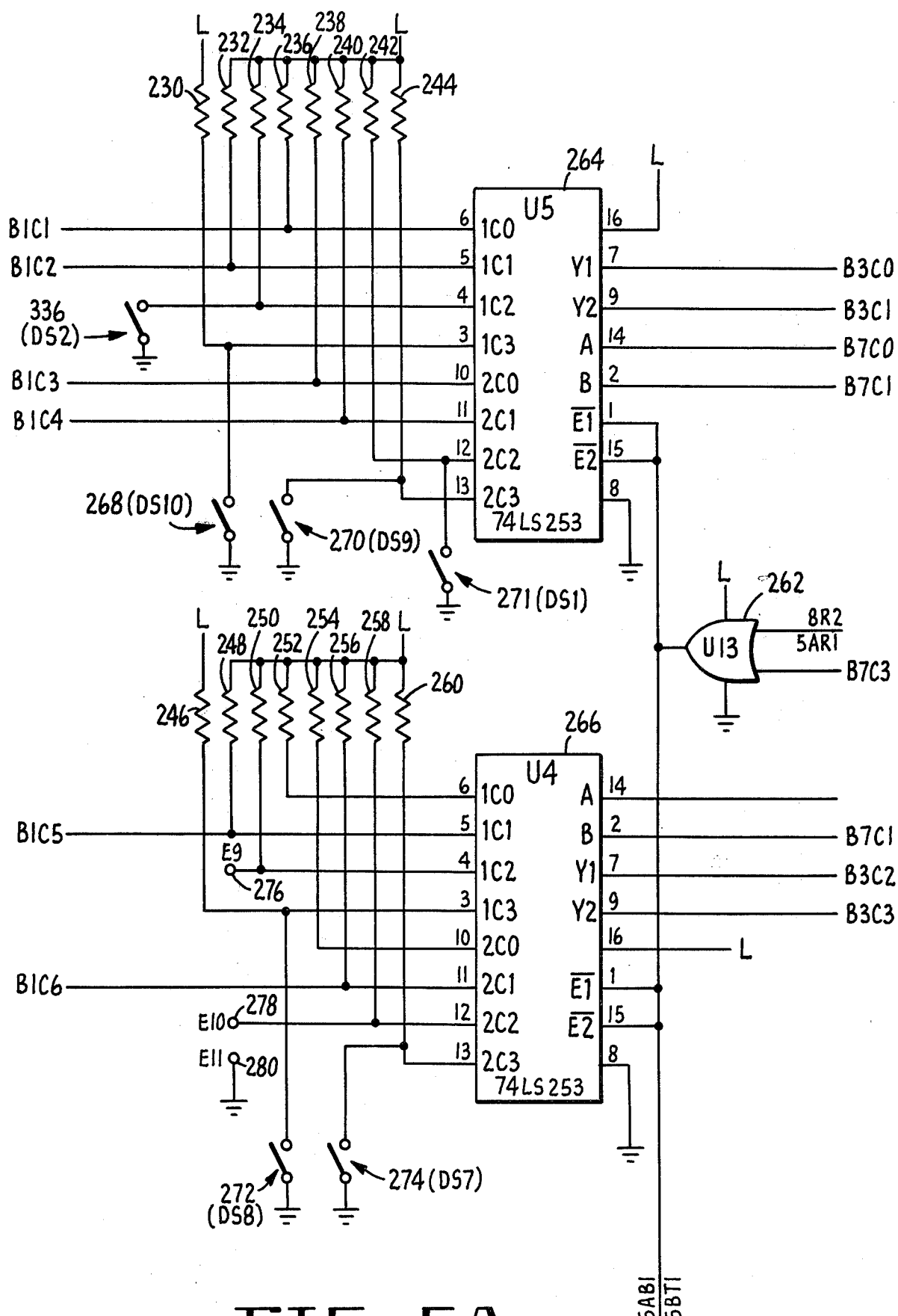
Figure 5B:
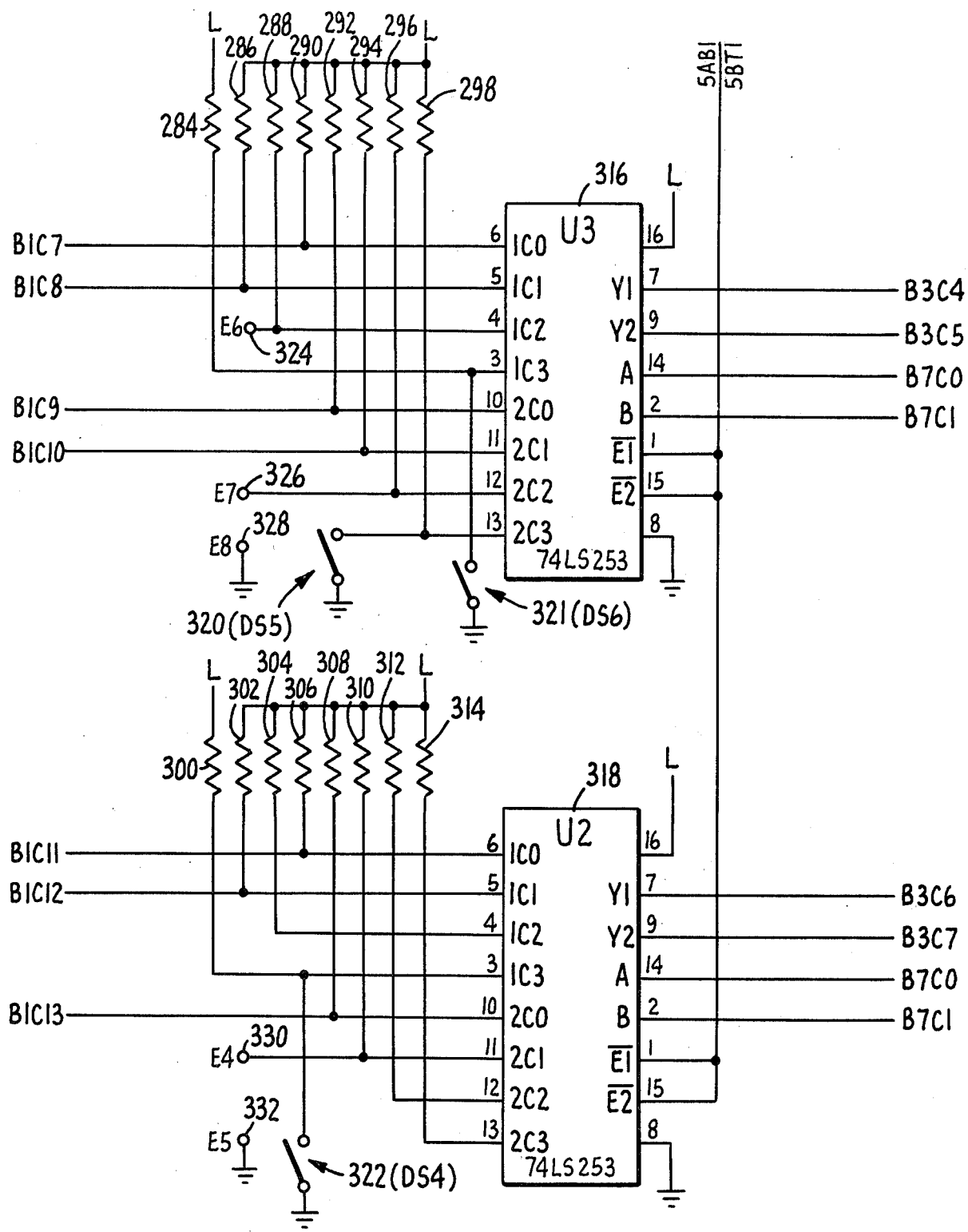

Referring again to FIG. 1A, it will be seen that the front panel switches of block 10 are interconnected with a multiplexer unit represented by block 32, by means of a bus 34. As seen in FIGS. 5A and 5B, the multiplexer unit 32 comprises four integrated circuit multiplexers of the kind identified by the commercial designation 74LS253. Bus 34 will sometimes be referred to herein as "bus 1". Multiplexer unit 32 will sometimes be referred to herein as the "input multiplexer".

As further seen in FIG. 1A, input multiplexer 32 is interconnected with other parts of the circuit of the device 30 of the preferred embodiment by means of conductors 0,1, and 3 of a bus designated herein as "bus 7". (Bus 7 is shown in FIG. 1B.) As also seen in FIG. 1A, input multiplexer 32 is connected to a bus 36, which will sometimes be called "bus 3" herein, and which is the principal data bus of the device 30 of the preferred embodiment.

As also seen in FIG. 1A, the front panel displays of the device 30 of the preferred embodiment are represented by a rectangle or block 38, and the circuit arrangement of the same as shown in FIG. 3. The appearance of the front panel displays as mounted in the front panel of the device 30 of the preferred embodiment is shown in FIG. 17. As seen in FIG. 17, the front panel displays comprise a Low Dunn Density Index (LDDI) display 40 and a High Dunn Density Index (HDDI) display 42. The front panel displays further comprise a status display 44 which indicates certain conditions of operation of the device 30 of the preferred embodiment. For example, the status display 44 as shown in FIG. 17 is indicating that the next exposure made by depressing exposure control 12 will be the sixth exposure remaining on the particular sheet of film which is currently in the device 30.

Figure 6:
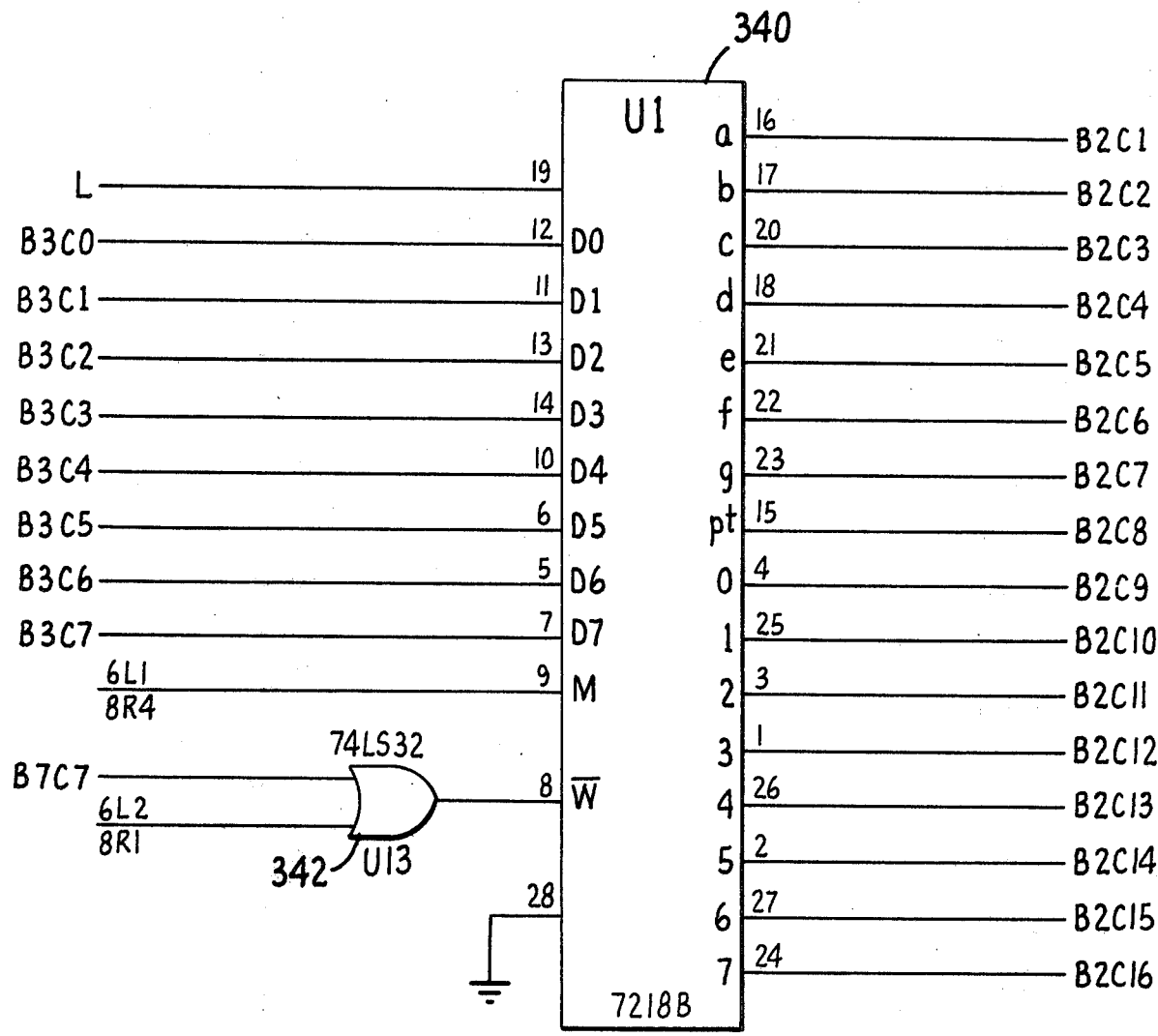

As further seen in FIG. 1A, signals for exciting displays 40, 42, 44 are supplied thereto by means of a bus 46, which will sometimes be called "bus 2" herein. The exciting signals on bus 2 are supplied by an 8 character, 7 segment decoder/driver 48 the circuit of which is shown in FIG. 6. As also seen in FIG. 1A, the signals determining the characters to be displayed by the displays which are under the control of decoder/driver 48 are received by decoder/driver 48 from bus 3. As will be evident to those having an ordinary skill in the microprocessor systems art, informed by the present disclosure, decoder/driver 48 must be supplied with additional signals in order to correctly and completely carry out its functions. As is generally the case of FIGS. 1A through 1D, however, the conductors for supplying these additional control signals, as well as certain necessary exciting or biasing voltages or currents, are not shown, but rather must be determined from the circuit diagram of FIGS. 2 through 15.

Figure 16:
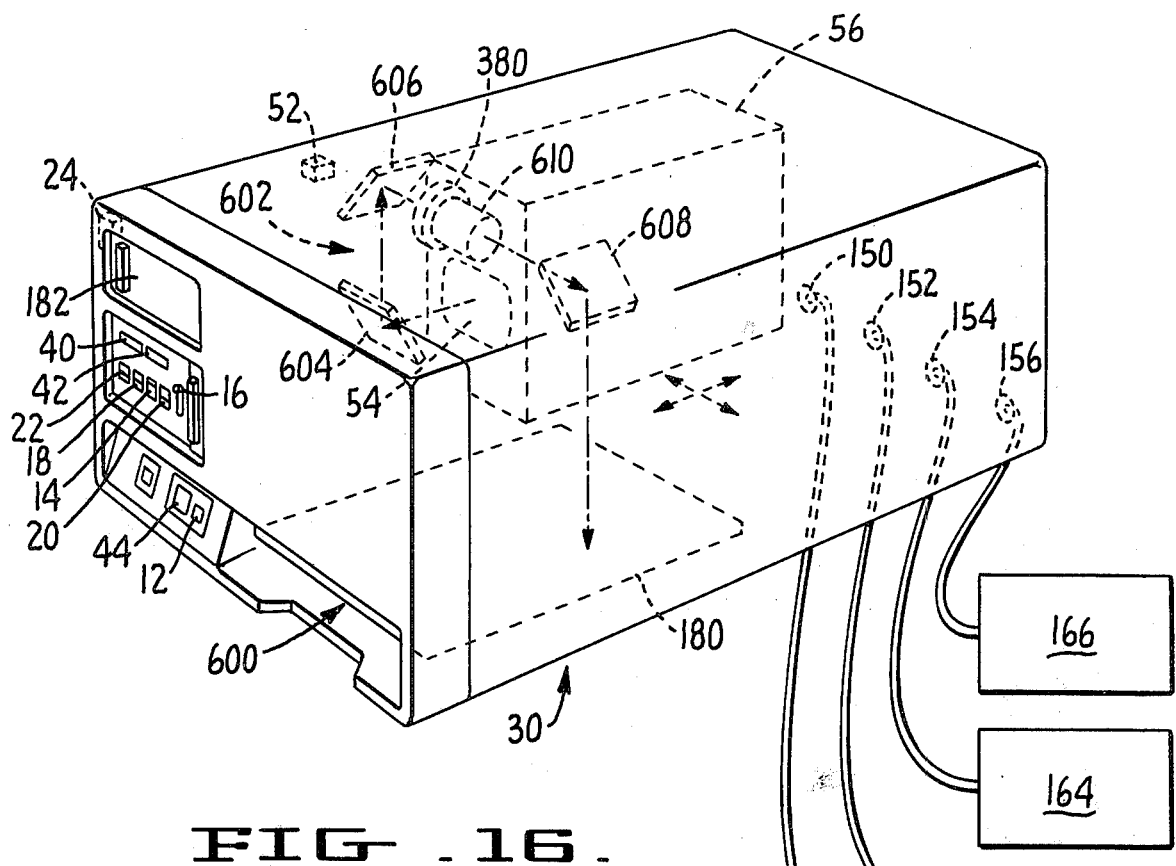
FIG. 16 is a perspective view, partly in phantom, of said video image recording device embodying the present invention.

Also shown in FIG. 1A is the rectangle or block 50 representing the monitor light output reading photometer of the device 30 of the preferred embodiment, the circuit of which is shown in detail in FIG. 4. As seen in FIG. 4, the light-sensing element of photometer 50 is a photodiode 52. As seen in FIG. 16, photodiode 52 is located in the light-tight housing of the video image recording device 30 of the preferred embodiment of the present invention, and is so located as to receive light from the display screen 54 of monitor 56. In accordance with the principles of the present invention, photodiode 52 is so juxtaposed to display screen 54, and so oriented with respect thereto, and so supplied with suitable optical input means, if necessary, that is effective field of view is limited to the central portion of display screen 54. During the manufacture of the device 30 of the preferred embodiment the output voltage of photometer 50 (sheet terminal 4R1) is so calibrated that it substantially matches the output of a standard photometer located on the principal axis perpendicular to the center of display screen 54 under all operating conditions. The calibration process is described in detail hereinbelow in connection with FIG. 4.

Figure 7:
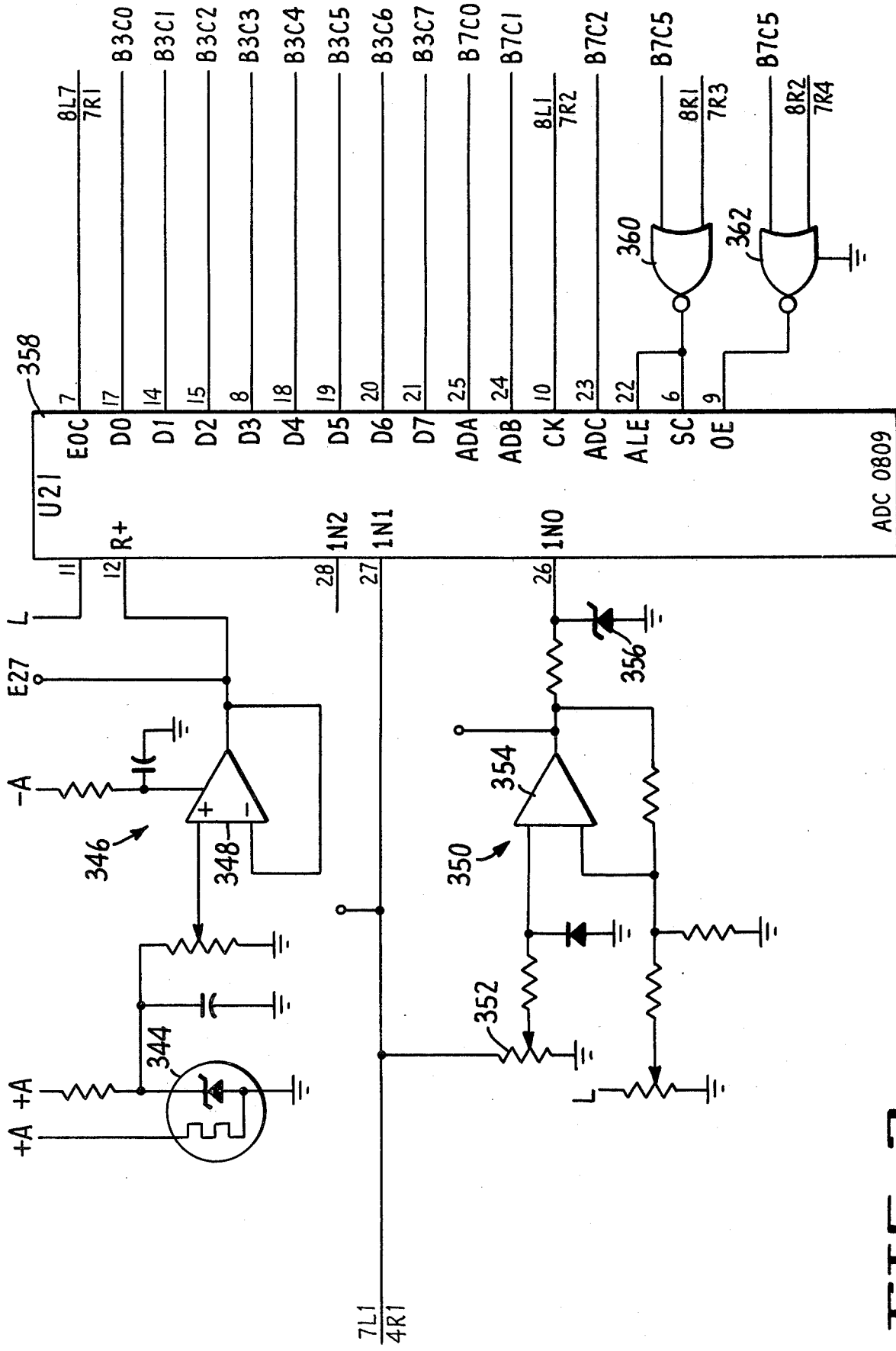

As further seen in FIG. 1A, the display screen light output signal on conductor 58, provided by photometer 50, is supplied directly to an analog signal input terminal of an analog-to-digital converter represented by rectangular or block 60, the circuit of which is shown in FIG. 7, and the output signal set of analog-to-digital converter 60 is applied to bus 3. As explained above, the conductors for certain control signals and supply voltages necessary to the operation of converter 60 are not shown in FIG. 1A, for clarity of disclosure.

Referring now to FIG. 1B, it will be seen that the device 30 of the preferred embodiment comprises a microprocessor 60 which is connected to bus 3 and also to bus 62, which will sometimes be referred to herein as "bus 4". As may be seen by comparing FIGS. 1A and 1D, following the sheet interconnection convention described hereinabove, a signal representing the vertical synchronizing pulses generated in the video monitor of device 30 are supplied to microprocessor 60 via terminal 1BB1 of FIG. 1B. As will be evident to those having ordinary skill in the microprocessor systems art, informed by the present disclosure, microprocessor 60 serves to control and coordinate the operation of the other elements of the device 30 of the preferred embodiment.

Also found in FIG. 1B is the rectangle or block 64 which represents the program memory associated with microprocessor 60. The content of this program memory is set out hereinbelow. As will be evident to those having ordinary skill in the microprocessor systems art, informed by the present disclosure, instructions are read from memory 64, and transmitted to microprocessor 60 or other elements of device 30 via bus 3, in response to the presentation of corresponding address signals thereto, from microprocessor 60 over bus 4 and from the address latches represented by the rectangle or block 66 over bus 68, which is sometimes called "bus 7" herein. In addition to serving the function of holding address signals for selective presentation to memory 64 on bus 7, address latch unit 66 also serves to provide certain control signals (bits) to, e.g., photometer 50, the digital-to-analog converters represented by blocks in FIG. 1C, multiplexer 32, and decoder/driver 48, all by way of conductors which are not shown in the schematic diagram of FIGS. 1A through 1D for clarity of disclosure.

An additional memory unit found in FIG. 1B is represented by the block 70 found therein. Memory (Nitron 7033) unit 70 is a non-volatile memory which serves to store certain data entered into device 30 by means of input switches (internal and external) and thus protect this data against loss due to power line failure, normal shutdown, and like causes. Among said certain data are the High Dunn Density Indices and Low Dunn Density Indices which were previously selected for the respective input channels of devices 30 by means of displays 40 and 42 and switches 14, 16, 18, 20, and 22 (one set of Dunn Density Indices for each display image polarity), and the preselected exposure time for each respective input channel of device 30 (one value for each displayed image polarity). This data is supplied to non-volatile memory 70, and read therefrom, by way of bus 72, which is sometimes called "bus 5" herein. In accordance with the principles of the present invention, data is supplied to non-volatile memory 70, and read therefrom by way of bus 5, the expander represented by rectangle or block 74 of FIG. 1B, and bus 4. The block 74 of FIG. 1B represents, inter alia, an input-output expander of well-known type, (see FIG. 9) which serves to route information derived from microprocessor 60 onto either bus 5 or bus 76, sometimes called "bus 6" herein, and to briefly store the information provided by microprocessor 60, in the well-known manner.

Referring now to FIG. 1C, there are shown rectangles or blocks 80 and 82 representing two ten-bit latching digital-to-analog converters which respectively supply analog control signals to the brightness and contrast control signal terminals of the video monitor 56 of the device 30 of the preferred embodiment, via conductors 86 and 88, respectively. As further seen in FIG. 1C, brightness signal converter 80 and contrast signal converter 82 both receive their input signals from bus 3. As will be evident to those having ordinary skill in the art, informed by the present disclosure, however, the converters 80 and 82 are independently supplied with "chip select" and other control signals of types well-known to those having ordinary skill in the art by means of conductors which are not shown in the schematic diagram, for clarity of disclosure.

Referring now to FIG. 1D, there is shown therein a rectangle or block 56 representing the monitor 56 of the device 30 of the preferred embodiment (see FIG. 16). The photodiode 52 of photometer 50 is also shown in FIG. 1D, juxtaposed to display screen 54 (FIG. 16) in such manner as to be able to provide the monitor display screen light output signals on conductor 58 (FIG. 1A) in the manner described hereinabove. In the device 30 of the preferred embodiment monitor or video image display device 56 is a commercially available monitor known as a Tektronix Model No. 634 Video Monitor, modified in accordance with the teachings of the present invention to provide direct current restore (DCR) pulse signals, horizontal synchronizing pulse signals, and vertical synchronizing pulse signals on respective externally accessible terminals 90, 92, and 94 (FIG. 1D). Terminals 96, 98, 100 and 102 are terminals provided as part of the unmodified Tektronix Model No. 634 Video Monitor for receiving raster synchronizing signals, complete video signals, brightness determining signals, and contrast determining signals, respectively.

Also shown in FIG. 1D is a rectangle or block 110 which represents a circuit sometimes called the "video switching network" or "video switch" herein, which is a particular feature of the present invention.

As further seen in FIG. 1D, video switch 110 comprises a multiplexer control unit 112 which itself controls the operation of two analog multiplexers 114 and 116 of well-known type. Both channel selection multiplexer 114 and Auto-Comp video multiplexer 116 are of the type commercially designated by the reference LF13201 in the device 30 of the preferred embodiment. The circuit of multiplexer control unit 112 is shown in FIG. 10A. It is to be noted, however, that block 114 and 116 each represent only an LF13201 analog multiplexer. The parts of video switch 110 other than multiplexer control unit 112 and its associated buses are shown in detail in FIGS. 10B and 10C. The sub-circuits 118, 120, and 122, and HISS-LISS network 124, 126, 128, found within block 110 are schematically represented only, reference being had to FIGS. 10B and 10C for actual circuit details.

Switch 132 and its associated buffer 136 make it possible, if desired, to supply to terminal 96 of monitor 56 an external synchronizing signal supplied via input channel 2 (142).

As further seen in FIG. 1D, analog multiplexer 114 can receive as separate and independent video input signals, on video input lines 140, 142, 144, and 146, the four video input signals received by the device 30 of the preferred embodiment of the present invention at its respective video input terminals 150, 152, 154, and 156 (FIG. 16). As particularly seen in FIG. 10B, signal lines 140, 142, 144 and 146 are at least in part coaxial lines of well-known type, the outer conductors or shields of which are all connected to the system ground of device 30. Each coaxial line 140, 142, 144 and 146 and its associated coaxial input terminal 150, 152, 154, 156 will sometimes be referred to herein as an "input channel" or "video input channel".

The respective video input channels comprising signal lines 140, 142, 144, and 146 will sometimes be called channels 1, 2, 3, and 4 herein. In the device 30 of the preferred embodiment of the present invention, the video input signal carried by any one of these channels can be selected for recording by video image display device 56 (FIG. 16), or more correctly for the recording of particular parts thereof, by operating switch 16 (FIG. 17) to the corresponding channel number. Thus, the video input signal supplied by video input signal source 160 (FIG. 17) may be selected for recording, or the recording of parts thereof, by the device 30 of the preferred embodiment by operating switch 16 (FIG. 17) to its "1" position; etc.

It is to be particularly noted that the present invention is not limited to the provision of four video input channels in a video image recording device, nor to the connection of a separate video input signal source to each video input channel, as shown in FIG. 16. Thus, while in FIG. 16 each video input terminal 150, 152, 154 156 is shown to be connected to a corresponding separate and independent video input signal source, 160, 162, 164, 166, respectively, it also lies within the teachings of the present invention to, e.g., have no video input signal source connected to terminal 150, but rather to provide for the operation of analog multiplexer 114 in such a way that, e.g., the video input signal supplied by source 162 is selected for recording by device 30 when switch 16 is either in its 1 position or its 2 position.

In general, then, embodiments of the present invention may be provided in which any desired number of desired sets of recorded image parameters, i.e., LDDI, HDDI, and exposure time, can be recalled and applied to the processing of the input video signal received on any one of any desired number of input channels, for either positive or negative film image polarity, as indicated on switch 14.

It is to be understood, however, that in accordance with the teachings of the present invention the operation of analog multiplexer 114 to present the same video input signal for recording at two or more positions of switch 16 does not means that any particular frame or frames of that video input signal will be recorded in exactly the same way irrespective of the position of switch 16. To the contrary, device 30 is so constructed and arranged that the pair of Dunn Density Indices corresponding to position 1 of switch 16 may not be the same as the pair of Dunn Density Indices corresponding to position 2 of switch 16, and thus the density and photographic contrast of the image recorded with switch 16 in position 1 may not be the same as the density and photographic contrast of the image recorded with switch 16 in position 2, even though the video input signal frame or frames from which the position 2 recording is made is substantially identical to the video input signal frame or frames from which the position 1 recording is made.

As pointed out above, memory unit 70 stores certain data, such as Dunn Density Indices and exposure times, for each input channel of device 30. Thus, for example, memory unit 70 has a location HDDI(1) for the storage of the desired HDDI value corresponding to channel 1; a location LDDI(1) for the storage of the desired LDDI value corresponding to channel 1; a location ET(1) for the storage of the desired exposure time value corresponding to channel 1; a location HDDI(3) for the storage of the desired HDDI value corresponding to channel 3; a location ET(2) for the storage of the desired exposure time value corresponding to channel 2; etc.

In accordance with a particular feature of the present invention, the location in memory unit 70 into which a new data value is to be written is selected by means of the channel selection switch, i.e., switch 16 of device 30 (FIG. 17). Thus, when it is desired to change the HDDI value stored in HDDI(3), channel selection switch 16 is placed in its position 3, the desired new HDDI(3) content value is made to appear on display 42 (FIG. 17) by manipulating switch 20 in the manner described hereinabove, and switch 22 is raised to its STORE position, whereupon a new HDDI value, indicated at that time on display 42, is entered into location HDDI(3) of memory unit 70. Similarly, to enter a new value into LDDI(4), switch 16 is set to its position 4, the desired new LDDI value is made to appear on display 40, and switch 22 is raised to its STORE position, whereupon the desired new LDDI value, corresponding to the value indicated on display 40 at that moment, is entered into LDDI(4).

Thus, it will be seen that the recording parameter data stored in the channel 1 locations of memory unit 70 may be entirely different from the recording parameter date stored in the channel 2 locations of memory unit 70, as a result of which the recording made from a given input video signal frame or frames by device 30 when set to select channel 1 may be considerably different from the recording made from the same input video signal frame or frames by device 30 when set to select channel 2.

Further, the stored exposure time value corresponding to any selected input channel may be changed by (1) closing switch 336 (FIG. 5A), which causes the currently stored exposure time value for that channel to appear on indicator 42, expressed in vertical sync intervals of the selected input video signal, (2) manipulating switch 20 to change the indicated exposure time value to the desired new exposure time value, (3) momentarily raising switch 22 to replace the previously stored exposure time value with the newly indicated exposure time value in the corresponding exposure value storage location of memory 70, and then (4) opening switch 336. A desired change in stored exposure time value for the opposite image polarity of the same input channel can be effected by following the same series of steps with image polarity switch 14 in its opposite position.

As will also be seen by those having ordinary skill in the art, informed by the present disclosure, and particularly in view of FIG. 1D, analog multiplexer 114 is controlled, and the the particular video input signal supplied to buffer 118 is selected, by signals impressed on analog multiplexer 114 by multiplexer control unit 112 via bus 170.

The signals applied to multiplexer control unit 112 via bus 6 which bring about the selection of a particular video input channel signal as the input signal to buffer 118 are themselves determined by the position of channel selection switch 16 (FIG. 17), as will be evident to those having ordinary skill in the art, informed by the present disclosure.

Referring again to FIG. 1D, it will be seen that the common output connection 134 of analog multiplexer 114 provides the input signal for buffer 118, which in turn provides the input signal for subcircuit 120. Subcircuit 120 is a sample-and-hold circuit which senses and stores the peak white magnitude of the image signal component of the video signal selected by analog multiplexer 114. The voltage signal (PWISS) corresponding to this peak white magnitude is provided on the output terminal of sample-and-hold subcircuit 120, i.e., at the left-hand terminal of resistor 128, as seen in FIG. 1D.

Subcircuit 120 will sometimes be called the "peak white sample-and-hold circuit" herein.

It is to be particularly understood that in the preferred embodiment of the present invention the values of resistors 124, 126, and 128 are so selected that the HISS level is 95% and the LISS level is 15%, as those terms are defined hereinbelow, and that thus, in the preferred embodiment, the HISS signal voltage will be substantially equal to the peak white voltage of the image signal component of the video signal selected by analog multiplexer 114. In other embodiments of the present invention, however, in which it is desired that the HISS not be equal to the peak white magnitude of the image signal component of the selected video signal (PWISS), the value of resistor 128 will be increased accordingly. Further, it is to be understood that in some embodiments of the present invention resistors 126 and 128 will be variable resistors.

Also shown in FIG. 1D is the sample-and-hold sub-circuit 122 which will sometimes be called the "back-porch-sample-and-hold circuit" herein. Back-porch-sample-and-hold circuit 122 receives as its input the portions of the video signal selected by analog multiplexer 114 which exist during time intervals determined by analog multiplexer 116. These time intervals correspond to the "DC restore" time intervals of the input video signal selected by analog multiplexer 114. Thus, it will be seen by those having ordinary skill in the art, informed by the present disclosure, that back-porch-sample-and-hold circuit 122 senses and stores the "back porch" or "blackest black" level of the image signal component of the video signal selected by analog multiplexer 114. This back porch signal appears on the output terminal 123 of back-porch-sample-and-hold circuit 122.

Since the full amplitude range of the image signal component of the video signal selected by analog multiplexer 114 extends from the peak white voltage level, produced at the output terminal of peak-white-sample-and-hold circuit 120 to the "back porch" voltage level, produced at the output terminal of back-porch-sample-and-hold circuit 122, it follows that the high image signal sample (HISS) and low image signal sample (LISS), as those quantities are defined hereinabove, will be produced at predetermined points of a resistor network connected between the output terminals of subcircuits 120 and 122. Resistors 124, 126, and 128 constitute this network in the device 30 of the preferred embodiment of the present invention. In the device 30 of the preferred embodiment of the present invention the value of the HISS is substantially equal to the peak white level less 5% of the full range of the image signal, and the value of the LISS is substantially equal to the back porch level augmented by 15% of the full range of the image signal.

Referring again to FIG. 1D, it will be seen that the Auto-Comp analog video multiplexer 116 receives as three of its inputs the HISS, the LISS, and the video signal selected by analog multiplexer 114. It will also be seen that the signal on the single output connection 125 of analog multiple 116 is connected to the video input terminal 98 of video monitor 56 via buffer 129. Further, it will be seen in FIG. 1D that the operation of analog multiplexer 116 is controlled by multiplex controller 112 via bus 174. Multiplex controller 112 is itself controlled by signals received from microprocessor 60 (FIG. 1B) via expander 74 (FIG. 1B) over busses 4 and 6.

As will be obvious to those having ordinary skill in the art, informed by the present disclosure, then, the selection of the video input signals supplied to video monitor 156, whether HISS, LISS, or a complete video signal, is controlled by microprocessor 60.

As further seen in FIG. 1D, the synchronizing signal applied to the external synchronizing terminal of monitor 56 is normally derived from the common output connection 134 of analog multiplexer 114, and passed through buffer 136. However, when manually operated switch 132 is operated into its normally open position (dashed), a separate external synchronizing signal may be supplied via video input channel 142.

Referring now to FIG. 2, there are shown the electrical interconnections between the front panel switches (FIG. 17) of the device 30 of the preferred embodiment and the associated terminals of input multiplexer 32 (FIG. 1A), which interconnections are made by way of a bus 1.

Exposure switch 12 (FIGS. 2 and 17) is a normally open, push-to-close switch of well-known type. Manual depression of switch 12 brings about the exposure of a predetermined area of the film cassette 180 in device 30 (FIG. 16).

Monitor display screen viewing door switch 24 (FIGS. 2 and 16) is not a front panel switch, but rather, as seen in FIG. 16, is incorporated into the frame of the monitor display screen viewing door 182 of device 30 in such a position that it is depressed, and thus closed, when and only when monitor display screen viewing door 182 is fully closed. Switch 24 serves, via the circuit, programming, etc., of device 30, to prevent the exposure of any photoplate 180 in device 30 unless monitor display screen viewing door 182 is fully closed.

As also seen in FIG. 2, store command switch 22 (FIG. 17) is a normally open switch the actuator or operating handle of which is normally resiliently maintained in its central (open) position. When the actuator of store command switch 22 is manually raised to its uppermost position, conductor 8 of bus 1 is connected directly to system ground, and the Dunn numbers displayed on displays 40 and 42 are entered into memory unit 70, as explained hereinabove.

As also seen in FIG. 2, the front panel image polarity switch 14 of device 30 (FIG. 17) is a single-pole, double-throw switch the actuator or operating handle of which can be manually placed in an upper position or a lower position. When polarity switch 14 is in its upper or positive image position, conductor 10 of bus 1 is grounded to system ground, the image on display screen 54 (FIG. 16) will be of opposite polarity from the image on the viewing monitor display screen of the host device, and thus any corresponding film image, when developed, will be of the same polarity as the image seen on the host device viewing monitor display screen at the time of exposure. When front panel image polarity switch 14 is in its lower or negative image polarity position and an exposure on the photoplate in cassette 180 is made, the corresponding film image, when developed, will be of opposite polarity from the image on the host device viewing monitor display screen at the time of exposure.

Low Dunn Density Index switch 18 (FIGS. 2 and 17) is a single-pole, double-throw switch the actuator or operating handle of which is spring-biased to normally remain in its central (open switch) position. When switch 18 is manually retained in its uppermost position as seen in FIG. 17, and thus B1C2 is grounded, the numerical value shown on display 40 (FIG. 17) increases until it reaches a predetermined upper limit. When switch 18 is manually retained in its lowermost position as seen in FIG. 17 and thus B1C4 is grounded, the numerical value shown on display 40 (FIG. 17) decreases until it reaches a predetermined lower limit.

High Dunn Density Index switch 20 (FIG. 2) is a single-pole, double-throw switch the actuator or operating handle of which is spring-biased to normally remain in it central (open switch) position. When switch 20 is manually retained in its uppermost position as seen in FIG. 17 and B1C5 is thus grounded, the numerical value shown on display 42 (FIG. 17) increases until it reaches a predetermined upper limit. When switch 20 is manually retained in its lowermost position as seen in FIG. 17 and B1C6 is thus grounded, the numerical value shown on display 42 (FIG. 17) decreases until it reaches a predetermined lower limit.

Channel selection switch 16 (FIGS. 2 and 17) is a manually operable, four-pole slide switch having four active positions each of which corresponds to one of the 5 video input channels of device 30 as indicated by corresponding legends written next to switch 16 on the front panel of device 30 (FIG. 17). As taught elsewhere herein, channel selection switch 16 not only serves to select the channel whose video signal is to be recorded when exposure switch 12 is depressed, but also serves to select the locations in memory unit 70 in which the numerical values displayed on displays 40 and 42 are to be stored when the actuator of store command switch 22 is raised.

Referring now to FIG. 3, there are shown the electrical interconnections between the front panel display means 40, 42, 44 of device 30 (FIG. 17) and the front panel display exciting bus 2 of device 30 (FIG. 1A). Displays 40 and 42 are solid state display devices of the type commercially known by the reference designation NSN3881. Display 44 (FIG. 17) is a solid state display device of the type commercially known by the reference designation NSN781.

Referring now to FIG. 4, there is shown in detail the circuit of the video image display device light output measuring photometer 50 of the device 30 of the preferred embodiment.

As seen in FIG. 4, conductors 186 and 188 are connected to power supplies designated as +A and —A, respectively. The designator +A is to be understood herein to represent the positive terminal of an unregulated 15 volt direct current power supply; and the designator —A is to be understood herein to represent the negative terminal of an unregulated 15 volt direct current power supply. Further, the designator L is to be understood herein to represent the positive terminal of a regulated 5 volt direct current power supply. Referring again to FIG. 4, it is to be understood that in the preferred embodiment of the present invention the following components have the indicated values: capacitor 190, 0.01 microfarads; capacitor 192, 100 picofarads; resistor 194, 2.4 megohms; capacitor 196, 100 picofarads; resistor 198, 1 kilohm; capacitor 200, 0.1 microfarads; resistor 202, 500 kilohms; potentiometer 204, 20 kilohms; resistor 206, 150 kilohms; resistor 208, 1 kilohm; resistor 210, 500 kilohms; and resistor 212, 100 ohms. Photodiode 52 is a Vactec VTS-5076 photodiode. Integrated circuit operational amplifiers 216, 218, 220 and 222 are LM319-type integrated circuit operational amplifiers. Diode 224 is a 1N914 diode, as is diode 226. Zener diode 228 is a 5.6 volt Zener diode.

During the manufacture of devices constructed in accordance with the preferred embodiment of the present invention, potentiometers 204 and 214 are adjusted as follows.

The light output of monitor screen 54 is measured by a Tektronix J-16 digital photometer or its equivalent, using a Tektronix J6523 one degree narrow angle luminance probe. Using a programmed test mode which is available in device 30, the MBDAC and MCDAC (FIG. 15) are set directly, using displays 40 and 42 and switches 18 and 20, and setting DIP SWITCHES 1, 6, 7, 9, and 10 to their ON positions, and all of the other DIP SWITCHES to their OFF positions, so that the monitor light output equals 102.4 foot-lamberts as measured by the Tektronix photometer. (With the DIP SWITCHES set as noted above, the MBDAC setting appears on the indicator 40, and the MCDAC setting appears on the indicator 42.) Potentiometers 204 and 214 are then manipulated until the full scale output of analog-to-digital light output converter 60 (FIG. 1A), i.e., FF in hexadecimal, corresponds to 102.4 foot-lamberts, as read on said J-16 digital photometer. The MBDAC setting is then adjusted until the spot photometer reads 0.4 foot-lamberts. The potentiometer settings are then further adjusted until a reading of 0.1 hexadecimal at the output of converter 60 is obtained. For convenience in using this programmed manual test mode, the output of converter 60 in hexadecimal is displayed on indicator 44 when the DIP SWITCHES are set as indicated above. The above DAC and potentiometer adjustments are reiterated until the converter output of FF in hexadecimal corresponds to a spot photometer reading of 102.4 foot-lamberts and a converter output of 0.1 in hexadecimal corresponds to a spot photometer reading of 0.4 foot-lamberts.

Referring now to FIG. 5A, it is to be understood that all of the resistors 230 through 244 and 246 through 260 are 4.7 kilohm resistors. Gate 262 is a 74LS32 integrated circuit gate. Integrated circuits 264 and 260 are 74LS253 integrated circuits. Switch 268, which is denoted as DIP SWITCH 10 in the computer program listing portion of the present specification, is the internal channel image polarity switch for input channel 4 of device 30. As indicated in the computer program listing portion of the present specification, page 1, any input video signal carried by channel 4 is reversed in image polarity when switch 268 (DIP SWITCH 10) is ON, i.e., closed.

Similarly, switch 270 is the internal channel image polarity switch for input video channel 3; switch 272 is the internal channel image polarity switch for input video channel 2; and switch 274 is the internal channel image polarity switch for input video channel 1.

The parenthetical expression following certain switch reference numerals in the drawings indicates their corresponding denotations in the program listing, e.g. 268(DS 10) indicates that dip switch 268 is also called DIP SWITCH 10.

Terminals 276, 278, and 280 shown in FIG. 5A are denoted in the computer program listing portion of the present specification as E9, E10, and E11, respectively. See page 1, lines 32 through 34. As there taught, the number of exposures made on any photoplate in device 30 can be predetermined by the proper strapping of these terminals.

Referring now to FIG. 5B, it is to be understood that all of the resistors 284 through 314 are 4.7 kilohm resistors. Integrated circuits 316 and 310 are 74LS253 integrated circuits.

Switch 320, which is denoted as DIP SWITCH 5 in the computer program listing portion of the present specification serves when closed to disenable the tracking mode of the Auto-Comp program function of device 30.

Switch 322, which is denoted as DIP SWITCH 4 in the computer program listing portion of the present specification, page 1, serves to prevent the operation of the Auto-Comp portion of the program of device 30 when closed.

Exposure control terminals 324, 326, 328, 330 and 332, also respectively denoted as E6, E7, E8, E4, and E5, are referred to in the computer program listing portion of the present specification, where the result of strapping, i.e., directly, conductively connecting certain ones of them is explained.

Further, switch 336 (FIG. 5A), also called DIP SWITCH 2, makes it possible to change the exposure time values stored in Nitron 70, one of each image polarity of each input channel. When switch 336 is closed the stored exposure time value for the then selected input channel (switch 16) and image polarity (switch 14) is displayed on LDDI indicator 40. This value can be changed to a new, desired value by manipulation of switch 18, and this new value can be made to replace the previous stored value by raising the handle of switch 22 to its STORE position. In this mode, indicator 40 reads from 1 to 128 in vertical video synchronizing pulse intervals.

Referring now to FIG. 6, it is to be understood that in the preferred embodiment of the present invention integrated circuit 340 is a type 7218B eight-character, seven-segment decoder/driver circuit, and the OR gate 342 is an integrated circuit gate of the kind commercially designated as 74LS32.

Referring now to FIG. 7, it is to be understood that in the preferred embodiment of the present invention circuit component 344 is a temperature controlled reference diode of the kind referred to by the commercial designation LM399Z.

Amplifier 346 is a unity gain amplifier, and the selection of suitable values for the components thereof is within the scope of one having ordinary skill in the art, informed by the present disclosure. Operational amplifier 348 is a type LF347 integrated circuit operational amplifier.

The gain of amplifier 350 is adjustable by means of potentiometer 352, which during the manufacture of device 30 is adjusted so that the gain of amplifier 350 is 10. The selection of suitable values of the components of amplifier 350 lies within the scope of those having ordinary skill in the art, informed by the present disclosure. Operational amplifier 354 is a type LF347 integrated circuit operational amplifier.

Zener diode 356 is a type 1N4732 Zener diode.

In accordance with a particular feature of the present invention, a sample of the line voltage supplied to device 30, suitably proportionally reduced, is applied to pin 28 of integrated circuit 358, and thus device 30 is rendered inoperative whenever the line voltage supplied thereto is too low to permit the production of video images which conform to the video image quality standards for the realization of which device 30 was designed.

Gates 360 and 362 are commercially available integrated circuit gates.

Figure 8:
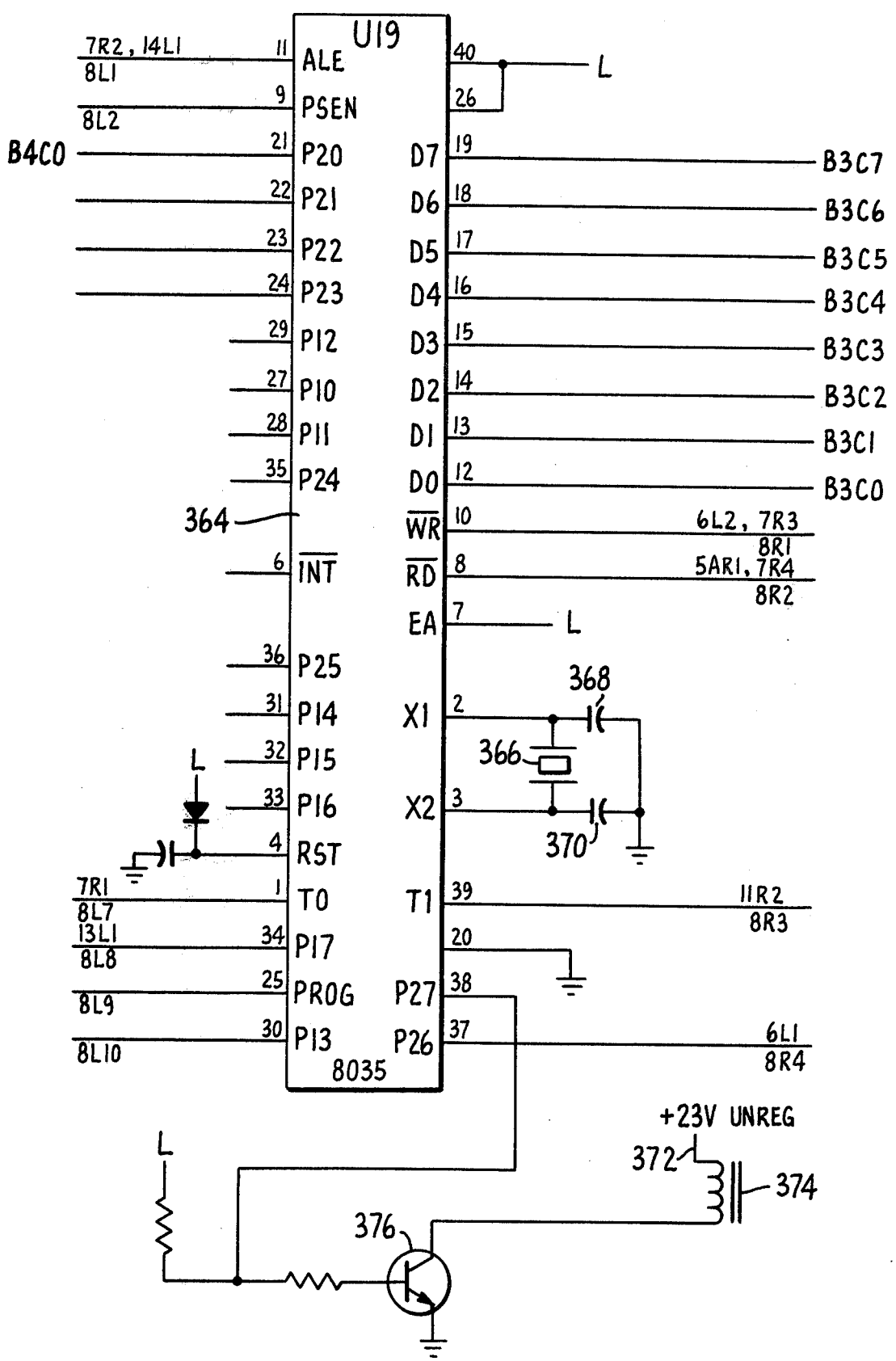

Referring now to FIG. 8, it is to be noted that integrated circuit 364 is a type 8035 microprocessor integrated circuit.

Crystal 366 is a 6 megahertz crystal, and capacitors 368 and 370 are 20 picofarad capacitors. The upper terminal 372 of the coil of solenoid 374 is connected to the positive terminal of a 23 volt, unregulated direct current power supply (not shown). Solenoid 374 serves to operate the mechanical shutter which is a feature of the present invention embodied in device 30. Solenoid 374 opens said mechanical shutter when it is energized via transistor 376. Said mechanical shutter is shown in FIG. 16, and there identified by the reference number 380.

Figure 9:
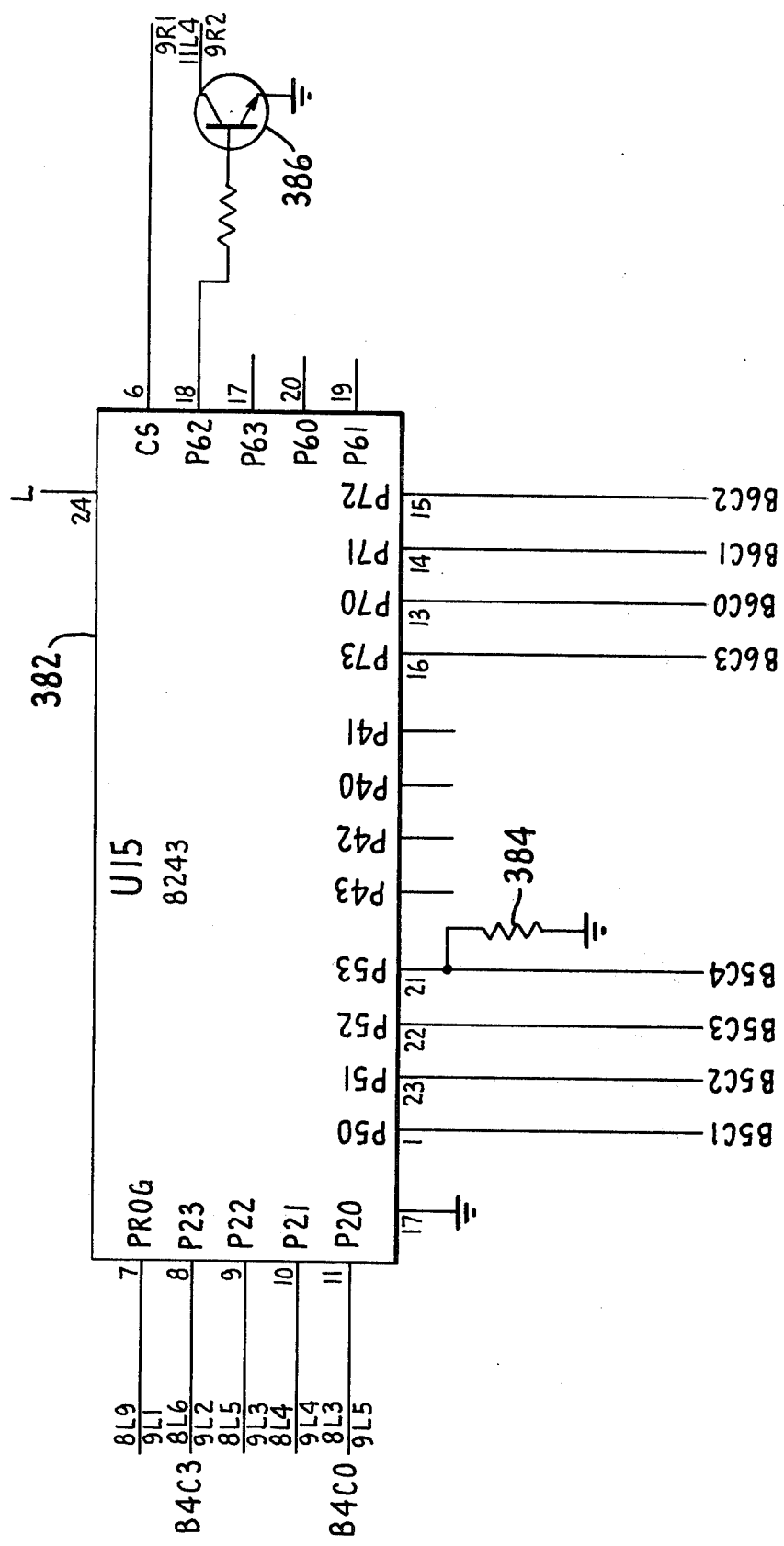
Figure 10A:
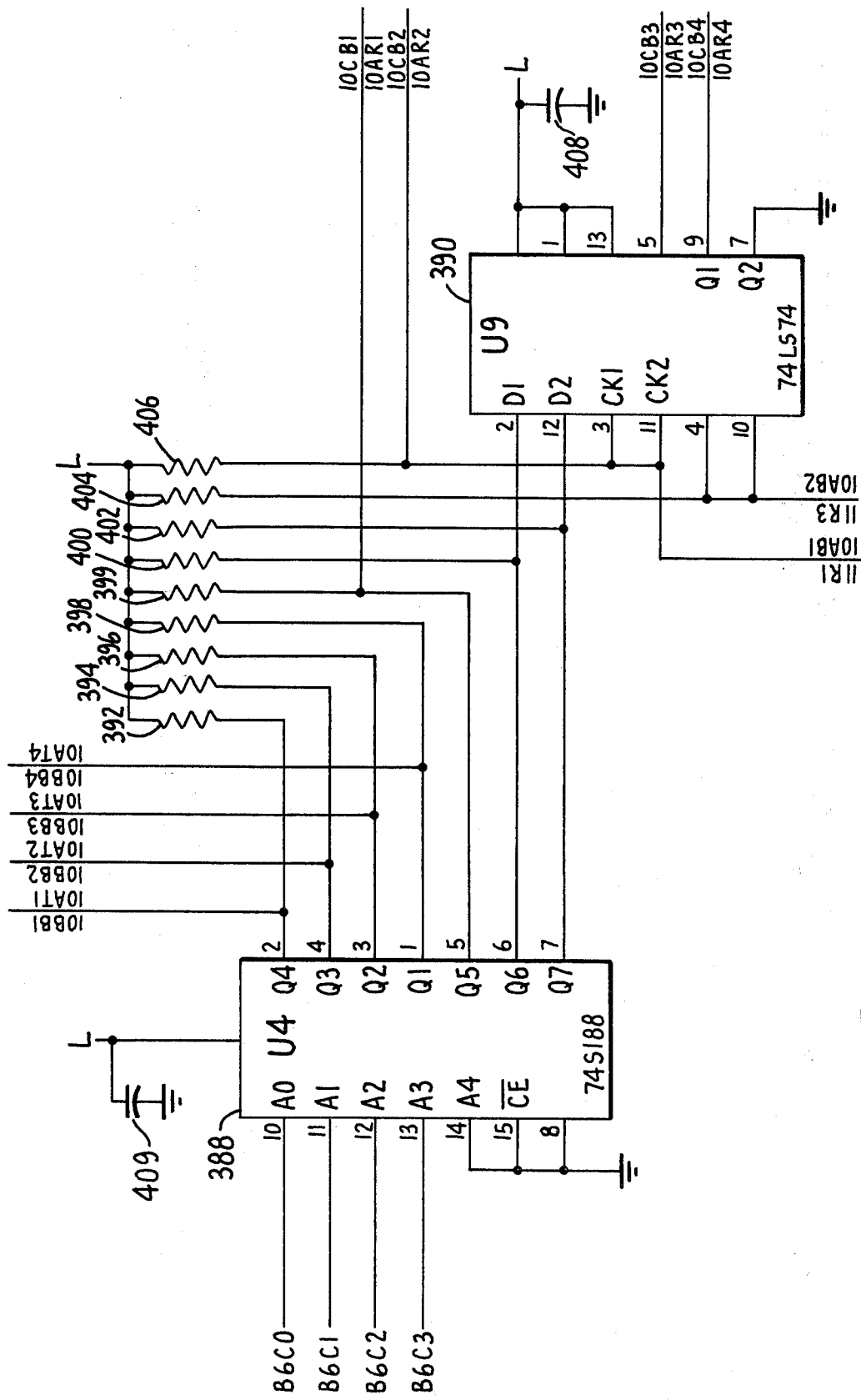

Referring now to FIG. 9, it is to be understood that integrated circuit 382 is an Intel type 8243 I/O Expander integrated circuit. Resistor 384 is a 100 kilohm resistor.

Referring now to FIG. 10A, it is to be understood that integrated circuit 388 is a type 74S188 integrated circuit, and that integrated circuit 390 is a type 74LS74 integrated circuit. Resistors 392 through 406 are all 4.7 kilohm resistors. Capacitors 408 and 409 are 0.1 microfarad capacitors.

Figure 10B:
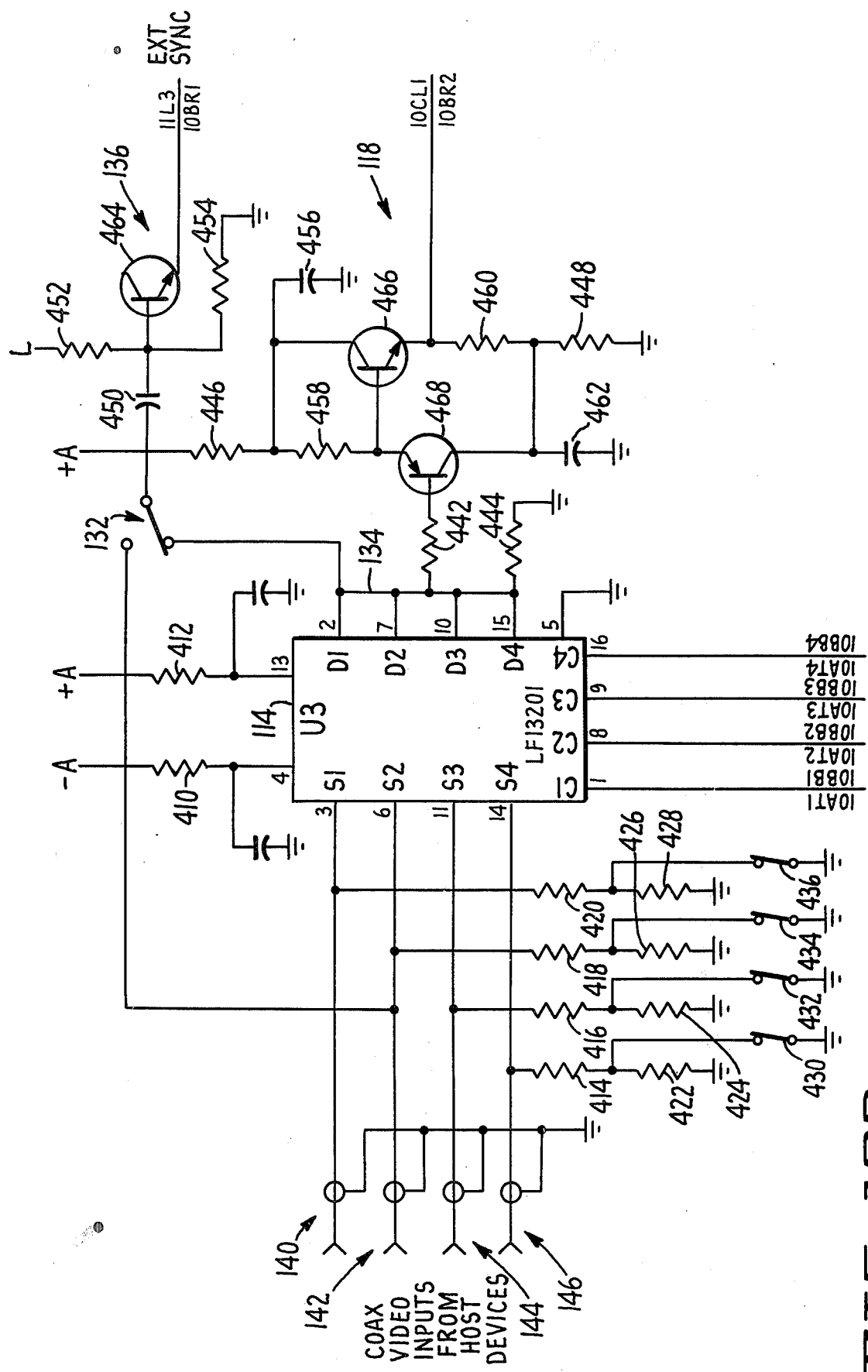
Figure 11:
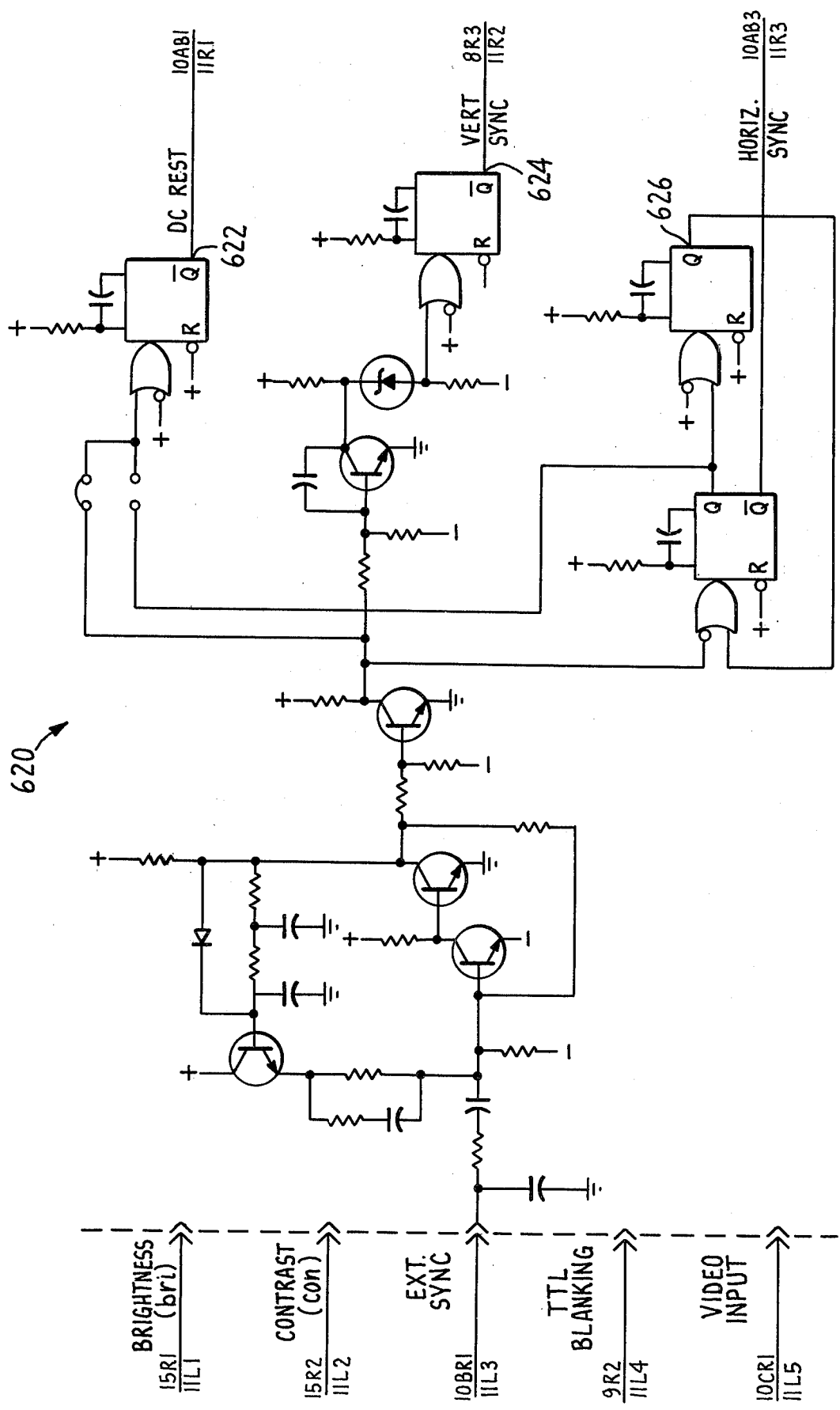

Referring now to FIG. 10B, it is to be understood that resistors 410 and 412 are 100 ohm resistors, that resistors 414 through 420 are 75 ohm resistors, and that resistors 422 through 428 are 4.7 kilohm bleeder resistors.

Manually operable switches 430 through 436 serve to individually shunt the bleeder resistors 422 through 428, respectively. Thus, it will be seen those having ordinary skill in the art, informed by the present disclosure, that video input line 146 may be terminated in a large impedance, ca. 4800 ohms, or in a characteristic impedance, i.e., 75 ohms, depending upon the position (open or closed) of switch 430. Each of the other switches 432 through 436 serves to provide the same choice of line termination impedances for an associated video input line, i.e., lines 144, 142, and 140, respectively.

As noted in FIG. 10B, integrated circuit 114 is an LF13201 analog multiplexer integrated circuit.

As further seen in FIG. 10B, resistors 442, 444, 446, and 448 are all 100 ohm resistors, and conductor 134 interconnects pins 2, 7, 10 and 15 of multiplexer 114. Capacitor 450 is a 10 microfarad capacitor and resistor 452 is a 22 kilohm resistor. Resistor 454 is a 33 kilohm resistor, and capacitor 456 is a 0.1 microfarad capacitor. Resistors 458 and 460 are both 1 kilohm resistors, and capacitor 462 is a 0.1 microfarad capacitor. The selection of suitable transistors for use as transistors 464, 466, and 468 is within the scope of one having ordinary skill in the art, informed by the present disclosure.

Figure 10C:
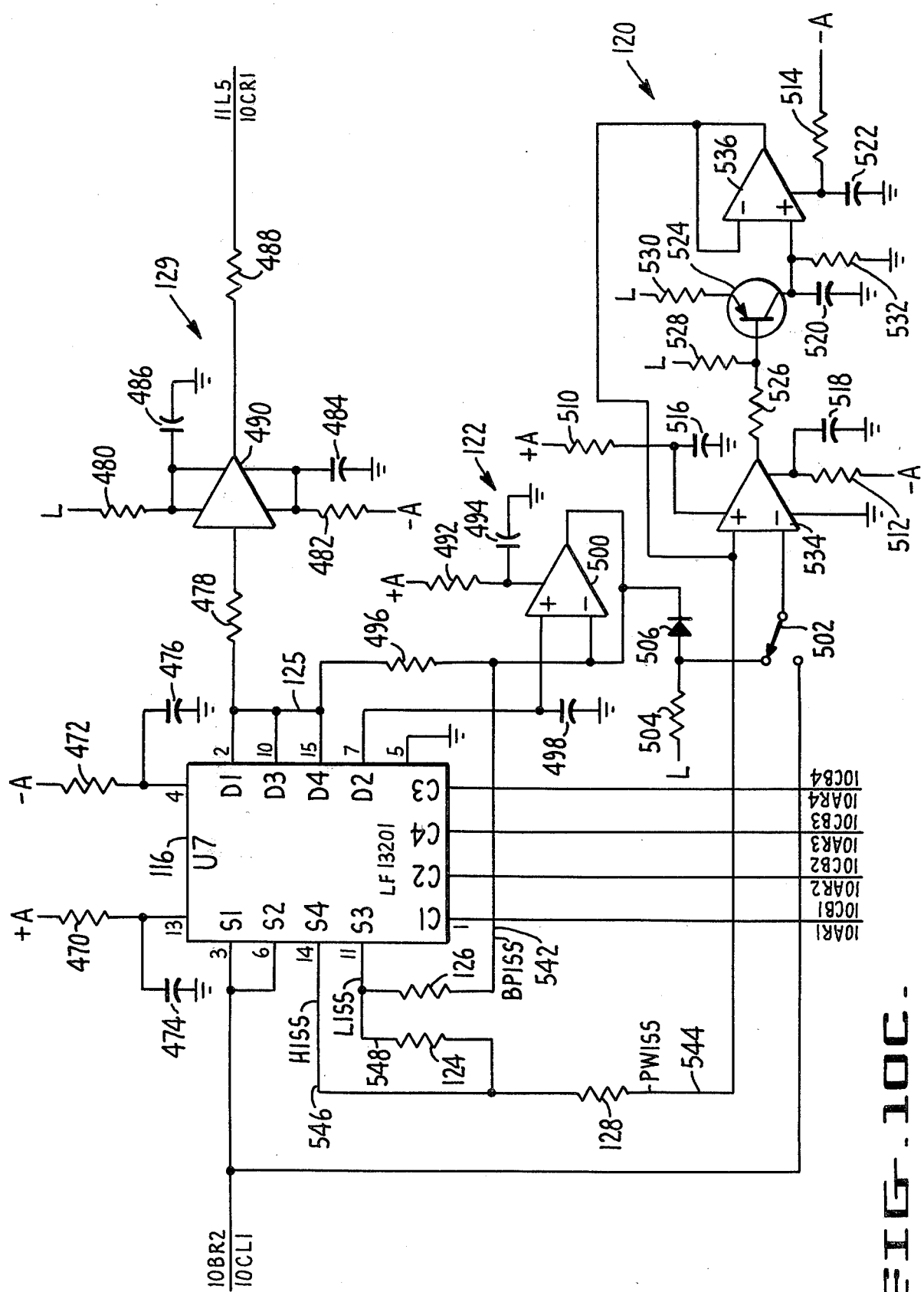

Referring now to FIG. 10C, there are shown the PWISS sample-and-hold circuit 120 and the BPISS sample-and-hold circuit 122, both of which are represented schematically in FIG. 1B. Also shown in FIG. 10C is the monitor video input buffer 129, which is shown schematically in FIG. 1D.

As seen in FIG. 10C, the HISS-LISS network comprises 300 ohm resistor 124, 56 ohm resistor 126, and 16 ohm resistor 128.

Resistors 470 and 472 are 100 ohm resistors, and capacitors 474 and 476 are 0.1 microfarad capacitors.

Monitor video input buffer 129 comprises 100 ohm resistors 478, 480 and 482, 0.1 microfarad capacitors 484 and 486, 4.7 ohm resistor 488, and an LH0002 integrated circuit video buffer 490.

BPISS sample-and-hold circuit 122 comprises a 100 ohm resistor 492, a 0.1 microfarad capacitor 494, a 3.3 kilohm resistor 496, a 0.1 microfarad storage capacitor 498, and a LM353 integrated circuit operational amplifier 500. The network comprising switch 502, 1 kilohm resistor 504, and 1N914 diode 506 serves to permit the selection of the drop across diode 506 as the reference value for the BPISS sample-and-hold circuit 122, in lieu of the monitor video input signal on conductor 125 at the output of analog multiplexer 116.

PWISS sample-and-hold circuit 120 comprises 100 ohm resistors 510, 512, and 514, 0.1 microfarad capacitors 516, 518, 520, and 522, capacitor 520 being a Mylar capacitor, transistor 524, 100 kilohm resistor 526, 33 kilohm resistor 528, 10 kilohm resistor 530, 10 megohm resistor 532, LM319 integrated circuit operational amplifier 534, and LF353 integrated circuit operational amplifier 536.

In accordance with a principal feature of the present invention, video switch 11D is direct-current coupled substantially throughout.

It is to be understood that the present invention is not limited to the employment of the particular HISS-LISS network 124, 126, 128 shown in FIG. 10C.

To the contrary, certain preferred embodiments of the present invention will be substantially identical to device 30 of the preferred embodiment shown and described in detail herein except for the substitution of particular forms of HISS-LISS network which will now be described in detail.

Figure 10D:
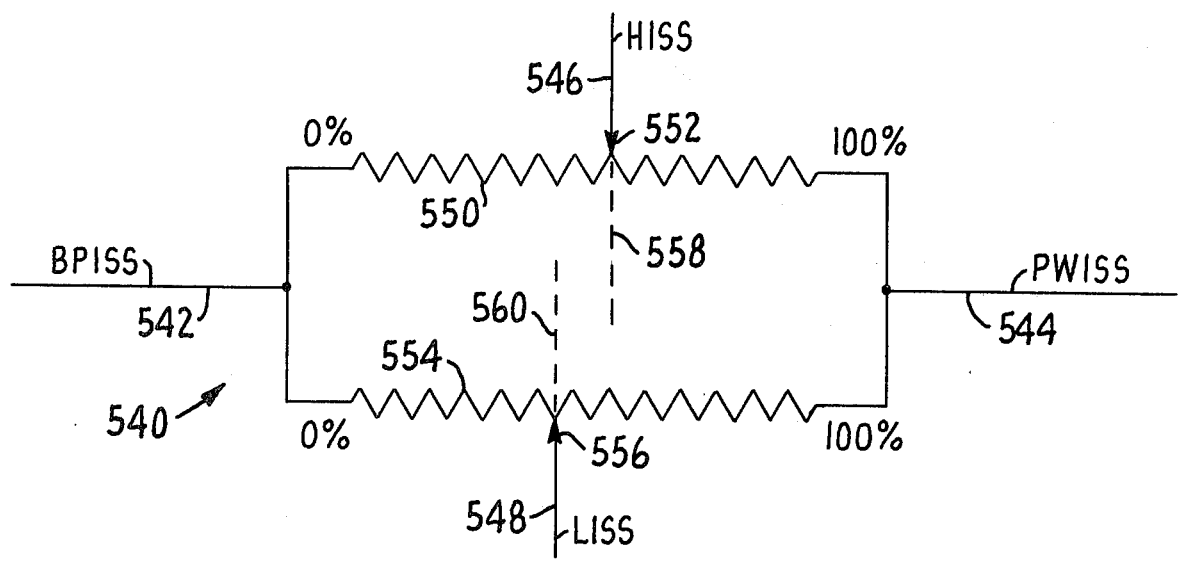

Referring now to FIG. 10D, there is shown the HISS-LISS network 540 of a first alternative preferred embodiment of the present invention, which first alternative preferred embodiment is otherwise substantially identical to device 30.

As may be seen by comparison of FIGS. 10C and 10D, the four terminals of network 540 are connected, respectively, to the correspondingly numbered leads or circuit points of the circuit of FIG. 10C, in place of the network 124, 126, 128 of FIG. 10C.

Thus, terminal 542 of network 540 is connected directly to the lead or circuit point 542 of FIG. 10C, to receive the BPISS signal; terminal 544 of network 540 is connected directly to point 544 of FIG. 10C, to receive the PWISS signal; terminal 546 of network 540 is connected directly to point 546 of FIG. 10C, to supply the HISS signal to pin 14 of analog multiplexer 116; etc.

Referring now to FIG. 10D, it will be seen that network 540 comprises a potentiometer 550 having a sliding contact or slider 552, and a potentiometer 554 having a sliding contact or slider 556. The terminal of slider 552 is terminal 546 of network 540, and the terminal of slider 556 is terminal 548 of network 540. Terminal 542 of network 540 is connected directly to a first end terminal of each potentiometer 550, 554, and terminal 544 of network 540 is connected directly to a second end terminal of each potentiometer 550, 554.

It is to be particularly noted that slider 552 is provided with a mechanical stop 558, and that slider 556 is provided with a mechanical stop 560. Stops 558 and 560 are so constructed and arranged that the HISS signal produced at terminal 546 of network 540 can be equal to but never exceed the LISS signal produced at terminal 548 of network 540, and so that the LISS signal produced at terminal 548 can be equal to but never be smaller than the HISS signal produced at terminal 546.

As also seen in FIG. 10D, the respective end terminals of potentiometer 550 are marked with their corresponding HISS levels, and the respective end terminals of potentiometer 554 are marked with their corresponding LISS levels. As will now be obvious to those having ordinary skill in the art, informed by the present disclosure, HISS-LISS network 540 is in some ways on optimally flexible HISS-LISS network, whereby any desired combination of HISS and LISS levels may be set. It is contemplated as part of the present invention that in some embodiments thereof the manual controls for 552 and 556 will be made directly accessible to the operator of the device of that embodiment, while in other embodiments the manual controls for sliders 552 and 556 will be located internally of the devices of those embodiments, and thus will be accessible only to the installation or maintenance technician.

Figure 10E:
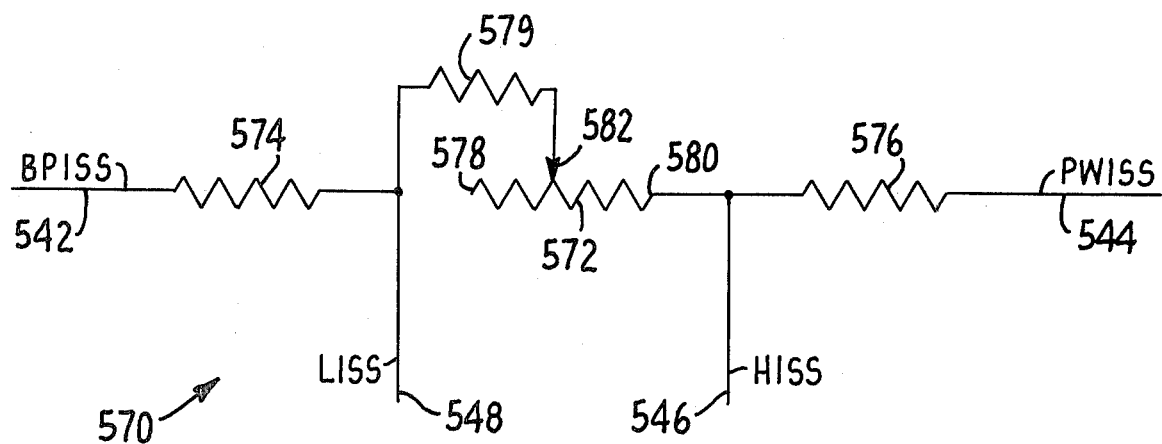

Referring now to FIG. 10E, there is shown the HISS-LISS network 570 of a second alternative preferred embodiment of the present invention. This second alternative preferred embodiment of the present invention will be substantially identical to device 30 except for the elimination of HISS-LISS network 124, 126, 128 of FIG. 10C and the substitution therefor of network 570. As will be apparent to those having ordinary skill in the art, informed by the present disclosure, each terminal of network 570 identified by a particular reference numeral will be directly connected to the point of the circuit of FIG. 10C which is itself identified by the same numeral. Thus, terminal 542 of network 570 will be directly connected to point 542 of the circuit of FIG. 10C, terminal 544 of network 570 will be directly connected to point 544 of the circuit of FIG. 10C, etc.

Referring again to FIG. 10E, it will be seen that network 570 consists of a potentiometer 572, a resistor 574 having one of its terminals connected to the slider terminal of potentiometer 572, a resistor 576 having one of its terminals connected to one end terminal of potentiometer 572, and a resistor 579 connected in the slider circuit as shown.

As will be obvious to those having ordinary skill in the art, informed by the present disclosure, HISS-LISS network 570 is particularly advantageous for the reason that it makes possible selection of the desired HISS-LISS difference or image signal sample span (ISSS) by means of only one manual control, viz., the manual control means for positioning the slider of potentiometer 572.

As will be obvious to those having ordinary skill in the art, informed by the present disclosure, the image signal sample spans (ISSS's) will be symmetrical about the half-range image signal sample level, i.e., half way between BPISS and PWISS, if the value of resistor 574 is equal to the value of resistor 576.

It is to be understood, however, that the present invention is not limited to such symmetrical HISS-LISS networks. Thus, in some versions of this second alternative preferred embodiment of the present invention, resistors 574 and 576 may be unequal in value, and thus the ISSS provided may be dissymetrical with respect to the half-range image signal sample level by a desired amount.

It is further to be understood that the present invention embraces embodiments in which resistors 574 and 576 are themselves adjustable potentiometers, whereby the position of the ISSS in the full image signal sample range may be determined as desired.

Referring now to FIG. 11, there is shown a part 620 of the circuit of monitor 56. Monitor 56 is a Tektronix Model No. 634 Video Monitor, and partial circuit 620 is taken directly from a manual supplied by the manufacturer thereof. In FIG. 11 there are shown the points 622, 624, 626 of the circuit of the Tektronix No. 634 Video Monitor from which the direct current restore (DCR) pulse signal, the vertical synchronizing pulse signal, the vertical synchronizing pulse signal, and the horizontal synchronizing signal pulse signal utilized in other parts of device 30 are derived. As also seen in FIG. 11, point 622 is directly, conductively connected to sheet terminal 11R1, point 624 is directly, conductively connected to sheet terminal 11R2, and point 626 is directly, conductively connected to sheet terminal 11R3.

As further seen in FIG. 11, sheet terminal 11L1 is directly, conductivvely connected to the input terminal of monitor 56 which is identified as its brightness or bri terminal, sheet terminal 11L2 is directly, conductively connected to the input terminal of monitor 56 which is identified as its contrast or con terminal, sheet terminal 11L3 is directly, conductively connected to the input terminal of monitor 56 which is identified as its external synchronizing signal or EXT SYNC terminal, sheet terminal 11L4 is directly, conductively connected to the input terminal of monitor 56 which is identified as its TTL BLANKING terminal, and sheet terminal 11L5 is directly, conductively connected to the input terminal of monitor 56 which is identified as its VIDEO INPUT terminal.

Referring now to FIG. 12, there are shown the two two-kilobyte programmable read-only memory units or PROMS 630, 632, which together, along with inverter 634, constitute the program memory 64 associated with microprocessor 60, as shown schematically in FIG. 1B.

Both PROM 630 and PROM 632 are programmable read-only memory units of the type sold under the commercial designation 2716.

In device 30 inverter 634 is an integrated circuit inverter of the type sold under the commercial designation 74LS04.

Figure 13:
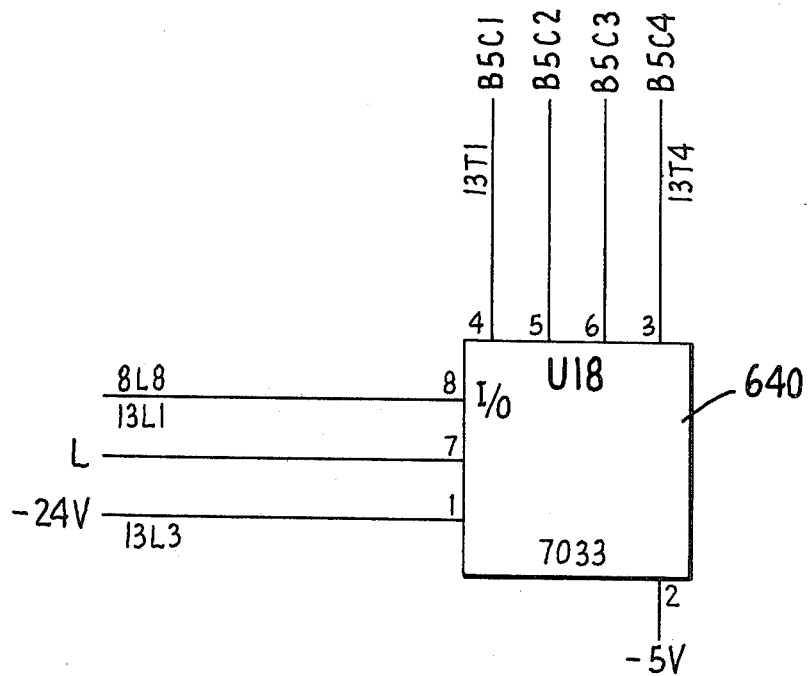

Referring now to FIG. 13, there is shown the non-volatile random-access memory device 640 of device 30, which is identified in FIG. 1B of the schematic diagram as non-volatile memory unit 70. In device 70 random-access memory device 640 is a commercially available integrated circuit, non-volatile RAM sold under the commercial designation Nitron 7033.

Figure 14:
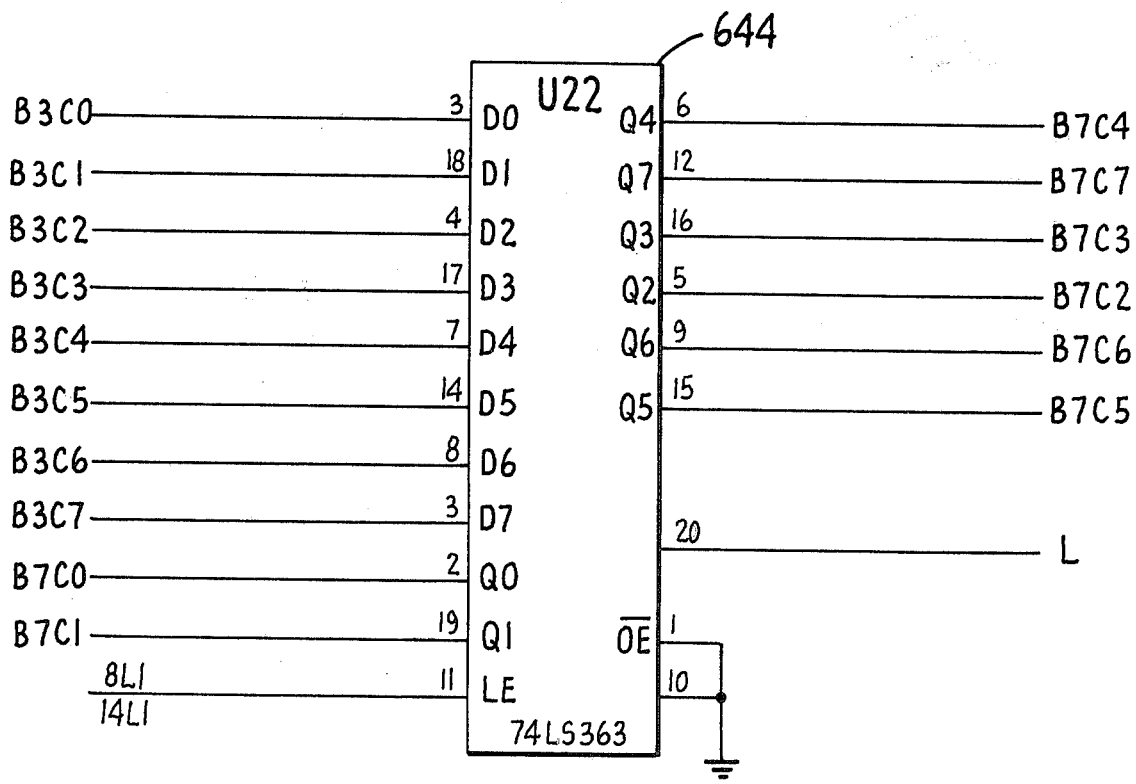

Going now to FIG. 14, there is shown the integrated circuit address latch bank 644 which is identified in FIG. 1B of the schematic diagram of device 30 as address latch unit 66. In device 30 address latch bank 644 is an integrated circuit device of the type sold commercially under the designation 47LS363.

Figure 15:
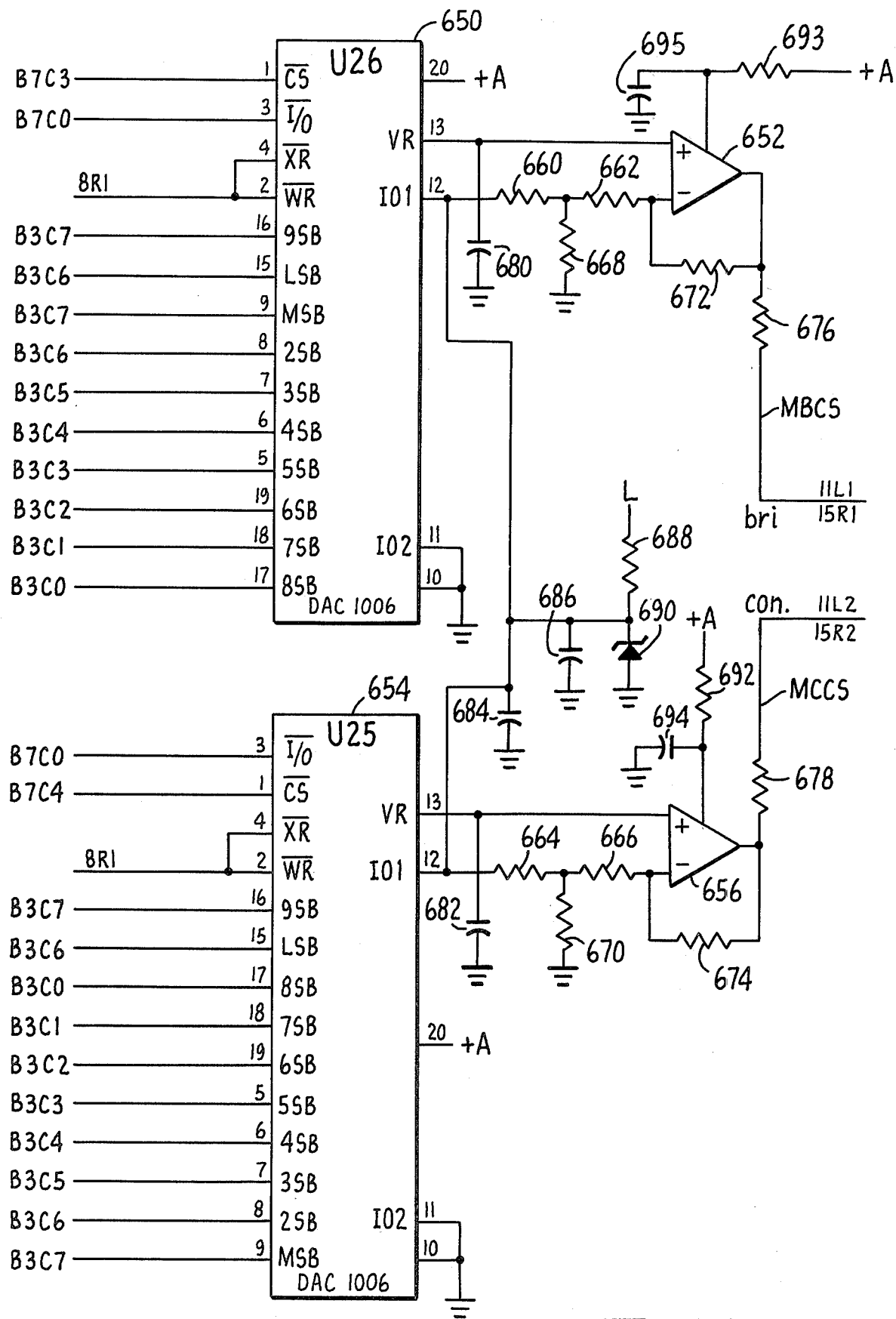

Referring now to FIG. 15, there is shown the combination of circuit elements which constitutes the digital-to-analog converters 80 and 82 of FIG. 1C of the schematic diagram of device 30.

Digital-to-analog converter 80, which is also designated as the MBDAC or monitor brightness digital-to-analog converter herein, serves to produce the MBCS or monitor brightness control signal which is discussed hereinbelow under the heading "Method of Operation". MBDAC 80 comprises an integrated circuit digital-to-analog converter of the type sold under the commercial designation DAC1006, and an integrated circuit operational amplifier of the type sold under the commercial designation 347.

Digital-to-analog converter 82, which is also designated as the MCDAC or monitor contrast digital-to-analog converter herein, serves to produce the MCCS or monitor contrast control signal which is discussed hereinbelow under the heading "Method of Operation". MCDAC 82 comprises an integrated circuit digital-to-analog converter 654 of the type sold under the commercial designation DAC1006, and an integrated circuit operational amplifier 656 of the type sold under the commercial designation LF347.

The (analog) monitor contrast control signal MCCS is either positive or negative, i.e., covers a positive range from 0 to +10 volts, or a negative range from 0 to −10 volts, depending upon the most significant bit (MSB) latched in its latch, which most significant bit is determined by the settings of the image polarity switch 14, the channel selection switch 16, and the corresponding channel polarity switch, acting through the microprocessor of device 30 and its stored program. When said MSB is 0 the MCCS is in its negative range, and, due to the design of monitor 56, the polarity of the image displayed on monitor screen 54 is not inverted with respect to the polarity of the image borne by the selected video input signal. When said MSB is 1 the MCCS is in its positive range, and, due to the design of monitor 56, the polarity of the image displayed on monitor screen 54 is inverted with respect to the polarity of the image borne by the selected video input signal.

In the circuit of FIG. 15 the resistors 660, 662, 664, and 666 are all 18.2 kilohm resistors; the resistors 668 and 670 are 2.43 kilohm resistors; the resistors 672 and 674 are 133 kilohm resistors; and the resistors 676 and 678 are 100 ohm resistors. The capacitors 680 and 682 are 0.1 microfarad capacitors. In the network common to MBDAC 80 and MBDAC 82, capacitor 684 is a 10 microfarad capacitor, capacitor 686 is a 0.1 microfarad capacitor, resistor 688 is a 420 ohm resistor, and Zener diode 690 is an LM336Z Zener diode. The resistor 692 and the capacitor 694 of the biasing network of operational amplifier 656 can be provided by those having ordinary skill in the art without the exercise of invention. Similarly, the resistor 693 and the capacitor 695 of the biasing network of operational amplifier 652 may be provided by those having ordinary skill in the art without the exercise of invention.

The parts of device 30 shown in FIGS. 16 and 17 are described in detail elsewhere in the present specification, and the detailed description of the same will not be repeated here.

Method of Operation

For ease of understanding of the methods of operation carried out by certain devices embodying the present invention, and the operators thereof, the terms and corresponding symbols used herein to denote certain particular features and aspects of the present invention should be considered in detail. These terms and symbols are discussed directly below.

LISS. The term "low image signal sample" or LISS is defined in the Glossary, supra.

HISS. The term "high image signal sample" or HISS is defined in the Glossary, supra.

LISS Level. The term "LISS level" is defined in the Glossary, supra.

HISS Level. The term "HISS level" is defined in the Glossary, supra.

In accordance with the principles of the present invention, the HISS and the LISS in a photographic video image recording device embodying the present invention are taken substantially directly from the input video signal from which images are to be recorded, so that the HISS level and the LISS level are substantially unaffected by component value drift, line voltage variation, and other factors which produce recorded image drift in video image recording devices of the prior art.

For example, it may be seen in FIG. 1D that in the device 30 of the preferred embodiment of the present invention the particular input video signal selected by analog multiplexer 114 passes only through buffer 118 before being sampled by the peak-white-sample-and-hold subcircuit 120; and that that same video input signal passes only through buffer 118 and analog multiplexer 116 before being sampled by the back-porch-sample-and-hold subcircuit 122. Analog multiplexers 114 and 116 and buffer 118 are preferably selected for their ability to pass the selected video input signals substantially without change. Further, as also seen in FIG. 1D, the HISS and the LISS obtaining at any particular time in device 30 are derived directly from the PWISS and the BPISS, supplied by sample-and-hold subcircuits 120 and 122, respectively, by means of a simple resistive network 124, 126, 128, the HISS level and LISS level of which remain substantially the same over the entire operating range of device 30.

Thus, it may be seen that in accordance with the principles of the present invention the HISS and the LISS in device 30 are taken substantially directly from the input video signal from which images are to be recorded, and are substantially unaffected by component value drift, line voltage variation, host video signal amplitude, and the other factors which produce recorded image drift in the photographic video image recording devices of the prior art.

LISSLUM. The term "low image signal sample luminance" or LISSLUM is used herein to denote a monitor screen luminance value corresponding to a particular LISS value. The term "actual low image signal sample luminance" or actual LISSLUM is used herein to denote the value measured by the monitor display screen output photometer of a video image recording device embodying the present invention when a synthetic video image signal is supplied to the monitor the image signal portion of which is constant and equal to the LISS ("LISS video signal"). The term "desired low image signal sample luminance" or desired LISSLUM as used herein denotes a desired or target LISSLUM, i.e., a desired or target luminance value corresponding to a particular LISS value. The term "low image signal sample luminance ratio" or LISSLUM ratio as used herein denotes the ratio between the LISS and the corresponding desired or target LISSLUM obtaining in a particular video image recording device embodying the present invention at a particular moment of its operation. LISSLUM ratio may, e.g., be expressed in volts per foot-lambert.

HISSLUM. The term "high image signal sample luminance" or HISSLUM is used herein to denote a monitor screen luminance value corresponding to a particular HISS value. The term "actual high image signal sample luminance" or actual HISSLUM is used herein to denote the luminance value measured by the monitor display screen output photometer of a video image recording device embodying the present invention when a synthetic video image signal is supplied to the monitor the image signal portion of which is constant and equal to the HISS ("HISS video signal"). The term "desired high image signal sample luminance" or desired HISSLUM as used herein denotes a desired or target HISSLUM, i.e., a desired or target luminance value corresponding to a particular HISS value. The term "high image signal sample luminance ratio" or HISSLUM ratio as used herein denotes the ratio between the HISS and the corresponding desired or target HISSLUM obtaining in a particular video image recording device embodying the present invention at a particular moment of its operation. HISSLUM ratio may, e.g., be expressed in volts per foot-lambert.

The term "monitor brightness control signal" or MBCS as used herein denotes the signal supplied by the servosystem portion of a video image recording device embodying the present invention to the monitor of that device to control the brightness of the monitor display, the term "brightness" being used here in the sense in which it is ordinarily used in the video monitor art. In the device 30 of the preferred embodiment of the present invention the monitor brightness control signal or MBCS is supplied to monitor 56 via brightness signal terminal 100 (FIG. 1D).

The term "monitor contrast control signal" or MCCS as used herein denotes the signal supplied by the servosystem portion of a video image recording device embodying the present invention to the monitor of that device to control the contrast of the monitor display, the term "contrast" being used here in the sense in which it is ordinarily used in the video monitor art. In the device 30 of the preferred embodiment of the present invention the monitor contrast control signal or MCCS is supplied to monitor 56 via contrast signal terminal 102 (FIG. 1D).

LDDI. As taught hereinabove, the term "low Dunn density index" or LDDI as used herein denotes an index number which may be conveniently employed in utilizing a particular device embodying the present invention for photographically recording video images. As also taught hereinabove, certain particular preferred embodiments of the present invention are provided with externally accessible image parameter controls, e.g., 18, 40, FIG. 17, which are calibrated in terms of the low Dunn Density Index or LDDI of that particular embodiment. It is to be understood that the present invention is not limited to devices having externally accessible controls calibrated in terms of the LDDI of the particular device. It is also to be understood that in certain embodiments of the present invention particular values of the index number LDDI may not have the same significance as in other embodiments of the present invention. The term "indicated low Dunn density index" or indicated LDDI will sometimes be used herein to denote the particular value of LDDI appearing on the LDDI indicator of a particular embodiment of the present invention at a particular time.

It is of particular importance to note that every LDDI value which can be indicated on the LDDI indicator of a particular video image recording device embodying the present invention at a particular time is directly related to a corresponding desired LISSLUM value in that particular device. For example, in the device 30 of the preferred embodiment of the present invention the relationship between any indicated LDDI value and its corresponding desired LISSLUM value is the identity relationship. In other words, any particular LDDI value indicated on LDDI indicator 40 of device 30 (cf., FIG. 17) is also the value of the desired LISSLUM then obtaining in device 30. It is to be understood, however, that this identity relationship between LDDI and desired LISSLUM will not necessarily obtain in every device embodying the present invention. As pointed out hereinabove, the term LDDI in synonomous with the term LDN or "low Dunn number".

HDDI. As taught hereinabove, term "high Dunn density index" or HDDI as used herein denotes an index number which may be conveniently employed in utilizing a device embodying the present invention for photographically recording video images. As also taught hereinabove, certain particular preferred embodiments of the present invention are provided with externally accessible image parameter controls, e.g., 20, 42, FIG. 17, which are calibrated in terms of the high Dunn density index of HDDI of that particular embodiment. It is to be understood that the present invention is not limited to devices having externally accessible controls calibrated in terms of the HDDI of that particular device. It is also to be understood that in certain embodiments of the present invention particular values of the index number HDDI may not have the same significance as in other embodiments of the present invention. The term "indicated high Dunn density index" or indicated HDDI will sometimes be used herein to denote the particular value of HDDI appearing on the HDDI indicator of a particular embodiment of the present invention at a particular time.

It is of particular importance to note that every HDDI value which can be indicated on the HDDI indicator of a particular video image recording device embodying the present invention at a particular time is directly related to a corresponding desired HISSLUM value in that particular device. For example, in the device 30 of the preferred embodiment of the present invention the relationship between any indicated HDDI value and its corresponding desired HISSLUM value is the identity relationship. In other words, any particular HDDI value indicated on HDDI indicator 42 of device 30 (cf., FIG. 17) is also the value of the desired HISSLUM then obtaining in device 30. It is to be understood, however, that this identity relationship between HDDI and desired HISSLUM will not necessarily obtain in every device embodying the present invention. As pointed out above, the term HDDI is synonymous with the term HDN or "high Dunn number".

Reference should be had to FIG. 1D, which shows the implementation of the relationship between the quantities denoted by the terms defined above and other basic terms defined herein in the device 30 of the preferred embodiment of the present invention.

As will be evident to those having ordinary skill in the art, informed by the present disclosure from the computer program listing which is a part of the present specification, read in light of the textual portion of the specification and drawings, the program of device 30 includes a subprogram or set of inter-related routines, called Auto-Comp herein, whereby the MBCS and MCCS are repeatedly varied in systematic fashion to make the actual LISSLUM measured by the monitor screen output photometer system 50, 60 equal to the indicated LISS, and to make the actual HISSLUM measured by the monitor screen output photometer system 50, 60 equal to the indicated HISS.

Before describing in detail the method of servocontrol operation which is automatically and repeatedly carried out by the Auto-Comp portion of the program of device 30, preliminary steps of the method of operation of device 30 carried out by and under control of the operator of device 30 will be considered.

Going to FIG. 16, it will be seen that a film cassette 180 has been loaded into device 30 through port 600, and its dark slide removed. Port 600 is provided with suitable light leakage preventing means in the well-known manner. The housing of device 30 provides a light-tight enclosure containing cassette 180, monitor 56, the monitor optical system 602, comprising mirrors 604, 606, 608, lens 610, and mechanical shutter 380, whereby the images appearing on monitor display screen 54 are imaged upon selected areas of the film in cassette 180. Monitor 56 and the elements of its optical system 602 are joined together into a unitary assembly by mechanical means (not shown), and electrical servopositioning means of well-known type (also not shown) are provided for stepping this unitary assembly, seriatim, through a predetermined plurality of predetermined juxtapositions to the film in cassette 180, whereby a predetermined array of exposures can be made on the film in cassette 180, each exposure representing one image which was presented on monitor screen 54. A viewing port for viewing monitor screen 54 is provided, which is covered by a viewing door 182. As explained hereinabove, the images displayed on monitor screen 54 are derived from video signals which may be selected from among the set of video signals supplied by the four host video devices 160 through 166.

It is assumed that the operator of device 30 has selected the host video device which is to be used as the source of video signals for monitor 56, which is a normal image polarity host video device, by means of channel switch 16 (FIG. 17), in which case the corresponding channel polarity switch is set to its Normal (Open) setting, and that the desired exposure time for the particular film in cassette 180 is the exposure time preset in device 30. (It will be remembered from the discussion above, however, that desired values of exposure time can be set by suitable manipulation of switches 336, 20 and 22. It is further assumed that the desired LDDI and HDDI previously stored in the manner described above, are now automatically recalled from memory 70 to processor 60. Additionally, it is assumed for the preliminary part of this discussion of the operation of device 30 that the operator thereof has set image polarity switch 14 to its POS position. At this time, and so long as an unexposed image area remains available on the film in cassette 180, the polarity inverse of any desired image appearing on monitor screen 54 can be recorded on the film in cassette 180 by simply depressing exposure switch 12. It is to be understood, however, that the selection of the desired image to be recorded must be determined from the monitor viewing screen of the host video device supplying the video signal to monitor 56, since device 30 will not operate while viewing door 182 is open.

Auto-Comp. As pointed out above, the Auto-Comp portion of the program of device 30 serves to automatically and repeatedly vary the monitor brightness control signal (MBCS) and the monitor contrast control signal (MCCS) in systematic fashion to make the actual LISSLUM measured by the monitor screen output photometer system 50, 60 equal to the indicated LDDI, and to make the actual HISSLUM measured by the monitor screen output photometer system 50, 60 equal to the indicated HDDI.

The Auto-Comp subprogram comprises two different routines or methods of operation, viz., the successive approximation Auto-Comp mode or routine (SAM) and the tracking Auto-Comp mode or routine (TAM).

In accordance with the program of device 30, stored in program memory 64 (FIG. 1B), the SAM routine is invoked and carried out whenever one of certain predetermined SAM-triggering events takes place, such as the operating of any front panel switch, excepting the downward operation of switch 22, or the moving of monitor 56 to its initial exposure position with respect to the film in cassette 180.

In accordance with a further feature of the program of device 30, the completion of each SAM routine automatically triggers a TAM routine, so that one complete TAM operation is carried out, unless exposure of a film area is taking place or monitor 56 is in motion, in which events the TAM operation is delayed until the exposure is completed or the monitor comes to rest.

Assuming for the moment that the polarity switch factor product, g.v., infra, is −1, each SAM operation carried out under the control of the SAM routine of the program of device 30 will be a series of successive approximations during which the MBCS and MCCS are varied to cause the actual LISSLUM to approach and ultimately reach the desired LISSLUM, i.e., the indicated LDDI value, and to cause the actual HISSLUM to approach and ultimately reach the desired HISSLUM, i.e., the indicated HDDI value. Somewhat similar routines are used in microprocessor-based analog-to-digital converters, and are well-known to those having ordinary skill in the art, and thus this SAM routine will not be described in detail here. For more detail of this routine reference should be had to the program listing which is part of the present specification.

Before further considering the SAM routine, the following particular details of the operation of device 30 should be noted. In the carrying out of each SAM routine the MBCS in first adjusted, then the MCCS is adjusted, then the MBCS, etc. The most significant bit stored in the MCDAC (82, FIG. 1C) is used as a sign (+, −)indicator, and thus only 9 numerical or monitor display polarity bits are stored in the MCDAC. Thus, the term MSNB or most significant numerical bit as used herein refers to the actual most significant bit but one in the MCDAC, etc.

In accordance with the SAM routine corresponding to the polarity switch factor product stated immediately above, i.e., −1, called the L/B SAM routine herein, the monitor screen contrast value latched in latching digital-to-analog converter 82 (MCDAC) (FIG. 1C) is first set to 256, the monitor screen brightness value latched in latching digital-to-analog converter 80 (MBDAC) (FIG. 1C) is initially set to mid-span, i.e., half of full scale, or 512, and the monitor is supplied with the LISS video signal.

Further carrying out the L/B SAM routine, the actual LISSLUM is then read by the photometer system 50, 60, and compared with the desired LISSLUM. If the actual LISSLUM exceeds the desired LISSLUM, the most significant bit latched in the MBDAC is cleared, and the next three most significant bits used as the MBDAC setting, as in the well-known successive approximation technique referred to above. (See, e.g., Microcomputer Interfacing by Bruce A. Artwick, Prentice-Hall, Inc., 1980, pages 224 and 225.) This adjustment is then carried out for each of the next three most significant bits.

Immediately thereafter, while the just determined value is latched in the MBDAC, a similar procedueure is followed in carrying out an initial adjustment of the value latched in the MCDAC, i.e., adjusting the first four most significant numerical bits therein.

Following these first approximation adjustments of the values latched in the MCDAC and the MBDAC, these adjustment procedures are repeated for the six most significant numerical bits in each DAC, and then for the eight most significant numerical bits in each DAC. Finally, these adjustment procedures are repeated for all of the most significant numerical bits in each DAC, i.e., the MBDAC and the MCDAC.

At this point a truncated L/B or −1 SAM routine is performed, as described in the computer program listing, and the results of the two routines are compared. If these results differ only in their least significant bits, or do not differ at all, the results of the full L/B SAM routine are accepted as valid, and, e.g., a corresponding (−1) TAM routine, q.v., is commenced. This truncated test routine and comparison is otherwise repeated until agreement is achieved, although other condition responsive routines may be provided.

In the L/C type of SAM routine, the successive adjustment procedures followed are substantially the same as those just described, except that the initial value latched in the MCDAC is 768, the MCCS is adjusted in accordance with the LISSLUM difference, rather than the HISSLUM difference, to equal LDDI, and the MBCS is adjusted in accordance with the HISSLUM difference rather than the LISSLUM difference, to equal HDDI.

As will be seen from the above by those having ordinary skill in the art, informed by the present disclosure, there are two types of SAM routine embodied in the Auto-Comp subprogram, i.e., the SAM routine in which the difference between the actual LISSLUM and the desired LISSLUM, i.e., the LISSLUM difference, is eliminated by varying the MBCS, and the SAM routine in which the LISSLUM difference is eliminated by varying the MCCS. The first type of SAM routine, i.e., in which the MBCS is varied to eliminate the LISSLUM difference, will be called the L/B type of SAM routine herein. The other type of SAM routine will be called the L/C herein.

In accordance with the program of device 30, the type of SAM routine carried out at any particular time will be determined by the existing settings of (1) the image polarity switch 14 and (2) the channel polarity switch (268, 270, 272, or 274, FIG. 5A) of the channel then indicated on channel selection switch 16.

For ease in determining the type of SAM routine which will be invoked during any particular combination of image polarity switch setting and channel polarity switch setting, the following numbers, called "mode factors", may be employed.

The "image polarity switch factor" or IPF is +1 when image polarity switch 14 is in its POS position, and otherwise is −1.

The "channel polarity switch factor" or CHPF is +1 when the currently selected channel polarity switch (268, 270, 272, or 274) is in its Normal, open or off position, and otherwise is −1.

The algebraic product of these two factors obtaining at any time is called the "polarity switch factor product", and these factors are individually called the "polarity switch factors".

The "film image polarity factor" or FPF is +1 when the developed film image is of the same image polarity as the corresponding host video device viewing monitor image, and otherwise is −1.

The "SAM type factor", cf. infra., is +1 for the L/C type SAM, and −1 for the L/B type SAM.

The "TAM type factor", cf. infra., is +1 for the H/B type TAM, and −1 for the L/B type TAM.

Given these mode factors, the SAM type factor obtaining at any time will be the same as the polarity switch factor product obtaining at that time.

For example, if switch 14 is set to POS (IPF = +1), the selected channel polarity switch, e.g., 270, is set to its Closed or Reversed Video position (CHPF = −1), the polarity switch factor product of the corresponding SAM routine type, i.e., the SAM type factor, can be readily computed as −1, and thus the SAM routine type then carried out will be seen from the above mode factor definitions to be the L/B type, in which the LISSLUM difference is eliminated by varying the MBCS.

In carrying out this type of SAM routine the HISSLUM difference, i.e., the difference between the actual HISSLUM and the desired HISSLUM, will, of course, be eliminated by varying the MCCS. On the other hand, the HISSLUM difference will be eliminated by varying the MBCS during the L/C (or +1) type of SAM routine.

It is to be noted that in accordance with the program of device 30 any reading of photometer system 50, 60 is accepted as valid when three successive readings are identical or 20 vertical synchronization times of the video input signal have elapsed.

In accordance with the program of device 30 only the MBCS is adjusted during the carrying out of the TAM routines.

It will now be assumed that the polarity switch factor product, and the the TAM type factor, is +1. In accordance with the H/B TAM routine, then, which is automatically invoked by the program of device 30 once an L/C SAM routine has been completed, the MBDAC is continuously adjusted in one bit increments, as necessary. During an H/B TAM routine interval, except when an image is being recorded, the HISS video signal is applied to monitor 56, and after each twentieth vertical synchronization time of the selected input video signal the actual HISSLUM is read by the photometer system 50, 60 and compared with the desired HISSLUM (the indicated LDDI). If the actual HISSLUM exceeds the desired HISSLUM, the value latched in the MBDAC is incremented by 1. If the actual HISSLUM equals the desired HISSLUM the value latched in the MBDAC is not changed.

In accordance with the L/B TAM routine, which is carried out when the polarity switch factor product is −1, the successive MBDAC adjustments are made in accordance with the difference between the actual LISSLUM and the desired LISSLUM. During each performance of this L/B TAM routine, the value latched in the MBDAC is incremented or decremented by one bit per adjustment, or left unchanged, in accordance with the difference, if any, between the actual LISSLUM read by the photometer system 50, 60 and the desired LISSLUM stored in the LDDI storage location corresponding to the existing setting of the channel selection switch 16.

Further details of the operation of the Auto-Comp subprogram will be found in the program listing which is a part of the present specification.

Computer Program Listing

The program of device 30 of the preferred embodiment, which is stored in memory 64 (FIGS. 1B and 12), is listed in the computer program listing which was filed with and constitutes a part of this specification. Said computer program listing consists of 75 computer printout sheets, numbered as page 1 through page 75, each of which bears the heading ISIS-II MCS-48/UPI-41 MACRO ASSEMBLER, V4.0. The content of memory 64 is found in the two leftmost columns of the printout sheets. The location codes (LOC) are expressed in four hexadecimal digits. The corresponding location contents (OBJ) are expressed in two hexadecimal digits. E.g., location 0000 (hexadecimal) contains 15 (hexadecimal). Furthermore a conventional compressed notation is used, such that, e.g., the corresponding LOC and OBJ entries 0001 0420 followed by the corresponding LOC and OBJ entries 0003 64C2 followed by a LOC entry of 0005 imply the following four sets of corresponding entries: 0001 04; 0002 20; 0003 64; 0004 C2. THE SOURCE STATEMENT portion of this program listing refers to some structural elements and methods of operation not shown in the drawings or described in the descriptive portion of this specification, e.g., the monitor transport mechanism, because for conciseness the descriptive portion and drawings disclose only apparatus and methods of operation embodying inventions which it is desired to claim herein, and matters necessary thereto. Further, in the well-known manner, the terminology of the SOURCE STATEMENT is not necessarily the same as the terminology of the descriptive portion of this specification. For example, the terms BRIGHTNESS and CONTRAST at line 12 of the SOURCE STATEMENT could be replaced by LDDI and HDDI.

It will thus be seen that the objects set forth above, among those made apparent by the preceding description, are effectively attained, and since certain changes may be made in the abovedescribed constructions, arrangements of parts, and methods of operation, without departing from the scope of the present invention, it is intended that all matter contained in the above description, or shown in the accompanying drawings, shall be interpreted as illustrative only, and not in a limiting sense.

While the best mode contemplated by the inventors for carrying out their invention is shown and described in the present specification (including the computer program listing) and drawings, it is to be particularly noted that the scope of the invention is not limited to apparatus and methods of operation involving two separate index value display devices and corresponding separate manually operable displayed index value control devices. Rather, it is to be particularly noted that this invention embraces embodiments comprising, e.g., but one index value display device which is switchably used for displaying selected values of a plurality of different indexes. Further, these same display devices may also be employed for displaying other values, such as values of open device operating parameters, film types or characteristics, etc., including but not limited to color balance, tint, shade, hue, chrome, video signal luminance, chrominance, and other burst amplitude. In addition, devices embodying the present invention may be provided which accept non-composite color video signals, which signals comprise plural separate signals, each carrying the information relating to a primary color component of the video images carried thereby. Further, it is to be particularly understood that while, in the embodiments shown and described herein the film-impingent light image is controlled by varying the monitor brightness and contrast, the invention embraces the use of any means to servocontrol the film-impingent light image, including but not limited to servomotor driven lens aperture defining means, servomotor driven polarizing means, Kerr cell means, and the like. Additionally, this invention embraces in its scope embodiments in which, e.g., monitor display screen brightness and contrast are fixed by electronic regulation and the film-impingent light image brightness is controlled by, e.g., servomotor driven lens aperture defining means.

It is also to be understood that the following claims are intended to cover all of the generic and specific features of the invention herein described, and all statements of the scope of the invention which, as a matter of language, might be said to fall therebetween.

```
LOC  OBJ        LINE       SOURCE STATEMENT

1  $LIST NOSYMBOLS NOCOND
                  2  $TITLE ('Dunn Camera Model 627 TLC   V2.0     (C) 1981 Dunn Systems, Inc.')
0000              3  BPLUS   EQU    0        ;0 FOR 627, 1 FOR BETA PLUS
0000              4  V1      EQU    0        ;0 FOR VERSION 2, 1 FOR VERSION 1
                  5  $INCLUDE (:F1:CONFIG.SRC)
            =     6
            =     7
            =     8
            =     9  ; DIP SWITCH SETTINGS IN THE RUN MODE
            =    10
            =    11 ;      DIP SWITCH 1 - OFF
            =    12 ;      DIP SWITCH 2 - OFF - CONTRAST/BRIGHTNESS ADJUSTMENT ACTIVE
            =    13 ;                     ON  - EXPOSURE TIME ADJUSTMENT ACTIVE
            =    14 ;      DIP SWITCH 3 - OFF - NORMAL MANUAL OPERATION
            =    15 ;                     ON  - CYCLING OPERATION
            =    16 ;      DIP SWITCH 4 - OFF - AUTOCOMP ENABLED
            =    17 ;                     ON  - DIRECT CONTROL OF DAC REGISTERS
            =    18 ;      DIP SWITCH 5 - OFF - TRACKING ENABLED
            =    19 ;                     ON  - TRACKING DISABLED
            =    20 ;      DIP SWITCH 6 - OFF - RASTER BLEND ENABLED
            =    21 ;                     ON  - RASTER BLEND DISABLED
            =    22 ;      DIP SWITCH 7 - OFF - CHANNEL 1 NORMAL VIDEO
            =    23 ;                     ON  - CHANNEL 1 REVERSE VIDEO
            =    24 ;      DIP SWITCH 8 - OFF - CHANNEL 2 NORMAL VIDEO
            =    25 ;                     ON  - CHANNEL 2 REVERSE VIDEO
            =    26 ;      DIP SWITCH 9 - OFF - CHANNEL 3 NORMAL VIDEO
            =    27 ;                     ON  - CHANNEL 3 REVERSE VIDEO
            =    28 ;      DIP SWITCH 10 - OFF - CHANNEL 4 NORMAL VIDEO
            =    29 ;                      ON  - CHANNEL 4 REVERSE VIDEO
            =    30
            =    31
            =    32 ; STRAPPING OPTIONS
            =    33
            =    34 ;      EMULSION SIDE DOWN - E4/E5 STRAPPED
            =    35
            =    36 ;      4 EXPOSURES - E9/E11 STRAPPED
            =    37 ;      6 EXPOSURES - E10/E11 STRAPPED
            =    38 ;      9 EXPOSURES - E9/E11 AND E10/E11 STRAPPED
            =    39 ;      IF NONE OF THE ABOVE STRAPS ARE INSERTED, 6 EXPOSURES IS SELECTED
            =    40
            =    41 ;      STANDARD COUNTING SEQUENCE - E6/E8 STRAPPED
            =    42 ;      OPTION 1 COUNTING SEQUENCE - E7/E8 STRAPPED
            =    43 ;      OPTION 2 COUNTING SEQUENCE - E6/E8 AND E7/E8 STRAPPED
            =    44 ;      IF NONE OF THE ABOVE STRAPS ARE INSERTED, THE STANDARD SEQ. IS SELECTED
            =    45
            =    46 $EJECT
            =    47
0000        =    48 HMOPTN  EQU    0         ;0 TO START EXPOSURE SEQUENCE ON EITHER SIDE
            =    49 ;                        ;OF HOME BIT; 1 TO START FROM INSIDE HOME BIT
            =    50
0004        =    54 SHTRDL  EQU    4
            =    56 ;
            =    57 ; SUBROUTINE CONVENTIONS
            =    58 ;      - REGISTERS A THRU R3 MAY BE MODIFIED BY A SUBROUTINE;
            =    59 ;        REGISTERS R4 THRU R7 ARE UNCHANGED.
            =    60
            =    61 ;      I/O ADDRESS DEFINITIONS
            =    62
```

```
007F        =  63 IODSP   EQU    07FH    ;ADDRESS OF DISPLAY
00BC        =  64 IOCNT0  EQU    0BCH    ;ADDRESS OF COUNTER 0
00BD        =  65 IOCNT1  EQU    0BDH    ;ADDRESS OF COUNTER 1
00BE        =  66 IOCNT2  EQU    0BEH    ;ADDRESS OF COUNTER 2
00BF        =  67 IOCNTM  EQU    0BFH    ;ADDRESS OF COUNTER(8253) CONTROL
00D8        =  68 IOCNV0  EQU    0D8H    ;ADDRESS ANALOG CHANNEL 0 AND START CONVERT
00D9        =  69 IOCNV1  EQU    0D9H    ;ADDRESS ANALOG CHANNEL 1 AND START CONVERT
00DA        =  70 IOCNV2  EQU    0DAH    ;ADDRESS ANALOG CHANNEL 2 AND START CONVERT
00DB        =  71 IOCNV3  EQU    0DBH    ;ADDRESS ANALOG CHANNEL 3 AND START CONVERT
00DC        =  72 IOCNV4  EQU    0DCH    ;ADDRESS ANALOG CHANNEL 4 AND START CONVERT
00DD        =  73 IOCNV5  EQU    0DDH    ;ADDRESS ANALOG CHANNEL 5 AND START CONVERT
00DE        =  74 IOCNV6  EQU    0DEH    ;ADDRESS ANALOG CHANNEL 6 AND START CONVERT
00DF        =  75 IOCNV7  EQU    0DFH    ;ADDRESS ANALOG CHANNEL 7 AND START CONVERT
00F6        =  76 IOBRLO  EQU    0F6H    ;ADDRESS OF LS BYTE BRIGHTNESS DAC
00F7        =  77 IOBRHI  EQU    0F7H    ;ADDRESS OF MS BYTE BRIGHTNESS DAC
00EE        =  78 IOCTLO  EQU    0EEH    ;ADDRESS OF LS BYTE CONTRAST DAC
00EF        =  79 IOCTHI  EQU    0EFH    ;ADDRESS OF MS BYTES CONTRAST DAC
00F4        =  80 IOOPR   EQU    0F4H    ;ADDRESS OF OPERATOR CONTROLS
00F5        =  81 IOCAL   EQU    0F5H    ;ADDRESS OF CALIBRATION CONTROLS
00F6        =  82 IOAUX   EQU    0F6H    ;ADDRESS OF AUXILLARY INPUTS
00F7        =  83 IODPSW  EQU    0F7H    ;ADDRESS OF DIP SWITCH INPUTS
            =  84
            =  85 ; MASKS FOR OPERATOR CONTROLS
            =  86 ;    UNLESS OTHERWISE NOTED, THE SENSE OF THESE
            =  87 ;    STATUS POINTS ARE INVERTED WHEN INPUT
            =  88
0001        =  89 NEXPSE  EQU    001H    ;MASK FOR EXPOSE BUTTON - 1 WHEN EXPOSE NOT PRESSED
0002        =  90 VWDRCL  EQU    002H    ;MASK FOR VIEW DOOR SWITCH - 1 WHEN VIEW DOOR CLOSED
0004        =  91 NDRKSL  EQU    004H    ;MASK FOR DARK SLIDE SWITCH - 1 WHEN NO DARK SLIDE
0008        =  92 NOCASS  EQU    008H    ;MASK FOR NO CASSETTE SWITCH
0010        =  93 NCHNL1  EQU    010H    ;MASK FOR CHANNEL 1 SWITCH
0020        =  94 NCHNL2  EQU    020H    ;MASK FOR CHANNEL 2 SWITCH
0040        =  95 NCHNL3  EQU    040H    ;MASK FOR CHANNEL 3 SWITCH
0080        =  96 NCHNL4  EQU    080H    ;MASK FOR CHANNEL 4 SWITCH
            =  97
            =  98 ; MASKS FOR CALIBRATION CONTROLS
            =  99 ;    UNLESS OTHERWISE NOTED, THE SENSE OF THESE
            = 100 ;    STATUS POINTS ARE INVERTED WHEN INPUT
            = 101
0001        = 102 BRUP    EQU    001H    ;MASK FOR BRIGHTNESS UP SWITCH
0002        = 103 BRDWN   EQU    002H    ;MASK FOR BRIGHTNESS DOWN SWITCH
0004        = 104 CNTUP   EQU    004H    ;MASK FOR CONTRAST UP TOGGLE
0008        = 105 CNTDWN  EQU    008H    ;MASK FOR CONTRAST DOWN TOGGLE
0010        = 106 INDEX   EQU    010H    ;MOVE MONITOR WITHOUT EXPOSING FILM
0020        = 107 POSTVE  EQU    020H    ;MASK FOR POSITIVE SWITCH - NORMAL LOGIC
0040        = 108 STORE   EQU    040H    ;MASK FOR STORE PUSHBUTTON
0080        = 109 EMUL    EQU    080H    ;EMULSION CONTROL (0=EMULSSION DOWN) - E4/E5 STRAP
            = 110
            = 111 ; MASKS FOR AUXILLARY INPUTS
            = 112
0001        = 113 DS2     EQU    001H    ;DIP SWITCH 2
0002        = 114 DS1     EQU    002H    ;DIP SWITCH 1 - 0 FOR NORMAL MODE
            = 115                ;                    1 FOR TEST MODE
            = 116 ; EXPOSURE CONTROL (2 BITS)
            = 117 ;    00 = 9 EXPOSURES
            = 118 ;    01 = 6 EXPOSURES
            = 119 ;    10 = 4 EXPOSURES
            = 120 ;    11 = 6 EXPOSURES
0004        = 121 NEXP1   EQU    004H    ;EXPOSURE CONTROL E9/E11 STRAP
0008        = 122 NEXP2   EQU    008H    ;EXPOSURE CONTROL E10/E11 STRAP
            = 123
```

```
000C        = 124 EXPCTL   EQU    0CH      ;EXPOSURE COUNT MASK
0008        = 125 EXP4     EQU    08H      ;STRAPS FOR 4 EXPOSURES
0004        = 126 EXP6     EQU    04H      ;STRAPS FOR 6 EXPOSURES
000C        = 127 EXP6A    EQU    0CH      ;ALTERNATE STRAPS FOR 6 EXPOSURES
0000        = 128 EXP9     EQU    0        ;STRAPS FOR 9 EXPOSURES
            = 129
            = 130 ; COUNTING SEQUENCE CONTROL
            = 131 ;    00 = OPTION 2 SEQUENCE
            = 132 ;    01 = OPTION 1 SEQUENCE
            = 133 ;    10 = STANDARD COUNTING SEQUENCE
            = 134 ;    11 = STANDARD COUNTING SEQUENCE
0010        = 135 CONFG1   EQU    010H     ;COUNTING SEQUENCE CONTROL E6/E8 STRAP
0020        = 136 CONFG2   EQU    020H     ;COUNTING SEQUENCE CONTROL E7/E8 STRAP
0040        = 137 SPR1     EQU    040H     ;SPARE 1
0080        = 138 SPR2     EQU    080H     ;SPARE 2
            = 139
            = 140 ; DIP SWITCH INPUTS
            = 141
0001        = 142 DS10     EQU    001H     ;DIP SWITCH 10
0002        = 143 DS9      EQU    002H     ;DIP SWITCH 9
0004        = 144 DS8      EQU    004H     ;DIP SWITCH 8
0008        = 145 DS7      EQU    008H     ;DIP SWITCH 7
0008        = 146 RSTRBL   EQU    008H     ;RASTER BLEND ENABLE - ON TO ENABLE
0010        = 147 DS6      EQU    010H     ;DIP SWITCH 6
0020        = 148 DS5      EQU    020H     ;DIP SWITCH 5
0040        = 149 DS4      EQU    040H     ;DIP SWITCH 4
0080        = 150 DS3      EQU    080H     ;DIP SWITCH 3, ON ENABLES CYCLING
            = 151 ;
            = 152 ; DISPLAY MODE DEFINITIONS
            = 153 ;    CONTROL WORD ASSIGNMENTS
            = 154 ;
0000        = 155 SHUTDN   EQU    0        ;DISPLAY IN SHUTDOWN MODE
0010        = 156 NORMAL   EQU    010H     ;DISPLAY IN NORMAL MODE
0000        = 157 DECODE   EQU    0        ;DECODE MODE
0020        = 158 NDECDE   EQU    020H     ;NO DECODE MODE
0000        = 159 BDEC     EQU    0        ;B CODE DECODE
0040        = 160 HEXDEC   EQU    040H     ;HEX DECODE
0000        = 161 NODATA   EQU    0        ;NO DATA TO FOLLOW
0080        = 162 DATA     EQU    080H     ;DATA TO FOLLOW CONTROL WORD
            = 163
            = 164 ; DISPLAY MODE WORD
            = 165 ;    DISPLAY IS ALWAYS USED IN NO DECODE MODE WITH
            = 166 ;    DATA FOLLOWING THE CONTROL BYTE
            = 167
0040        = 168 CNTRLM   EQU    040H     ;OR TO PORT 2 FOR CONTROL MODE
00BF        = 169 DATAM    EQU    0BFH     ;AND TO PORT 2 FOR DATA MODE
00F0        = 170 DSPMDE   EQU    0F0H
0008        = 171 NDIGIT   EQU    8        ;8 DIGIT DISPLAY
000A        = 172 SLWCNT   EQU    10       ;NO. OF CYCLES AT SLOW COUNT
000A        = 173 SLWRTE   EQU    10       ;NO. OF SYNC PULSES PER SLOW RATE UPDATE
0001        = 174 FSTRTE   EQU    1        ;NO. OF SYNC PULSES PER FAST RATE UPDATE
            = 175
            = 176 ; SEVEN SEGMENT PATTERNS
            = 177
00FB        = 178 PTRN0    EQU    0FBH
00B0        = 179 PTRN1    EQU    0B0H
00ED        = 180 PTRN2    EQU    0EDH
00F5        = 181 PTRN3    EQU    0F5H
00B6        = 182 PTRN4    EQU    0B6H
00D7        = 183 PTRN5    EQU    0D7H
```

```
00DF        = 184 PTRN6   EQU     0DFH
00F0        = 185 PTRN7   EQU     0F0H
00FF        = 186 PTRN8   EQU     0FFH
00F7        = 187 PTRN9   EQU     0F7H
00FE        = 188 PTRNA   EQU     0FEH
009F        = 189 PTRNB   EQU     09FH
00CB        = 190 PTRNC   EQU     0CBH
00BD        = 191 PTRND   EQU     0BDH
00CF        = 192 PTRNE   EQU     0CFH
00CE        = 193 PTRNF   EQU     0CEH
            = 194
            = 195 ; CAMERA CONTROL OUTPUTS
            = 196 ;     ALL CONTROLOUTPUTS EXCEPT SHUTTER ARE ON PORT 6;
            = 197 ;     THE SHUTTER IS ON PORT 2
            = 198
            = 199 ; MASKS FOR CAMERA CONTROLS
            = 200
0004        = 201 BLANK   EQU     04H     ;BLANK MONITOR CONTROL (PNT 62)
0001        = 202 ONEXP   EQU     01H     ;READY TO EXPOSE LED (PNT 60)
00FE        = 203 OFFEXP  EQU     0FEH    ;AND TO TURN OFF EXPOSE LED
000D        = 204 SPKR0   EQU     0DH     ;AND TO PORT 1 TO TURN THE BEEPER OFF
0002        = 205 SPKR1   EQU     02H     ;OR TO PORT 1 TO TURN BEEPER ON (PNT 62)
0008        = 206 RSTBLD  EQU     08H     ;RASTER BLEND CONTROL (PNT 63)
0004        = 207 INCTRL  EQU     BLANK   ;INITIAL CONTROL SETTING
007F        = 208 SHTR0   EQU     07FH    ;AND TO CLOSE SHUTTER
0080        = 209 SHTR1   EQU     080H    ;OR TO OPEN SHUTTER
0002        = 210 TEXPBP  EQU     2       ;LENGTH OF EXPOSURE BEEP
0004        = 211 TENDBP  EQU     4       ;LENGHT OF END OF CARTRIDGE BEEP
            = 212
            = 213 ; VIDEO CHANNEL/SOURCE SELECTION - PORT 7
            = 214 ;     BITS 0 AND 1 SELECT CHANNEL
            = 215 ;     BITS 2 AND 3 SELEC SOURCE AS FOLLOWS
            = 216
000C        = 217 CHNLCL  EQU     0CH     ;AND TO PORT 7 TO CLEAR CHANNEL SELECT
0000        = 223 BPISS   EQU     0       ;BACK PORCH SIGNAL SAMPLE
0004        = 224 HISS    EQU     04H     ;HIGH IMAGE SIGNAL SAMPLE
0008        = 225 LISS    EQU     08H     ;LOW IMAGE SIGNAL SAMPLE
000C        = 227 VUSER   EQU     0CH     ;USER VIDEO
0003        = 228 VCLR    EQU     03H     ;AND TO PORT 7 TO CLEAR VIDEO SELECTION
            = 229
            = 230 ; MOTOR CONTROL PARAMETERS
            = 231
0064        = 232 HMPWM1  EQU     064H    ;PWM FOR FIRST HOME MOTION
0064        = 233 HMPWM2  EQU     064H    ;PWM FOR SECOND HOME MOTION
0038        = 234 INPWM   EQU     038H    ;INITIAL PWM VALUE
0018        = 235 SLOPWM  EQU     018H    ;INITIAL PWM VALUE FOR LOW SPEED
0008        = 236 INCRTE  EQU     08H     ;INCREMENT TO PWM TO INCREASE SPEED
FFF8        = 237 DECRTE  EQU     -08H    ;DECREMENT TO PWM TO DECREASE SPEED
0004        = 238 NTRIES  EQU     4       ;MAX # OF TRIES TO REACH TARGET POSITION
            = 239
            = 240 ; ENCODER IS READ ON PORT 1; MASKS ARE AS FOLLOWS
            = 241
0001        = 242 PHI1A   EQU     001H    ;MASK FOR PHASE 1 TRACK - MOTOR A
0002        = 243 PHI2A   EQU     002H    ;MASK FOR PHASE 2 TRACK - MOTOR A
0010        = 244 PHI1B   EQU     010H    ;MASK FOR PHASE 1 TRACK - MOTOR B
0020        = 245 PHI2B   EQU     020H    ;MASK FOR PHASE 2 TRACK - MOTOR B
0004        = 246 HMBITA  EQU     004H    ;MASK FOR MOTOR A HOME BIT
0040        = 247 HMBITB  EQU     040H    ;MASK FOR MOTOR B HOME BIT
            = 248
            = 249 ; MASKS FOR DAC OPERATION
            = 250
```

```
0080        = 251 ALLOUT  EQU    080H     ;ALL 8255 PORTS ARE OUTPUT
            = 252
            = 253 ; NITRON I/O DEFINITIONS
            = 254 ;     INSTRUCTIONS (C1-C3) ARE ON P50-P52
            = 255 ;     CLOCK PULSE IS ON P53
            = 256 ;     DATA IS ON P17
            = 257
0008        = 258 CLKPLS  EQU    08H      ;OR TO PORT 5 TO SET CLOCK PULSE
007F        = 259 DAT0    EQU    07FH     ;AND TO PORT 1 TO CLEAR DATA
0080        = 260 DAT1    EQU    080H     ;OR TO PORT 1 TO SET DATA
            = 261
            = 262 ;     MODE INSTRUCTIONS
            = 263
0000        = 264 STUPMD  EQU    0H       ;SET UP MODE
0001        = 265 ADDRMD  EQU    01H      ;ADDRESS MODE
0002        = 266 WRTEMD  EQU    02H      ;WRITE MODE
0003        = 267 READMD  EQU    03H      ;READ MODE
0004        = 268 ERASMD  EQU    04H      ;ERASE MODE
0005        = 269 SINMD   EQU    05H      ;SERIAL DATA INPUT MODE
0006        = 270 SOUTMD  EQU    06H      ;SERIAL DATA OUTPUT MODE
0007        = 271 STNDMD  EQU    07H      ;STAND-BYE MODE
            = 272
            = 273 ; NITRON STORAGE FORMAT
            = 279 ;     A 4 ELEMENT ARRAY STORES THE LOW/HIGH DENSITY INDEX DATA FOR
            = 280 ;     EACH CHANNEL. THE LOW/HIGH DENSITY INDEX DATA IS STORED FOR
            = 281 ;     NEGATIVE VIDEO IN THE FIRST 4 BYTES AND POSITIVE VIDEO IS STORED
            = 282 ;     IN THE NEXT 4 BYTES.
            = 284 $EJECT
              285 $INCLUDE (:F1:RAMDEF.SRC)
            = 286
            = 287 ; RAM DEFINITIONS
            = 288
001C        = 289         ORG    01CH
001C        = 290 PARADR  EQU    $
001C        = 291 SAREG   EQU    $         ;SUCCESSIVE APPROXIMATION REGISTER
001C        = 292 PMSB:   DS     1         ;POSITION MOST SIGNIFICANT BYTE (R4 - RB1)
001D        = 293 PLSB:   DS     1         ;POSITION LEAST SIGNIFICANT BYTE (R5 -RB1)
001E        = 294 DCNTR:  DS     1         ;DISTANCE COUNTER (R6 - RB1)
001F        = 295 TMOUT:  DS     1         ;TIMEOUT COUNTER (R7 - RB1)
0020        = 296 TSTNO   EQU    $         ;CURRENT TEST NO.
0020        = 297 LSTCNT: DS     2         ;LAST READING CONTRAST DAC
0022        = 298 CALSW:  DS     1         ;CALIBRATION SWITCH STATUS
0023        = 299 CMRAST: DS     1         ;CURRENT CAMERA STATUS
            = 300                          ; BIT 7=0 IF MONITOR POSITIONED FOR EXPOSURE
            = 301                          ;     =1 IF MONITOR MOTION REQUIRED BEFORE EXPOSURE
            = 302                          ; BITS 6 THRU 4 CONTAINS A COUNT OF REMAINING EXPOSURES
            = 303                          ; BITS 2 & 3 IDENTIFY THE VIDEO SOURCE CHANNEL
            = 304                          ; BIT 1 IS 0 FOR NEGATIVE EXPOSURE VIDEO; 1 FOR POSITIVE VIDEO
0024        = 305 CALRDY: DS     1         ;CALIBRATION COMPLETE
0025        = 306 YCORR:  DS     1         ;CORRECTION TO Y POSITION FOR NEXT MOVEMENT
0026        = 307 XCOOR:  DS     1         ;CORRECTION TO X POSITION FOR NEXT MOVEMENT
0027        = 308 LSTPHT  EQU    $         ;LAST PHOTOMETER READING
0027        = 309 RCFLAG  EQU    $         ;RASTER COMP FLAG IN MS NIBBLE
0027        = 310 ZCROSS: DS     1         ;ZERO CROSSING COUNTER IN LS NIBBLE
0028        = 311 QUAD:   DS     1         ;ENCODER QUADRATURE BITS
0029        = 321 LOCNTR: DS     1         ;SYNC COUNT FOR LOW DENSITY DISPLAY UPDATE
002A        = 322 LOCYC:  DS     1         ;NO. OF CYCLES AT SLOW RATE
002B        = 323 EXPTME  EQU    $         ;EXPOSURE TIME
002B        = 324 LDNSTY: DS     2         ;LOW DENSITY INDEX
002D        = 325 HICNTR: DS     1         ;SYNC COUNT FOR HI DENSITY DISPLAY UPDATE
002E        = 326 HICYC:  DS     1         ;NO. OF CYCLES AT FAST RATE
```

```
002F        = 327 HDNSTY: DS    2        ;HI DENSITY INDEX
0031        = 329 DSPBFR: DS    8        ;8 BYTE DISPLAY BUFFER
0031        = 330 PHOTDS  EQU   DSPBFR   ;PHOTOMETER/DIAGNOSTIC DISPLAY BUFFER
0033        = 335 LODS    EQU   DSPBFR+2 ;LOW DENSITY DISPLAY BUFFER
0036        = 336 HIDS    EQU   DSPBFR+5 ;HI DENSITY DISPLAY BUFFER
0036        = 338 EVSDS   EQU   DSPBFR+5 ;EXPOSURES IN VS DISPLAY
0039        = 339 LOPHTR: DS    1        ;READING FROM PHOTOMETER LOW RANGE
003A        = 340 HIPHTR: DS    1        ;READING FROM PHOTOMETER HIGH RANGE
003B        = 341 DACMSB: DS    1        ;MS BYTE DAC CONTROL
003C        = 342 DACBR:  DS    1        ;LS BYTE BRIGHTNESS DAC
003D        = 343 DACCNT: DS    1        ;LS BYTE CONTRAST DAC
003E        = 344 TEMP:   DS    2        ;TEMPORARY STORAGE
            = 345 $EJECT
              346 $INCLUDE (:F1:MNCTRL.SRC)
            = 347
0000        = 348         ORG   00H
0000 15     = 349         DIS   I        ;DISABLE INTERUPTS FOR TESTING
0001 0420   = 350         JMP   MNCTRL   ;MAIN CONTROL PROGRAM
0003 64C2   = 351         JMP   INTSR    ;INTERRUPT SERVICE ROUTINE
            = 352
            = 353 ; COPYRIGHT STATEMENT
            = 354
0005 28432920 = 355       DB    '(C) 1981 Dunn Systems, Inc.'
0009 31393831
000D 2044756E
0011 6E205379
0015 7374656D
0019 732C2049
001D 6E632E
            = 356 ;
            = 357 ; MAIN CONTROL LOOP
            = 358 ;
0020 C5     = 359 MNCTRL: SEL   RB0      ;REQUIRED FOR TESTING ONLY
0021 23F7   = 360         MOV   A,#0F7H  ;SELECT 8243
0023 39     = 361         OUTL  P1,A
0024 27     = 362         CLR   A
0025 3C     = 363         MOVD  P4,A     ;STOP THE MOTORS
0026 3A     = 364         OUTL  P2,A     ;CLOSE SHUTTER
0027 B81C   = 365         MOV   R0,#PARADR ;PARAMETER AREA PNTR
0029 BA20   = 366         MOV   R2,#32
002B A0     = 367 MN1:    MOV   @R0,A    ;CLEAR THE
002C 18     = 368         INC   R0       ;PARAMETER MEMORY
002D EA2B   = 369         DJNZ  R2,MN1
002F 5400   = 370         CALL  GTCMST   ;INITIALIZE CAMERA STATUS
0031 B466   = 371         CALL  CDATA    ;GET INITIAL NITRON DATA
0033 B4DE   = 372         CALL  INDAC    ;INITIALIZE THE DACS
0035 B4B9   = 373         CALL  IN8253   ;INITIALIZE THE 8253
0037 B400   = 374 MN2:    CALL  CHKTST   ;ARE WE IN THE TEST MODE?
0039 27     = 375         CLR   A        ;START WITH THE
003A 3C     = 376         MOVD  P4,A     ;MOTORS OFF
003B B824   = 377         MOV   R0,#CALRDY
003D A0     = 378         MOV   @R0,A
003E 2304   = 379         MOV   A,#INCTRL ;PUT THE CAMERA CONTROLS
0040 3E     = 380         MOVD  P6,A     ;IN INITIAL CONDITIONS
0041 7400   = 381         CALL  HOME     ;HOME THE CAMERA
0043 B923   = 382         MOV   R1,#CMRAST ;INITIALIZE EXPOSURE
0045 F1     = 383         MOV   A,@R1    ;FOR 0 REMAINING
0046 530F   = 384         ANL   A,#0FH   ;EXPOSURES
0048 A1     = 385         MOV   @R1,A
0049 B400   = 386 MN3:    CALL  CHKTST   ;CHECK FOR TEST MODE
```

| | | | | | |
|---|---|---|---|---|---|
| 004B B409 | = 387 | | CALL | CHKLNE | ;CHECK LINE VOLTAGE |
| 004D F45F | = 388 | | CALL | DSPLAY | |
| 004F B923 | = 389 | | MOV | R1,#CMRAST | ;GET THE |
| 0051 F1 | = 390 | | MOV | A,@R1 | ;# OF EXPOSURES |
| 0052 53F0 | = 391 | | ANL | A,#0F0H | ;REMAINING |
| 0054 AD | = 392 | | MOV | R5,A | |
| 0055 B8F7 | = 393 | | MOV | R0,#IODPSW | ;CHECK IF |
| 0057 80 | = 394 | | MOVX | A,@R0 | ;WE ARE CYCLING |
| 0058 F269 | = 395 | | JB7 | MN3A | ;BYPASS INTERLOCKS IF WE ARE |
| | = 396 | | | | |
| | = 397 | ; CYCLING - START THE OPERATION | | | |
| | = 398 | | | | |
| 005A FD | = 399 | | MOV | A,R5 | ;POSITIONED TO EXPOSE? |
| 005B C661 | = 400 | | JZ | MN3D | ;EXPOSE IF OK |
| 005D D3F0 | = 401 | | XRL | A,#0F0H | ;CHECK IF CASSETTE |
| 005F 9667 | = 402 | | JNZ | MN3C | ;INSERTED |
| 0061 34D1 | = 403 | MN3D: | CALL | NUMEXP | ;GET NUMBER OF EXPOSURES |
| 0063 31 | = 404 | | XCHD | A,@R1 | ;SET FOR |
| 0064 A1 | = 405 | | MOV | @R1,A | ;FIRST EXPOSURE |
| 0065 7477 | = 406 | | CALL | ADVANC | |
| 0067 2413 | = 407 | MN3C: | JMP | MN8 | ;NOW DO THE EXPOSURE |
| | = 408 | | | | |
| | = 409 | ; CHECK CASSETTE INSTALLED STATUS | | | |
| | = 410 | | | | |
| 0069 B8F4 | = 411 | MN3A: | MOV | R0,#IOOPR | ;GET THE OPERATOR |
| 006B 80 | = 412 | | MOVX | A,@R0 | ;CONTROLS AND |
| 006C 37 | = 413 | | CPL | A | |
| 006D 7282 | = 414 | | JB3 | MN4 | ;HAVE A CASSETTE |
| | = 415 | | | | |
| | = 416 | ; CASSETTE NOT INSTALLED | | | |
| | = 417 | | | | |
| 006F B831 | = 418 | | MOV | R0,#PHOTDS | ;CLEAR THE |
| 0071 B080 | = 419 | | MOV | @R0,#080H | ;STATUS DISPLAY |
| 0073 FD | = 420 | | MOV | A,R5 | |
| 0074 C67A | = 421 | | JZ | MN3B | ;EXPOSURES REMAINING? |
| 0076 D3F0 | = 422 | | XRL | A,#0F0H | ;CASSETTE |
| 0078 9637 | = 423 | | JNZ | MN2 | ;INSTALLED? |
| 007A 23F0 | = 424 | MN3B: | MOV | A,#0F0H | ;SET STATUS FOR NO CASSETTE |
| 007C 31 | = 425 | | XCHD | A,@R1 | ;UPDATE |
| 007D A1 | = 426 | | MOV | @R1,A | ;CAMERA STATUS |
| 007E BA01 | = 427 | | MOV | R2,#MSGNC | ;TELL THEM ABOUT THE CASSETTE |
| 0080 0489 | = 428 | | JMP | MN4B | ;AND WAIT UNTIL THEY GIVE US ONE |
| | = 429 | | | | |
| | = 430 | ; CASSETTE PRESENT | | | |
| | = 431 | | | | |
| 0082 32A2 | = 432 | MN4: | JB1 | MN5 | ;IGNORE CASSETTE PRESENT IF DOOR OPEN |
| 0084 FD | = 433 | | MOV | A,R5 | ;# OF EXPOSURES REMAINING |
| 0085 968D | = 434 | | JNZ | MN4A | ;CHECK IF EXPOSURES REMAINING |
| 0087 BA03 | = 435 | | MOV | R2,#MSGCF | ;CHANGE FILM |
| 0089 D4AC | = 436 | MN4B: | CALL | MSGE | ;MESSAGE IF NO |
| 008B 04A2 | = 437 | | JMP | MN5 | ;EXPOSURES REMAINING |
| 008D D3F0 | = 438 | MN4A: | XRL | A,#0F0H | ;POSITIONED |
| 008F 96A2 | = 439 | | JNZ | MN5 | ;FOR EXPOSURE |
| 0091 F1 | = 440 | | MOV | A,@R1 | |
| 0092 34D1 | = 441 | | CALL | NUMEXP | ;GET NUMBER OF EXPOSURES |
| 0094 31 | = 442 | | XCHD | A,@R1 | ;MERGE WITH REMAINDER OF STATUS |
| 0095 A1 | = 443 | | MOV | @R1,A | ;AND UPDATE THE STATUS |
| 0096 BA00 | = 444 | | MOV | R2,#MSGBLK | ;BLANK THE |
| 0098 D4AC | = 445 | | CALL | MSGE | ;STATUS DISPLAY |
| 009A F45F | = 446 | | CALL | DSPLAY | ;DURING MOTION |

```
009C 7477     = 447          CALL   ADVANC         ;MOVE TO THE FIRST EXPOSURE POSITION
009E B824     = 448          MOV    R0,#CALRDY     ;START AN
00A0 B0C0     = 449          MOV    @R0,#0C0H      ;AUTOCOMP CYCLE
              = 450
              = 451 ; VIEW DOOR CHECK
              = 452
00A2 B8F4     = 453 MN5:     MOV    R0,#IUOPR
00A4 B924     = 454          MOV    R1,#CALRDY
00A6 80       = 455          MOVX   A,@R0
00A7 AF       = 456          MOV    R7,A           ;CHECK IF THE
00A8 32D9     = 457          JB1    MN6            ;VIEW DOOR IS OPEN
              = 458
              = 459 ;VIEW DOOR OPEN
              = 460
00AA F1       = 461          MOV    A,@R1          ;CHECK IF SA
00AB D2B3     = 462          JB6    MN5C           ;AUTOCOMP IN PROGRESS
00AD 230C     = 463          MOV    A,#VUSER       ;AND SELECT
00AF 8F       = 464          ORLD   P7,A           ;USER VIDEO
00B0 23FB     = 465          MOV    A,#NOT BLANK   ;UNBLANK THE MONITOR
00B2 9E       = 466          ANLD   P6,A           ;SO HE CAN SEE IT
00B3 BA02     = 467 MN5C:    MOV    R2,#MSGUD      ;TELL ABOUT
00B5 D4AC     = 468          CALL   MSGE           ;THE OPEN VIEW DOOR
00B7 FF       = 474          MOV    A,R7           ;HAVE THEY PUT
00B8 72EA     = 475          JB3    MN6Z           ;A CASSETTE IN YET?
00BA 37       = 476          CPL    A              ;DARK SLIDE
00BB 52CB     = 477          JB2    MN5B           ;HAS BEEN REMOVED
00BD BA04     = 478          MOV    R2,#MSGFF      ;TELL THE OPERATOR
00BF D4AC     = 479          CALL   MSGE           ;ABOUT THE FOGGED FILM
00C1 C6EA     = 480          JZ     MN6Z
00C3 BC0A     = 481          MOV    R4,#10
00C5 BA1E     = 482 MN5A:    MOV    R2,#30
00C7 D4E5     = 483          CALL   BEEP
00C9 ECC5     = 484          DJNZ   R4,MN5A
00CB B823     = 485 MN5B:    MOV    R0,#CMRAST     ;MONITOR
00CD F0       = 486          MOV    A,@R0          ;POSITIONED FOR
00CE 53F0     = 487          ANL    A,#0F0H        ;EXPOSURE?
00D0 C6EA     = 488          JZ     MN6Z
00D2 F45F     = 489          CALL   DSPLAY         ;DISPLAY IT NOW
00D4 23FE     = 490          MOV    A,#OFFEXP      ;AND TURN OFF
00D6 9E       = 491          ANLD   P6,A           ;THE EXPOSE LED
00D7 0437     = 492          JMP    MN2            ;MOVE IT TO HOME
              = 494
              = 495 ; VIEW DOOR CLOSED
              = 496
00D9 F1       = 497 MN6:     MOV    A,@R1          ;CYCLE
00DA 53C0     = 498          ANL    A,#0C0H        ;IN
00DC C6E2     = 499          JZ     MN6T           ;PROGRESS?
00DE D3C0     = 500          XRL    A,#0C0H
00E0 96E7     = 501          JNZ    MN6A
              = 502
              = 503 ;        BLANK MONITOR IF NO AUTOCOMP
              = 504
00E2 2304     = 505 MN6T:    MOV    A,#BLANK       ;MONITOR IS BLANKED WHEN NOT
00E4 8E       = 506          ORLD   P6,A           ;IN POSITION TO TAKE PICTURE
00E5 04EA     = 507          JMP    MN6Z
              = 508
              = 509 ;        MONITOR UNBLANKED FOR AUTOCOMP
              = 510
00E7 23FB     = 511 MN6A:    MOV    A,#NOT BLANK
00E9 9E       = 512          ANLD   P6,A
              = 513
```

```
                  = 514 ; CALIBRATION CONTROLS AND AUTOCMP
                  = 515
00EA 5424         = 516 MN6Z:  CALL    CACHNL          ;GET THE CALIBRATION CHANNEL
00EC 5438         = 517         CALL    CALIB           ;DO THE CALIBRATION
00EE D400         = 518         CALL    VSYNC
00F0 FA           = 519         MOV     A,R2            ;SKIP AUTOCOMP
00F1 C6F9         = 520         JZ      MN6W            ;IF VERTICAL SYNC NOT PRESENT
00F3 F5           = 521 MN6X:  SEL     MB1
00F4 1423         = 522         CALL    AUTCMP
00F6 E5           = 523         SEL     MB0
00F7 BA01         = 524         MOV     R2,#1
00F9              = 525 MN6W:  EQU     $
00F9 2400         = 531         JMP     MN6B            ;GO TO THE NEXT PAGE
                  = 535 $EJECT
                  = 536
                  = 537 ; POSITIONED FOR EXPOSURE?
                  = 538
0100              = 539         ORG     0100H
0100 B923         = 540 MN6B:  MOV     R1,#CMRAST      ;GET #
0102 F1           = 541         MOV     A,@R1           ;OF REMAINING
0103 53F0         = 542         ANL     A,#0F0H         ;EXPOSURES
0105 C695         = 543         JZ      MN21            ;LOOP IF NO EXPOSURES REMAINING
0107 D3F0         = 544         XRL     A,#0F0H         ;OR NO
0109 C695         = 545         JZ      MN21            ;CASSETTE
                  = 546
                  = 547 ; CHECK FOR INDEX OPERATION
                  = 548
010B 34E5         = 549 MN7:   CALL    CHKIDX          ;CHECK FOR
010D 9664         = 550         JNZ     MN12            ;INDEXING OPERATION
                  = 551
                  = 552 ; CHECK IF READY TO EXPOSE
                  = 553
010F 349E         = 554         CALL    CHKEXP
0111 C695         = 555         JZ      MN21
                  = 556
                  = 557 ; ACCEPT EXPOSE COMMAND
                  = 558
0113 B923         = 559 MN8:   MOV     R1,#CMRAST
0115 F1           = 560         MOV     A,@R1
0116 47           = 561         SWAP    A
0117 530F         = 562         ANL     A,#0FH
0119 030C         = 563         ADD     A,#MSGEXP       ;COMPUTE THE
011B AA           = 564         MOV     R2,A            ;EXPOSURE NUMBER
011C D4AC         = 565         CALL    MSGE            ;AND TELL THE OPERATOR
011E F45F         = 566         CALL    DSPLAY
0120 2301         = 567         MOV     A,#ONEXP        ;AND TELL THE WORLD
0122 8E           = 568         ORLD    P6,A            ;WE'RE READY TO GO
0123 B8F7         = 569         MOV     R0,#IODPSW      ;CHECK IF
0125 80           = 570         MOVX    A,@R0           ;CAMERA
0126 F22E         = 571         JB7     MN8F            ;MODE
0128 BAFA         = 572         MOV     R2,#250         ;DELAY SO
012A F458         = 573         CALL    DELAY           ;THEY CAN SEE
012C 2431         = 574         JMP     MN9             ;IT CYCLE
012E FF           = 575 MN8F:  MOV     A,R7            ;HAS ANYONE PUSHED
012F 129C         = 576         JB0     MN22            ;THE EXPOSE BUTTON
                  = 577
                  = 578 ; EXPOSE
                  = 579
0131 23FE         = 580 MN9:   MOV     A,#OFFEXP       ;TURN OFF THE
0133 9E           = 581         ANLD    P6,A            ;EXPOSE LED
```

```
0134 D400   = 582        CALL   VSYNC          ;WAIT FOR A VERTICAL SYNC
0136 2304   = 583        MOV    A,#BLANK
0138 8E     = 584        ORLD   P6,A
0139 8A80   = 585        ORL    P2,#SHTR1      ;OPEN THE SHUTTER
013B BC04   = 586        MOV    R4,#SHTRDL     ;WAIT
013D 34E0   = 587        CALL   DVSYNC         ;4 SYNC PULSES
013F B8F7   = 588        MOV    R0,#IODPSW
0141 80     = 589        MOVX   A,@R0
0142 5380   = 590        ANL    A,#DS3
0144 C64D   = 591        JZ     MN11
0146 B8F4   = 592        MOV    R0,#IOOPR      ;WAIT FOR
0148 80     = 593 MN10:  MOVX   A,@R0          ;THE RELEASE OF
0149 5301   = 594        ANL    A,#NEXPSE      ;THE EXPOSE
014B C648   = 595        JZ     MN10           ;BUTTON
014D B4EC   = 596 MN11:  CALL   EXPTM          ;GET THE EXPOSURE TIME
014F D400   = 597        CALL   VSYNC
0151 230C   = 598        MOV    A,#VUSER       ;SELECT USER VIDEO
0153 8F     = 599        ORLD   P7,A           ;VIDEO
0154 23FB   = 600        MOV    A,#NOT BLANK   ;SHOULD ALREADY BE BLANKED
0156 9E     = 601        ANLD   P6,A           ;IN NORMAL MODE - CYCLE?
0157 34E0   = 602        CALL   DVSYNC         ;WAIT FOR EXPOSURE TIME
0159 2304   = 603        MOV    A,#BLANK       ;BLANK THE
015B 8E     = 604        ORLD   P6,A           ;MONITOR
015C B492   = 605        CALL   PHTMTR         ;DISPLAY BRIGHTNESS
015E 9A7F   = 606        ANL    P2,#SHTRO      ;AND CLOSE
0160 BC04   = 607        MOV    R4,#SHTRDL     ;WAIT FOR THE
0162 34E0   = 608        CALL   DVSYNC         ;SHUTTER TO CLOSE
0164 BC02   = 609 MN12:  MOV    R4,#TEXPBP
0166 BA3C   = 610 MN12A: MOV    R2,#60         ;USE A HIGH PITCH TONE
0168 D4E5   = 611        CALL   BEEP           ;TELL THE WORLD
016A EC66   = 612        DJNZ   R4,MN12A
016C B923   = 613        MOV    R1,#CMRAST     ;DECREMENT THE
016E F1     = 614        MOV    A,@R1          ;EXPOSURE
016F 03F0   = 615        ADD    A,#0F0H        ;COUNT
0171 A1     = 616        MOV    @R1,A          ;CHECK IF
0172 53F0   = 617        ANL    A,#0F0H
0174 C68B   = 618        JZ     MN13           ;MORE EXPOSURES
0176 7477   = 619        CALL   ADVANC         ;ADVANCE THE MONITOR IF
0178 A5     = 620        CLR    F1             ;BRIGHTNESS SELECT
0179 B823   = 621        MOV    R0,#CMRAST     ;GET THE
017B F0     = 622        MOV    A,@R0          ;CAMERA STATUS
017C 37     = 623        CPL    A
017D 3280   = 624        JB1    MN12B          ;AND SET
017F B5     = 625        CPL    F1             ;IF REVERSE
0180 F5     = 626 MN12B: SEL    MB1
0181 14EB   = 627        CALL   SELVID         ;SELECT VIDEO
0183 E5     = 628        SEL    MB0
0184 BE14   = 629        MOV    R6,#20         ;WAIT 20 VS FOR THINGS TO SETTLE DOWN
0186 23FB   = 630        MOV    A,#NOT BLANK
0188 9E     = 631        ANLD   P6,A
0189 0449   = 632        JMP    MN3            ;MORE EXPOSURES
018B BC04   = 633 MN13:  MOV    R4,#TENDBP
018D BA64   = 634 MN14:  MOV    R2,#100        ;A LOW PITCH TONE
018F D4E5   = 635        CALL   BEEP           ;TONE
0191 EC8D   = 636        DJNZ   R4,MN14
0193 0437   = 637        JMP    MN2            ;AND START ALL OVER AGAIN
            = 638
            = 639 ; CHECK FOR INVALID EXPOSE COMMAND
            = 640
0195 FF     = 641 MN21:  MOV    A,R7
```

```
0196 129C    = 642         JB0    MN22          ;EXPOSE PRESSED
0198 BA00    = 643         MOV    R2,#0
019A D4E5    = 644         CALL   BEEP          ;HE'S WASTING HIS TIME
019C 0449    = 645 MN22:   JMP    MN3           ;RETURN TO THE START
             = 646
             = 647 ; CHECK IF READY TO EXPOSE
             = 648
019E FA      = 649 CHKEXP: MOV   A,R2           ;CHECK FOR
019F C6C3    = 650         JZ    CHKEX1         ;NO PICTURE
01A1 BA06    = 651         MOV   R2,#MSGDD      ;PUT UP DARK SLIDE MESSAGE
01A3 FF      = 652         MOV   A,R7           ;GET OPERATOR CONTROLS
01A4 37      = 653         CPL   A
01A5 52CA    = 654         JB2   CHKEX2         ;DARK SLIDE PRESENT?
01A7 B924    = 655         MOV   R1,#CALRDY     ;CALIBRATION
01A9 F1      = 656         MOV   A,@R1          ;STATUS
01AA 37      = 657         CPL   A
01AB BA09    = 658         MOV   R2,#MSGOR      ;PREPARE FOR OVER-RANGE MESSAGE
01AD C6CA    = 659         JZ    CHKEX2         ;OVER-RANGE
01AF BA0B    = 660         MOV   R2,#MSGAF      ;PREPARE FOR AUTOCOMP-FAIL MESSAGE
01B1 07      = 661         DEC   A
01B2 C6CA    = 662         JZ    CHKEX2         ;AUTOCOMP FAIL?
01B4 BA0A    = 666         MOV   R2,#MSGNO      ;PREPARE FOR BAD DENSITY INDEX VALUES
01B6 07      = 668         DEC   A
01B7 C6CA    = 669         JZ    CHKEX2         ;UNDER-RANGE?
01B9 F1      = 670         MOV   A,@R1          ;CALIBRATION STATUS
01BA BA08    = 671         MOV   R2,#MSGAC
01BC 53C0    = 672         ANL   A,#0C0H        ;DON'T DO
01BE D340    = 673         XRL   A,#040H        ;EXPOSE WHEN
01C0 C6CA    = 674         JZ    CHKEX2         ;CALIBRATION IN PROGRESS
01C2 83      = 675         RET
             = 676
01C3 FF      = 677 CHKEX1: MOV   A,R7           ;OPEN DOOR MESSAGE
01C4 5302    = 678         ANL   A,#VWDRCL      ;HAS HIGHER PRIORITY
01C6 C6D0    = 679         JZ    CHKEX3         ;THAN NO PICTURE MESSAGE
01C8 BA05    = 680         MOV   R2,#MSGNP      ;PUT UP THE NO PICTURE STATUS
01CA D4AC    = 681 CHKEX2: CALL  MSGE           ;DISPLAY THE STATUS
01CC 23FE    = 682         MOV   A,#0FFEXP      ;TURN OFF THE
01CE 9E      = 683         ANLD  P6,A           ;EXPOSE LED
01CF 27      = 684         CLR   A
01D0 83      = 685 CHKEX3: RET
             = 686
             = 687 ; GET NUMBER OF EXPOSURES
             = 688
01D1 B8F6    = 689 NUMEXP: MOV   R0,#IOAUX
01D3 80      = 690         MOVX  A,@R0
01D4 77      = 691         RR    A
01D5 77      = 692         RR    A
01D6 5303    = 693         ANL   A,#03H
01D8 03DC    = 694         ADD   A,#EXPTBL MOD 256
01DA A3      = 695         MOVP  A,@A
01DB 83      = 696         RET
             = 697
01DC 90      = 698 EXPTBL: DB    090H
01DD 60      = 699         DB    060H
01DE 40      = 700         DB    040H
01DF 60      = 701         DB    060H
             = 702
             = 703 ; WAIT FOR SPECIFIED # OF VERTICAL SYNC TIMES
             = 704 ;         R4 CONTAINS VERTICAL SYNC TIMES
             = 705
```

```
01E0 D400    = 706 DVSYNC: CALL    VSYNC
01E2 ECE0    = 707         DJNZ    R4,DVSYNC
01E4 83      = 708         RET
             = 709
             = 710 ; CHECK FOR INDEXING OPERATION
             = 711
01E5 B824    = 712 CHKIDX: MOV     R0,#CALRDY       ;DON'T
01E7 F0      = 713         MOV     A,@R0            ;ALLOW INDEXING
01E8 53C0    = 714         ANL     A,#0C0H
01EA D340    = 715         XRL     A,#040H
01EC C6F7    = 716         JZ      CHKID1
01EE B8F5    = 717         MOV     R0,#IOCAL        ;GET THE
01F0 80      = 718         MOVX    A,@R0            ;INDEX BIT
01F1 92F7    = 719         JB4     CHKID1
01F3 23FE    = 720         MOV     A,#0FFEXP
01F5 9E      = 721         ANLD    P6,A
01F6 83      = 722         RET
01F7 27      = 723 CHKID1: CLR     A
01F8 83      = 724         RET
             = 725 $EJECT
               726 $INCLUDE (:F1:CALIN.SRC)
             = 727
             = 728 ; CALIBRATION SUBROUTINE
             = 729 ;     A THRU R5 MODIFIED
             = 730
0200         = 731         ORG     0200H
0200 B8F4    = 732 GTCMST: MOV     R0,#IOOPR        ;GET THE
0202 80      = 733         MOVX    A,@R0            ;OPERATOR'S CONTROLS
0203 37      = 734         CPL     A                ;INVERT TO MAKE RIGHT
0204 53F0    = 735         ANL     A,#0F0H          ;CLEAR 4 LSB
0206 47      = 736         SWAP    A                ;AND MOVE CHANNEL SELECT THERE
0207 C637    = 737         JZ      CAL3             ;EXIT IF NO CHANNEL SELECTED
0209 BAFF    = 738         MOV     R2,#0FFH         ;INITIALIZE CHANNEL COUNT
020B 67      = 739 CAL1:   RRC     A                ;GET THE NEXT CHANNEL BIT
020C 1A      = 740         INC     R2               ;INCREMENT CHANNEL COUNT
020D E60B    = 741         JNC     CAL1             ;CONTINUE IF NOT THIS CHANNEL
020F FA      = 742         MOV     A,R2             ;GET THE CHANNEL COUNT
0210 E7      = 743         RL      A                ;AND POSITION TO
0211 E7      = 744         RL      A                ;TO BITS 2 & 3
0212 AA      = 745         MOV     R2,A             ;SAVE FOR NOW
0213 B8F5    = 746         MOV     R0,#IOCAL        ;GET THE
0215 80      = 747         MOVX    A,@R0            ;CALIBRATION CONTROLS
0216 5320    = 748         ANL     A,#POSTVE        ;ISOLATE THE POSITIVE SWITCH
0218 47      = 749         SWAP    A                ;PUT NEXT TO THE REST
0219 4A      = 750         ORL     A,R2             ;COMBINE WITH CHANNEL ID
021A AA      = 751         MOV     R2,A
021B B923    = 752         MOV     R1,#CMRAST       ;COMPARE WITH LAST
021D F1      = 753         MOV     A,@R1            ;GET PREVIOUS STATUS
021E 53F0    = 754         ANL     A,#0F0H          ;SAVE THE EXPOSURE COUNT
0220 4A      = 755         ORL     A,R2             ;NEW CAMERA STATUS BYTE
0221 21      = 756         XCH     A,@R1            ;THE CALIBRATION STATUS
0222 D1      = 757         XRL     A,@R1            ;CALIBRATION STATUS
0223 83      = 758         RET
             = 759
0224 5400    = 760 CACHNL: CALL    GTCMST           ;GET THE CAMERA STATUS
0226 C62E    = 761         JZ      CAL2             ;CHECK IF WE NEED NEW CALIBRATION DATA
0228 B466    = 762         CALL    CDATA            ;GET THE CALIBRATION DATA
022A B824    = 763         MOV     R0,#CALRDY       ;START AN
022C B0C0    = 764         MOV     @R0,#0C0H        ;AUTOCOMP CYCLE
022E B8F5    = 765 CAL2:   MOV     R0,#IOCAL        ;CHECK IF CALIBRATION
```

```
0230 80      = 766           MOVX    A,@R0
0231 5340    = 767           ANL     A,#STORE        ;DATA IS TO
0233 9637    = 768           JNZ     CAL3            ;BE UPDATED IN NITRON
0235 B47F    = 769           CALL    STRCAL          ;STORE THE DATA
0237 83      = 770 CAL3:     RET
             = 771 ;
             = 772 ; CHECK THE CALIBRATION INPUT SWITCHES
             = 773 ;
0238 B922    = 774 CALIB:    MOV     R1,#CALSW       ;PNTR TO CAL SW STATUS
023A F1      = 775           MOV     A,@R1           ;MOVE LAST
023B 47      = 776           SWAP    A               ;CALIBRATION CONTROLS
023C 53F0    = 777           ANL     A,#0F0H         ;TO MS BITS OF
023E AD      = 778           MOV     R5,A            ;REGISTER
023F B8F5    = 779           MOV     R0,#IOCAL       ;ADDRESS THE CALIBRATION BYTE
0241 80      = 780           MOVX    A,@R0           ;AND MERGE
0242 37      = 781           CPL     A
0243 530F    = 782           ANL     A,#0FH          ;CURRENT CALIBRATION
0245 A1      = 783           MOV     @R1,A           ;UPDATE THE CAL STATUS BYTE
0246 4D      = 784           ORL     A,R5            ;CONTROL INTO LS BITS
0247 AD      = 785           MOV     R5,A            ;OF REGISTER
0248 B82B    = 790           MOV     R0,#LDNSTY      ;PNTR TO LOW DENSITY TARGET
024A B933    = 791           MOV     R1,#LODS        ;PNTR TO LOW DENSITY DISPLAY BUFFER
024C F8      = 793 CAL4:     MOV     A,R0            ;SAVE PARAMETER
024D AC      = 794           MOV     R4,A            ;POINTER
024E B8F6    = 795           MOV     R0,#IOAUX       ;GET EXPOSURE TIME
0250 80      = 796           MOVX    A,@R0           ;FLAG
0251 85      = 797           CLR     F0              ;CLEAR EXPOSURE TIME FLAG
0252 1255    = 798           JB0     CAL0            ;EXPOSURE TIME ENTRY
0254 95      = 799           CPL     F0              ;SET EXPOSURE TIME FLAG
0255 FC      = 800 CAL0:     MOV     A,R4            ;RESTORE PARAMETER
0256 A8      = 801           MOV     R0,A            ;POINTER
0257 FD      = 802           MOV     A,R5            ;ARE UP/DOWN
0258 5303    = 803           ANL     A,#03H          ;SWITCHES
025A C696    = 804           JZ      CAL10           ;ACTIVATED
025C FD      = 805           MOV     A,R5
025D 47      = 806           SWAP    A               ;AND PREVIOUS CALIBRATION
025E DD      = 807           XRL     A,R5            ;CONTROLS AND PROCESS IF
025F 5303    = 808           ANL     A,#03H          ;THERE IS
0261 BA01    = 809           MOV     R2,#FSTRTE      ;ASSUME THE SLOW RATE
0263 C66A    = 810           JZ      CAL5            ;A CHANGE
0265 C8      = 811           DEC     R0              ;CLEAR THE #
0266 B0F6    = 812           MOV     @R0,#-SLWCNT    ;SLOW UPDATE RATE
0268 4478    = 813           JMP     CAL5A
026A C8      = 814 CAL5:     DEC     R0              ;MOVE PNTR TO
026B C8      = 815           DEC     R0              ;UPDATE CNTR
026C F0      = 816           MOV     A,@R0           ;DECREMENT THE
026D 07      = 817           DEC     A               ;UPDATE
026E A0      = 818           MOV     @R0,A           ;COUNTER
026F 18      = 819           INC     R0              ;MOVE PNTR BACK
0270 18      = 820           INC     R0              ;TO PARAMETER VALUE
0271 9696    = 821           JNZ     CAL10           ;TIMEOUT
0273 C8      = 822           DEC     R0              ;GET THE CONTINUOUS
0274 F0      = 823           MOV     A,@R0           ;CYCLE COUNTER
0275 C67A    = 824           JZ      CAL6            ;REACHED THE NO. OF SLOW COUNTS
0277 10      = 825           INC     @R0             ;INCREMENT # OF SLOW UPDATES
0278 BA0A    = 826 CAL5A:    MOV     R2,#SLWRTE      ;AND SET FOR THE SLOW RATE
027A C8      = 827 CAL6:     DEC     R0              ;SET THE
027B FA      = 828           MOV     A,R2            ;TIMEOUT
027C A0      = 829           MOV     @R0,A           ;COUNTER
027D D301    = 830           XRL     A,#FSTRTE       ;ASSUME UPDATING AT
```

```
027F BA01    = 831           MOV    R2,#1        ;SLOW RATE
0281 9684    = 832           JNZ    CAL7         ;A GOOD GUESS?
0283 1A      = 833           INC    R2           ;NO, A FAST RATE
0284 18      = 834 CAL7:     INC    R0           ;PNTR TO MS
0285 18      = 835           INC    R0           ;BYTE OF PARAMTER
             = 836 ;
             = 837 ; MODIFY THE DISPLAY
             = 838 ;
0286 FD      = 839           MOV    A,R5         ;GET THE UP/DOWN STATUS
0287 67      = 840           RRC    A
0288 27      = 841           CLR    A
0289 F690    = 842           JC     CAL8         ;UP?
028B 2A      = 843           XCH    A,R2         ;GET LS BYTE
028C 37      = 844           CPL    A            ;AND
028D 17      = 845           INC    A            ;NEGATE
028E 2A      = 846           XCH    A,R2         ;ADJUSTMENT -1/-2
028F 07      = 847           DEC    A
0290 B6B0    = 848 CAL8:     JF0    CAL20        ;SPECIAL PROCESSING FOR EXPOSURE TIME
0292 F423    = 849           CALL   DADD         ;APPLY THE ADJUSTMENT
0294 F410    = 850           CALL   DSTORE       ;STORE THE RESULT
0296 B6C6    = 851 CAL10:    JF0    CAL23        ;SPECIAL PROCESSING FOR EXP TIME
0298 B435    = 852           CALL   CHKVLU       ;CHECK IF RESULT WITHIN RANGE
029A D45E    = 853           CALL   CONVD3       ;XFER TO DISPLAY BUFFER
029C C9      = 854           DEC    R1
029D C9      = 855           DEC    R1
029E F1      = 856           MOV    A,@R1        ;ADJUST
029F 537F    = 857           ANL    A,#07FH      ;DISPLAY FOR
02A1 A1      = 858           MOV    @R1,A        ;DECIMAL POINT
02A2 19      = 859           INC    R1
02A3 19      = 860           INC    R1
02A4 FD      = 861 CAL12:    MOV    A,R5         ;MOVE NEXT
02A5 77      = 862           RR     A            ;UP/DOWN
02A6 77      = 863           RR     A            ;STATUS INTO
02A7 AD      = 864           MOV    R5,A         ;PROPER POSITION
02A8 B82F    = 869           MOV    R0,#HDNSTY   ;PROCESS HI DENSITY PARAMETER
02AA 2336    = 870           MOV    A,#HIDS      ;CHECK IF HI DENSITY
02AC D9      = 872           XRL    A,R1         ;PARAMETER
02AD C64C    = 873           JZ     CAL4         ;PROCESSED YET
02AF 83      = 874 CAL11:    RET
             = 875
             = 876 ; PROCESSING FOR EXPOSURE TIME SETTING
             = 877
02B0 B82B    = 878 CAL20:    MOV    R0,#EXPTHE   ;PNTR TO EXPOSURE TIME
02B2 F0      = 879           MOV    A,@R0        ;ISOLATE
02B3 47      = 880           SWAP   A            ;THE EXPOSURE
02B4 530F    = 881           ANL    A,#0FH       ;TIME
02B6 6A      = 882           ADD    A,R2         ;ADD ADJUSTMENT
02B7 47      = 883           SWAP   A
02B8 BA00    = 884           MOV    R2,#0        ;ASSUME -VE
02BA 72C1    = 885           JB3    CAL22        ;OK?
02BC BA70    = 886           MOV    R2,#070H     ;ASSUME>7
02BE F2C1    = 887           JB7    CAL22        ;OK?
02C0 AA      = 888           MOV    R2,A         ;VALUE IN AC IS GOOD
02C1 F0      = 889 CAL22:    MOV    A,@R0        ;UPDATE EXPOSURE TIME
02C2 530F    = 890           ANL    A,#0FH       ;IN RAM
02C4 4A      = 891           ORL    A,R2
02C5 A0      = 892           MOV    @R0,A
02C6 2336    = 893 CAL23:    MOV    A,#EVSDS     ;CHECK IF
02C8 D9      = 894           XRL    A,R1         ;POSITIONED FOR
02C9 9603    = 895           JNZ    CAL25        ;VS DISPLAY
             = 896
```

```
                = 897 ; CONTRAST/EXPOSURE TIME DISPLAY
                = 898
02CB B4EC       = 899         CALL    EXPTM       ;GET EXPOSURE TIME
02CD FC         = 900         MOV     A,R4
02CE AA         = 901         MOV     R2,A
02CF 27         = 902         CLR     A
02D0 D456       = 903         CALL    CONVDI      ;CONVERT TO DISPLAY BUFFER
02D2 83         = 904         RET
                = 905
                = 906 ; BRIGHTNESS/EXPOSURE TIME DISPLAY
                = 907
02D3 F0         = 908 CAL25:  MOV     A,@R0       ;GET LOW DENSITY INDEX/EXPOSURE TIME
02D4 47         = 909         SWAP    A           ;ISOLATE EXPOSURE
02D5 530F       = 910         ANL     A,#0FH      ;TIME
02D7 AA         = 911         MOV     R2,A        ;AND FORM
02D8 27         = 912         CLR     A
02D9 D456       = 913         CALL    CONVDI      ;DISPLAY THE RESULT
02DB 44A4       = 914         JMP     CAL12       ;AND CONTINUE
                = 915 $EJECT
                  916 $INCLUDE (:F1:MOTORS.SRC)
0300            = 917         ORG     0300H
                = 918
                = 919 ; MOVE THE MONITOR TO THE HOME POSITION
                = 920 ;     R4 IS TIMEOUT COUNTER
                = 921 ;     R5 CONTAINS PWM CONTROL
                = 922 ;     R6 CONTAINS RETRY FLAG
                = 923 ;     R7 CONTAINS FAILURE MESSAGE INDICATOR
                = 924
0300 00         = 925 HOME:   NOP                 ;ALLOW A PATCH TO CHANGE ORDER OF HOME MOTION
0301 BE00       = 926         MOV     R6,#0       ;CLEAR RETRY
0303 A5         = 927         CLR     F1          ;MOVE MOTOR B (X-COORDINATE)
0304 BD64       = 928         MOV     R5,#HMPWM1  ;PWM FOR MOTION
0306 741C       = 929         CALL    BACK        ;BACK TO HOME POSITION
0308 C60B       = 930         JZ      HM1         ;SKIP IF OK
030A 1E         = 931         INC     R6          ;SET RETRY FLAG
030B B5         = 932 HM1:    CPL     F1          ;MOVE MOTOR A (Y-COORDINATE)
030C BD64       = 933         MOV     R5,#HMPWM2  ;PWM FOR MOTION
030E 741C       = 934         CALL    BACK        ;BACK TO HOME POSITION
0310 9651       = 935         JNZ     FAIL        ;CHECK FOR FAILURE
0312 EE1B       = 936         DJNZ    R6,HM2      ;RETRY FIRST MOTION?
0314 B5         = 937         CPL     F1
0315 BD64       = 938         MOV     R5,#HMPWM1
0317 741C       = 939         CALL    BACK
0319 9651       = 940         JNZ     FAIL        ;CHECK FOR FAILURE ON RETRY
031B 83         = 941 HM2:    RET                 ;AND RETURN
                = 942 ;
                = 943 ; MOVE SELECTED MOTOR BACK
                = 944
031C B91C       = 945 BACK:   MOV     R1,#PMSB    ;INITIALIZE
031E 27         = 946         CLR     A           ;THE POSITION
031F A1         = 947         MOV     @R1,A       ;COUNTER FOR
0320 19         = 948         INC     R1          ;HOME
0321 A1         = 949         MOV     @R1,A       ;POSITION
0322 AF         = 950         MOV     R7,A        ;INITIALIZE DIAGNOSTIC STATUS
0323 7470       = 951         CALL    HBIT        ;GET THE HOME STATUS
0325 AB         = 952         MOV     R3,A        ;SAVE HOME STATUS
0326 5229       = 953         JB2     BK1         ;AT HOME NOW?
0328 37         = 954         CPL     A           ;MOVE TOWARD HOME
0329 749E       = 955 BK1:    CALL    STRTM1      ;START THE MOTOR
032B BC32       = 956 BK2:    MOV     R4,#50      ;ONE SECOND TIMEOUT
```

```
032D 27     = 957        CLR    A
032E 62     = 958        MOV    T,A
032F 55     = 959        STRT   T
0330 7470   = 960 BK3:   CALL   HBIT           ;LOOP UNTIL
0332 2B     = 961        XCH    A,R3
0333 DB     = 962        XRL    A,R3           ;WE'VE PASSED
0334 523C   = 963        JB2    BK4            ;THE HOME BIT
0336 962B   = 964        JNZ    BK2            ;CHANGE IN CHANNEL?
0338 164A   = 965        JTF    BK5            ;20 MSEC TIMEOUT
033A 6430   = 966        JMP    BK3            ;CHECK THE HOME BIT AGAIN
            = 967
            = 968 ; WE'RE AT HOME
            = 969
033C 7494   = 970 BK4:   CALL   GETQAD         ;COUNT HOW FAR
033E 05     = 971        EN     I              ;WE COAST UNTIL
033F 7491   = 972        CALL   STOPMT         ;MOTOR STOPS
0341 BA96   = 973        MOV    R2,#150        ;WAIT UNTIL ALL
0343 F458   = 974        CALL   DELAY          ;MOTION HAS STOPPED
0345 15     = 975        DIS    I              ;STOP COUNTING AND
0346 7487   = 984 BK6:   CALL   SAVERR         ;SAVE THE OVERSHOOT
0348 27     = 985        CLR    A
0349 83     = 986        RET
            = 987
034A EC30   = 988 BK5:   DJNZ   R4,BK3         ;TIMEOUT?
034C 15     = 989        DIS    I
034D 7491   = 990        CALL   STOPMT
034F 17     = 991        INC    A
0350 83     = 992        RET
            = 993
0351 15     = 994 FAIL:  DIS    I              ;MAKE SURE WE STOP COUNTING
0352 7491   = 995        CALL   STOPMT         ;DON'T BURN OUT THE MOTOR
            = 996
            = 997 ; DIAGNOSTIC JAM MESSAGE
            = 998
0354 B831   = 999        MOV    R0,#PHOTOS
0356 B0B1   =1000        MOV    @R0,#0B1H      ;INDICATE JAM AXIS
0358 765C   =1001        JF1    FAIL3          ;J FOR X-AXIS
035A B0A4   =1002        MOV    @R0,#0A4H      ;J FOR Y-AXIS
035C 18     =1003 FAIL3: INC    R0
035D FF     =1004        MOV    A,R7
035E D498   =1005        CALL   SGPTRN
0360 A0     =1006        MOV    @R0,A
0361 F45F   =1007        CALL   DSPLAY
0363 B8F5   =1008 FAIL1: MOV    R0,#IOCAL
0365 80     =1009        MOVX   A,@R0
0366 926A   =1010        JB4    FAIL2
0368 0437   =1011        JMP    MN2
036A BA50   =1012 FAIL2: MOV    R2,#80
036C D4E5   =1013        CALL   BEEP
036E 6463   =1014        JMP    FAIL1
            =1015 ;
            =1016 ; HOME BIT DETECTION SUBROUTINE
            =1017 ;  A IS ZERO IF NO HOME BIT; OTHERWISE NON-ZERO
            =1018
0370 09     =1019 HBIT:  IN     A,P1           ;INPUT ENCODER BYTE
0371 7674   =1020        JF1    HB1            ;POSITION
0373 47     =1021        SWAP   A              ;HOME BIT TO 010H POSITION
0374 5307   =1022 HB1:   ANL    A,#(HMBITA+PHI1A+PHI2A) ;ISOLATE ENCODER BITS
0376 83     =1023        RET                   ;AND RETURN
            =1024
```

```
                =1025 ; ADVANCE TO NEXT EXPOSURE POSITION
                =1026
0377 A5         =1027 ADVANC: CLR    F1              ;SELECT MOTOR A
0378 B5         =1028         CPL    F1
0379 F5         =1029         SEL    MB1
037A 7400       =1030         CALL   GTTRVL          ;GET Y-DISTANCE AND SET MOTOR FLAG
037C E5         =1031         SEL    MB0
037D 9400       =1032         CALL   MOVE            ;NOW MOVE IT
037F B5         =1033         CPL    F1              ;SELECT MOTOR B
0380 F5         =1034         SEL    MB1
0381 7400       =1035         CALL   GTTRVL          ;GET X-DISTANCE AND SET MOTOR FLAG
0383 E5         =1036         SEL    MB0
0384 9400       =1037         CALL   MOVE            ;NOW MOVE IT
0386 83         =1038         RET
                =1039
                =1040 ; SAVE ERROR IN POSITIONING
                =1041
0387 B81D       =1042 SAVERR: MOV    R0,#PLSB
0389 F0         =1043         MOV    A,@R0
038A B825       =1044         MOV    R0,#YCORR
038C 768F       =1045         JF1    SV1
038E 18         =1046         INC    R0
038F A0         =1047 SV1:    MOV    @R0,A
0390 83         =1048         RET
                =1049
                =1050 ; STOP THE MOTOR
                =1051
0391 27         =1052 STOPMT: CLR    A
0392 3C         =1053         MOVD   P4,A
0393 83         =1054         RET
                =1055 ;
                =1056 ; UPDATE QUADRATURE MEMORY
                =1057 ;       LAST QUADRATURE BITS ARE IN ACCUM ON EXIT
                =1058 ;
0394 09         =1059 GETQAD: IN     A,P1            ;GET THE QUAD BITS
0395 7698       =1060         JF1    GT1             ;IF X MOVEMENT
0397 47         =1061         SWAP   A               ;QUAD BITS TO LEAST SIGNIFICANT POSITION
0398 5303       =1062 GT1:    ANL    A,#03H          ;MASK ALL BUT QUAD BITS
039A B828       =1063         MOV    R0,#QUAD        ;PNTR TO QUAD BIT MEMORY
039C 20         =1064         XCH    A,@R0           ;UPDATE QUAD BITS
039D 83         =1065         RET
                =1066
                =1067 ; START THE MOTOR
                =1068 ;       R5 CONTAINS THE MOTOR SPEED
                =1069 ;       A CONTAINS MS BYTE OF DESTINATION POSITION
                =1070 ;       F1 SPECIFIES MOTOR; 0 FOR X-COORDINATE, 1 FOR Y-COORDINATE
                =1071 ;       DIR BIT = 0 FOR +VE DIRECTION, 1 FOR -VE DIRECTION
                =1072 ;       ONLY A REGISTER IS CHANGED
                =1073
039E 9ACF       =1074 STRTMT: ANL    P2,#0CFH
03A0 76A6       =1075         JF1    ST0
03A2 8A20       =1076         ORL    P2,#020H
03A4 64A8       =1077         JMP    STOA
03A6 8A10       =1078 ST0:    ORL    P2,#010H
03A8 47         =1079 STOA:   SWAP   A               ;JUST LOOK AT REAL UP
03A9 F7         =1080         RLC    A               ;SAVE DIRECTION IN CARRY
03AA 2308       =1081         MOV    A,#08H          ;ASSUME COUNTERCLOCKWISE
03AC E6B0       =1082         JNC    ST1             ;CHECK IF TRUE?
03AE 0304       =1083         ADD    A,#04H          ;SET CONTROLS FOR CLOCKWISE
03B0 76B4       =1084 ST1:    JF1    ST2             ;REPOSITION IF
```

```
03B2 77      =1085         RR    A                  ;IF MOTOR B
03B3 77      =1086         RR    A
03B4 3C      =1087 ST2:    MOVD  P4,A               ;OUTPUT THE CONTROL BITS
03B5 B8BE    =1088         MOV   R0,#IOCNT2         ;MOTOR A PWM ADDRESS
03B7 76BA    =1089         JF1   ST3                ;MOTOR A?
03B9 C8      =1090         DEC   R0                 ;CHANGE TO MOTOR B PWM ADDRESS
03BA FD      =1091 ST3:    MOV   A,R5               ;GET PWM PARAMETER
03BB 97      =1092         CLR   C
03BC F7      =1093         RLC   A
03BD 90      =1094         MOVX  @R0,A
03BE 27      =1095         CLR   A
03BF F7      =1096         RLC   A
03C0 90      =1097         MOVX  @R0,A
03C1 83      =1098         RET
             =1099
             =1100 ; MAIN INTERRUPT ROUTINE
             =1101 ; INCREMENTS OR DECREMENTS POSITION BITS
             =1102
03C2 D5      =1103 INTSR:  SEL   RB1
03C3 AB      =1104         MOV   R3,A
03C4 7494    =1105         CALL  GETQAD             ;UPDATE THE QAD BITS
03C6 D0      =1106         XRL   A,@R0              ;AND CHECK FOR
03C7 C6E1    =1107         JZ    INT3               ;CHANGE; EXIT IF NONE
03C9 67      =1108         RRC   A
03CA 23EE    =1109         MOV   A,#MOVTBL MOD 256  ;ASSUME PHI1 CHANGE
03CC F6D0    =1110         JC    INT1               ;CHECK ASSUMPTION AND
03CE 23F2    =1111         MOV   A,#04H+(MOVTBL MOD 256) ;CHANGE IF NECESSARY
03D0 60      =1112 INT1:   ADD   A,@R0              ;GET TABLE INDEX
03D1 A3      =1113         MOVP  A,@A               ;GET MOVEMENT PARAMETER
03D2 2D      =1114         XCH   A,R5               ;AND SAVE
03D3 6D      =1115         ADD   A,R5               ;ADD MOVEMENT PARAMETER
03D4 2D      =1116         XCH   A,R5               ;AND UPDATE
03D5 F2D8    =1117         JB7   INT2               ;BYTES ARE THE SAME (-1)
03D7 27      =1118         CLR   A                  ;OTHERWISE MS BYTE = 0
03D8 7C      =1119 INT2:   ADDC  A,R4               ;ADD TO MS POSITION BYTE
03D9 530F    =1120         ANL   A,#0FH
03DB 2C      =1121         XCH   A,R4               ;AND UPDATE
03DC 53F0    =1122         ANL   A,#0F0H
03DE 4C      =1123         ORL   A,R4
03DF AC      =1124         MOV   R4,A
03E0 1E      =1125         INC   R6                 ;INCREMENT DISTANCE COUNTER
03E1 9ACF    =1126 INT3:   ANL   P2,#0CFH
03E3 76E9    =1127         JF1   INT5
03E5 8A20    =1128         ORL   P2,#020H
03E7 64EB    =1129         JMP   INT6
03E9 8A10    =1130 INT5:   ORL   P2,#010H
03EB FB      =1131 INT6:   MOV   A,R3
03EC C5      =1132         SEL   RB0                ;RESTORE REGISTER BANK 0
03ED 93      =1133         RETR
             =1134 ;
             =1135 ; TABLE OF MOVEMENT PARAMETERS
             =1136 ;
03EE 01      =1137 MOVTBL: DB    1
03EF FF      =1138         DB    -1
03F0 FF      =1139         DB    -1
03F1 01      =1140         DB    1
03F2 FF      =1141         DB    -1
03F3 01      =1142         DB    1
03F4 01      =1143         DB    1
03F5 FF      =1144         DB    -1
             =1145 $EJECT
```

```
0400            =1146                   ORG     0400H
                =1147
                =1148 ; ROUTINE TO MOVE THE MONITOR BY THE AMOUNT
                =1149 ; SPECIFIED IN THE POSITION BYTES
                =1150
0400 B827       =1151 MOVE:     MOV     R0,#ZCROSS      ;PNTR TO ZERO CROSSING COUNTER
0402 2304       =1152           MOV     A,#NTRIES       ;INITIALIZE FOR 8 TRIES
0404 30         =1153           XCHD    A,@R0
0405 BF01       =1154           MOV     R7,#1
0407 7494       =1155           CALL    GETQAD          ;INITIALIZE THE QUADRATURE BITS
0409 B91C       =1156           MOV     R1,#PMSB
040B B420       =1157           CALL    CKPOS           ;CHECK POSITION RELATIVE TO DESTINATION
040D C68E       =1158           JZ      MV3A            ;CLOSE ENOUGH?
040F F1         =1159 MOV       A,@R1
0410 AC         =1160           MOV     R4,A
0411 BA51       =1161           MOV     R2,#ACLTBL MOD 256  ;ADDRESS OF ACCELERATION TABLE
0413 B91E       =1162           MOV     R1,#DCNTR       ;PNTR TO MOVEMENT COUNTER
0415 05         =1163           EN      I
0416 FA         =1164 ACL1:     MOV     A,R2            ;GET PNTR TO ACCELERATION ENTRY
0417 A3         =1165           MOVP    A,@A            ;GET -VE OF # OF PULSES IN THIS INTERVAL
0418 C664       =1166           JZ      CSPD            ;ANOTHER INTERVAL?
041A A1         =1167           MOV     @R1,A           ;PUT # IN MOVEMENT COUNTER
041B 1A         =1168           INC     R2              ;PNTR TO NEXT CONTROL BYTE
041C FA         =1169           MOV     A,R2            ;GET THE PNTR
041D A3         =1170           MOVP    A,@A            ;GET PW FOR THIS INTERVAL
041E AD         =1171           MOV     R5,A
041F 1A         =1172           INC     R2              ;MOVE PNTR TO NEXT CONTROL BYTE
0420 FA         =1173           MOV     A,R2            ;GET THE
0421 A3         =1174           MOVP    A,@A            ;TIMEOUT
0422 AB         =1175           MOV     R3,A            ;COUNTER
0423 1A         =1176           INC     R2
0424 FC         =1177           MOV     A,R4
0425 749E       =1178           CALL    STRTHT
0427 23F3       =1179 ACL2:     MOV     A,#-13          ;TIMEOUT COUNTER
0429 62         =1180           MOV     T,A             ;HAS A RESOLUTION
042A 55         =1181           STRT    T               ;OF 1 MSEC
042B 164D       =1182 ACL3:     JTF     ACL4            ;1 MSEC?
042D B91C       =1183           MOV     R1,#PMSB
042F B420       =1184           CALL    CKPOS
0431 C67A       =1185           JZ      MV3B
0433 B91E       =1186           MOV     R1,#DCNTR
0435 F1         =1187           MOV     A,@R1           ;DISTANCE COUNTER
0436 962B       =1188           JNZ     ACL3            ;HAVE WE MOVED THE REQIRED DISTANCE
0438 1F         =1189           INC     R7
0439 B91C       =1190           MOV     R1,#PMSB
043B F1         =1191           MOV     A,@R1
043C 47         =1192           SWAP    A
043D F7         =1193           RLC     A
043E 19         =1194           INC     R1
043F F1         =1195           MOV     A,@R1
0440 19         =1196           INC     R1
0441 E645       =1197           JNC     ACL5
0443 37         =1198           CPL     A
0444 17         =1199           INC     A
0445 53F8       =1200 ACL5:     ANL     A,#0F8H
0447 9616       =1201           JNZ     ACL1
0449 BD40       =1202           MOV     R5,#040H
044B 8464       =1203           JMP     CSPD
044D EB27       =1204 ACL4:     DJNZ    R3,ACL2         ;TIMEOUT?
044F 6451       =1205           JMP     FAIL
```

```
              =1206 ;
              =1207 ; ACCELERATION TABLE
              =1208 ;     BYTE OF AN ELEMENT SPECIFIES THE # OF PULSES AT THIS PW
              =1209 ;     BYTE 2 SPECIFIES THE PW FOR THIS PHASE
              =1210 ;     BYTE 3 SPECIFIES THE TIMEOUT FOR THIS PHASE
              =1211
0451 FE       =1212 ACLTBL: DB    -2,160,250        ;BREAK AWAY AT 80%
0452 A0       =
0453 FA       =
0454 FE       =1213        DB    -2,120,250        ;40%
0455 78       =
0456 FA       =
0457 FB       =1214        DB    -5,100,250        ;40%
0458 64       =
0459 FA       =
045A FB       =1215        DB    -5,100,250        ;80%
045B 64       =
045C FA       =
045D FB       =1216        DB    -5,120,250        ;60%
045E 78       =
045F FA       =
0460 FB       =1217        DB    -5,120,250        ;60%
0461 78       =
0462 FA       =
0463 00       =1218        DB    0                 ;TERMINATOR
0464 B81E     =1219 CSPD:  MOV   R0,#DCNTR         ;PNTR TO DISTANCE COUNTER
0466 B000     =1220        MOV   @R0,#0            ;CLEAR THE DISTANCE COUNTER
0468 18       =1221        INC   R0                ;PNTR TO TIMEOUT COUNTER
0469 B040     =1222        MOV   @R0,#040H         ;INITIALIZE THE TIMEOUT COUNTER
046B B91C     =1223 MV1A:  MOV   R1,#PMSB
046D F1       =1224        MOV   A,@R1             ;INDICATION
046E 74A8     =1225        CALL  STOA              ;START THE MOTOR
0470 2398     =1226 MV2:   MOV   A,#098H           ;START THE COUNTER (10.9 MSEC)
0472 62       =1227        MOV   T,A               ;TO MONITOR FOR
0473 55       =1228        STRT  T                 ;CORRECT OPERATION
0474 1692     =1229 MV3:   JTF   MV4               ;CHECK OUR PROGRESS EVERY 10.9 MSEC
0476 B420     =1230        CALL  CKPOS
0478 9674     =1231        JNZ   MV3               ;ARE WE THERE YET
047A 7491     =1232 MV3B:  CALL  STOPMT            ;STOP THE MOTOR
047C BA64     =1233        MOV   R2,#100
047E F458     =1234        CALL  DELAY             ;AND LET IT SLOW DOWN
0480 B420     =1235        CALL  CKPOS
0482 C68E     =1236        JZ    MV3A
0484 B827     =1237        MOV   R0,#ZCROSS        ;DECREMENT THE ZERO
0486 30       =1238        XCHD  A,@R0             ;CROSSING COUNTER
0487 07       =1239        DEC   A
0488 30       =1240        XCHD  A,@R0
0489 F0       =1241        MOV   A,@R0             ;GET UPDATED
048A 530F     =1242        ANL   A,#0FH            ;CROSSING COUNTER
048C 9664     =1243        JNZ   CSPD              ;HAVE WE HAD ENOUGH TRIES
048E 15       =1244 MV3A:  DIS   I                 ;IGNORE THE ENCODER
048F 7487     =1245        CALL  SAVERR
0491 83       =1246        RET
              =1247
              =1248 ; CHECK OUR PROGRESS EVERY 10.9 MSEC
              =1249
0492 65       =1250 MV4:   STOP  TCNT              ;STOP THE COUNTER
0493 B81E     =1251        MOV   R0,#DCNTR         ;PNTR TO DISTANCE COUNTER
0495 F0       =1252        MOV   A,@R0             ;DISTANCE COUNTER
0496 96A8     =1253        JNZ   MV6               ;MOVING?
              =1254
```

```
                =1255 ; FIX-UP IF NO MOVEMENT
                =1256
0498 18         =1257           INC     R0              ;PNTR TO TIMEOUT LOOP COUNTER
0499 F0         =1258           MOV     A,@R0           ;LOOP COUNTER
049A 07         =1259           DEC     A               ;DECREMENT THE COUNTER
049B A0         =1260           MOV     @R0,A           ;THE COUNTER
049C 9670       =1261           JNZ     MV2             ;KEEP TRYING IF TIME LEFT
049E FD         =1262           MOV     A,R5            ;GET CURRENT PWM VALUE
049F 0310       =1263           ADD     A,#10H          ;AND ADD 4
04A1 AD         =1264           MOV     R5,A
04A2 034F       =1265           ADD     A,#04FH         ;COMPARE WITH MAX VALUE
04A4 E664       =1266           JNC     CSPD            ;AND CONTINUE IF NOT EXCEEDED
04A6 6451       =1267           JMP     FAIL
                =1268
                =1269 ; ADJUST PWM FOR OPTIMUM PERFORMANCE
                =1270
04A8 B81C       =1271 MV6:      MOV     R0,#PMSB        ;PNTR TO POSITION BYTES
04AA 15         =1272           DIS     I               ;DISABLE INTERRUPTS WHILE ACCESSING
04AB F400       =1273           CALL    DLOAD           ;LOAD POSITION INTO DP ACCUMULATOR
04AD 05         =1274           EN      I               ;OK TO LET POSITION CHANGE AGAIN
04AE F417       =1275           CALL    DABS            ;MAKE IT INTO AN ABSOLUTE VALUE
04B0 B83E       =1276           MOV     R0,#TEMP        ;STORE TEMPORARILY
04B2 F410       =1277           CALL    DSTORE          ;AND STORE IT
04B4 B9E4       =1278           MOV     R1,#(ADJTAB-1) MOD 256  ;ADJUSTMENT TABLE PNTR
04B6 19         =1279 MV7:      INC     R1
04B7 F9         =1280           MOV     A,R1            ;GET DISTANCE ENTRY
04B8 A3         =1281           MOVP    A,@A            ;FROM TABLE
04B9 AA         =1282           MOV     R2,A
04BA 19         =1283           INC     R1
04BB F9         =1284           MOV     A,R1
04BC A3         =1285           MOVP    A,@A
04BD 2A         =1286           XCH     A,R2
04BE 19         =1287           INC     R1              ;PNTR TO ANTICIPATED DISTANCE
04BF F423       =1288           CALL    DADD            ;COMPARE WITH ACTUAL DISTANCE
04C1 F2C5       =1289           JB7     MV7A            ;AT THE RIGHT PLACE IN THE TABLE
04C3 84B6       =1290           JMP     MV7
04C5 F9         =1291 MV7A:     MOV     A,R1
04C6 A3         =1292           MOVP    A,@A            ;GET ANTICIPATED DISTANCE
04C7 AA         =1293           MOV     R2,A
04C8 B91E       =1294           MOV     R1,#DCNTR       ;PNTR TO DISTANCE COUNTER
04CA F1         =1295           MOV     A,@R1           ;DISTANCE MOVED THIS INTERVAL
04CB 6A         =1296           ADD     A,R2            ;COMPARE WITH EXPECTED DISTANCE
04CC C664       =1297           JZ      CSPD            ;GREAT, EXACTLY RIGHT!
04CE 2308       =1298           MOV     A,#INCRTE       ;ASSUME TO SLOW
04D0 E6D4       =1299           JNC     MV8             ;RIGHT ASSUMPTION?
04D2 23F8       =1300           MOV     A,#DECRTE       ;BAD GUESS, MAKE IT RIGHT
04D4 6D         =1301 MV8:      ADD     A,R5            ;ADD TO CURRENT PWM
04D5 AD         =1302           MOV     R5,A            ;FOR A NEW PWM
04D6 03C0       =1303           ADD     A,#0C0H         ;IS PWM VALUE < 50H (40% MODULATION)
04D8 F6DC       =1304           JC      MV9             ;NO,USE IT
04DA BD40       =1305           MOV     R5,#040H        ;OTHERWISE, SET TO 50H (40% MODULATION)
04DC 2338       =1306 MV9:      MOV     A,#038H         ;IS PWM VALUE > 0C8H? (100% MODULATION)
04DE 6D         =1307           ADD     A,R5
04DF E664       =1308           JNC     CSPD
04E1 BDC8       =1309           MOV     R5,#0C8H
04E3 8464       =1310           JMP     CSPD
                =1311 ;
                =1312 ; ADJUSTMENT TABLE
                =1313 ;
04E5 FF         =1314 ADJTAB:   DB      0FFH,0E0H,0FFH
04E6 E0         =
```

```
04E7 FF      =
04E8 FF      =1315          DB      0FFH,0A0H,0FEH
04E9 A0      =
04EA FE      =
04EB FF      =1316          DB      0FFH,080H,0FEH
04EC 80      =
04ED FE      =
04EE FF      =1317          DB      0FFH,040H,0FEH
04EF 40      =
04F0 FE      =
04F1 FF      =1318          DB      0FFH,000H,0FCH
04F2 00      =
04F3 FC      =
04F4 80      =1319          DB      080H,000H,0F8H
04F5 00      =
04F6 F8      =
             =1320 $EJECT
              1321 $INCLUDE (:F1:UTIL.SRC)
0500         =1322          ORG     0500H
             =1323
             =1324 ; CHECK FOR TEST MODE
             =1325 ; HOW DO WE RETURN FROM TEST MODE?
             =1326
0500 B8F6    =1327 CHKTST:  MOV     R0,#IOAUX       ;ADDRESS THE AUXILLARY INPUT BYTE
0502 80      =1328          MOVX    A,@R0           ;GET THE INPUTS
0503 3208    =1329          JB1     CHKT1
0505 F5      =1330          SEL     MB1             ;TEST ROUTINES ARE IN SECOND 2716
0506 A41F    =1331          JMP     TEST            ;GO TO THE TEST ROUTINES
0508 83      =1332 CHKT1:   RET                     ;RETURN WHEN TESTS DONE
             =1333
             =1334 ; CHECK LINE VOLTAGE
             =1335
0509 B8DA    =1336 CHKLNE:  MOV     R0,#IOCNV2
050B 90      =1337          MOVX    @R0,A           ;SELECT CHANNEL AND START CONVERSION
050C BB05    =1338          MOV     R3,#5
050E EB0E    =1339 CHKLN1:  DJNZ    R3,CHKLN1       ;WAIT A WHILE
0510 2610    =1340 CHKLN2:  JNT0    CHKLN2          ;WAIT TILL CONVERSION COMPLETE
0512 80      =1341          MOVX    A,@R0           ;GET RESULT
0513 F21F    =1342          JB7     CHKLN3          ;TEST FOR LOW LINE VOLTAGE
0515 BA07    =1343          MOV     R2,#MSGLL       ;DISPLAY THE
0517 D4AC    =1344          CALL    MSGE            ;THE MESSAGE
0519 F45F    =1345          CALL    DSPLAY
051B D400    =1346          CALL    VSYNC           ;WAIT 1 VERTICAL SYNC TIME
051D A409    =1347          JMP     CHKLNE          ;WAIT UNTIL THE VOLTAGE IS OK
051F 83      =1348 CHKLN3:  RET
             =1349
             =1350 ; CHECK POSITION OF MONITOR RELATIVE TO NEXT EXPOSURE POSITION
             =1351 ;    A IS ZERO IF WITHIN 1 COUNT; OTHERWISE NON-ZERO
             =1352
0520 F1      =1353 CKPOS:   MOV     A,@R1           ;GET MS BYTE
0521 530F    =1354          ANL     A,#0FH
0523 19      =1355          INC     R1              ;PNTR TO LS BYTE
0524 C62F    =1356          JZ      CK2             ;ZERO OR 1 POSSIBLE
0526 43F0    =1357          ORL     A,#0F0H
0528 17      =1358          INC     A               ;-1
0529 962D    =1359          JNZ     CK1             ;POSSIBLE
052B F1      =1360          MOV     A,@R1           ;LEAVE THE
052C 17      =1361          INC     A               ;FLAG
052D C9      =1362 CK1:     DEC     R1              ;RESTORE PNTR
052E 83      =1363          RET
052F F1      =1364 CK2:     MOV     A,@R1           ;CHECK FOR
```

```
0530 C633       =1365           JZ      CK3             ;ZERO
0532 07         =1366           DEC     A               ;TRY ONE
0533 C9         =1367 CK3:      DEC     R1              ;RESTORE PNTR
0534 83         =1368           RET
                =1369
                =1370 ; ROUTINE TO CHECK FOR VALUE WITHIN RANGE 0 TO 999
                =1371 ; IN TEST MODE  OR DIRECT SETTING OF DACS, PERMISSIBLE
                =1372 ; RANGE IS 1 TO 999 IN OTHER MODES.
                =1373 ; VALUES ARE ADJUSTED IF OUTSIDE THE RANGE
                =1374
0535 85         =1378 CHKVLU:   CLR     F0              ;CLEAR FLAG FOR 1 TO 999 RANGE
0536 F8         =1379           MOV     A,R0            ;SAVE PARAMETER
0537 AB         =1380           MOV     R3,A            ;POINTER
0538 B8F6       =1381           MOV     R0,#IOAUX       ;CHECK IF
053A 80         =1382           MOVX    A,@R0           ;IN TEST
053B 3240       =1383           JB1     CHK1            ;TEST MODE
053D 95         =1384           CPL     F0              ;SET FOR 0 TO 999 RANGE
053E A446       =1385           JMP     CHK2
0540 B8F7       =1386 CHK1:     MOV     R0,#IODPSW      ;CHECK IF
0542 80         =1387           MOVX    A,@R0           ;DACS ARE SET
0543 D246       =1388           JB6     CHK2            ;DIRECTLY SET
0545 95         =1389           CPL     F0              ;SET FOR 0 TO 999 RANGE
0546 FB         =1390 CHK2:     MOV     A,R3            ;RESTORE PARAMETER
0547 A8         =1391           MOV     R0,A            ;POINTER
0548 F400       =1392           CALL    DLOAD           ;GET VALUE
054A F25F       =1394           JB7     CHK6            ;HAVE WE MADE IT NEGATIVE
054C B650       =1396           JF0     CHK3            ;RANGE 0 TO 999?
054E E65F       =1397           JNC     CHK6            ;HAVE WE MADE IT ZERO?
0550 23FC       =1399 CHK3:     MOV     A,#0FCH         ;LOAD -1000 INTO
0552 BA18       =1400           MOV     R2,#018H        ;THE DP ACCUM
0554 F423       =1401           CALL    DADD            ;AND COMPARE WITH
0556 F25E       =1402           JB7     CHK5            ;THE PARAMETER
0558 2303       =1403           MOV     A,#03H          ;REDUCE TO
055A BAE7       =1404           MOV     R2,#0E7H        ;999 IF OVERFLOW
055C F410       =1405 CHK4:     CALL    DSTORE          ;OVERFLOW
055E 83         =1406 CHK5:     RET
                =1407
                =1408 ; NEGATIVE VALUES INVALID - MAKE IT ZERO
                =1409 ;
055F 27         =1410 CHK6:     CLR     A               ;CLEAR
0560 AA         =1411           MOV     R2,A            ;THE PARAMETER
0561 B65C       =1413           JF0     CHK4            ;0 PERMISSIBLE?
0563 1A         =1414           INC     R2              ;IF NOT, MAKE IT 1
0564 A45C       =1416           JMP     CHK4            ;AND CONTINUE
                =1417
                =1418 ; GET CALIBRATION DATA FROM NITRON
                =1419 ;   ON ENTRY R1 CONTAINS POINTER TO RAM STATUS
                =1420 ;   A THRU R3 MODIFIED
                =1421 ; ALSO SELECT VIDEO CHANNEL
                =1422
0566 230C       =1423 CDATA:    MOV     A,#CHNLCL       ;CLEAR THE VIDEO
0568 9F         =1424           ANLD    P7,A            ;CHANNEL SELECTION
0569 F1         =1425           MOV     A,@R1           ;SELECTED CHANNEL
056A 77         =1426           RR      A               ;FROM CAMERA
056B 77         =1427           RR      A               ;STATUS
056C 5303       =1428           ANL     A,#03H          ;POSITION AND USE FOR
056E 8F         =1429           ORLD    P7,A            ;SOURCE SELECTION
056F B48B       =1430           CALL    NITADR          ;GET ADDRESS OF CAL DATA IN NITRON
0571 B82B       =1434           MOV     R0,#LDNSTY      ;STORE THE
0573 F4DB       =1436           CALL    READ            ;READ THE NITRON
0575 B435       =1437           CALL    CHKVLU          ;CHECK FOR VALUE WITHIN RANGE
```

```
0577 19      =1438          INC    R1              ;PNTR TO NEXT NITRON WORD
0578 B82F    =1443          MOV    R0,#HDNSTY      ;AND STORE AS
057A F4DB    =1444          CALL   READ            ;READ HI DENSITY INDEX FROM NITRON
057C B435    =1446          CALL   CHKVLU          ;CHECK FOR VALUE WITHIN RANGE
057E 83      =1447          RET
             =1448 ;
             =1449 ; STORE CALIBRATION DATA IN NITRON
             =1450 ;
057F B82B    =1454 STRCAL:  MOV    R0,#LDNSTY      ;START WITH LOW DENSITY
0581 B48B    =1456          CALL   NITADR          ;GET THE NITRON ADDRESSS
0583 F4AE    =1457          CALL   WRITE           ;AND STORE THE VALUE
0585 B82F    =1461          MOV    R0,#HDNSTY      ;PREPARE FOR HIGH DENSITY
0587 19      =1463          INC    R1              ;PNTR TO NITRON CONTRAST WORD
0588 F4AE    =1464          CALL   WRITE           ;AND STORE THE VALUE
058A 83      =1465          RET
             =1466
             =1467 ; ROUTINE TO GET THE ADDRESS OF NITRON CALIBRATION DATA
             =1468 ;     A AND R1 ARE CHANGED
             =1469 ;     THE NITRON ADDRESS IS RETURNED IN R1
             =1470
058B B923    =1471 NITADR:  MOV    R1,#CMRAST      ;GET THE CAMERA
058D F1      =1472          MOV    A,@R1           ;STATUS
058E 530F    =1473          ANL    A,#0FH          ;ISOLATE THE NITRON ADDRESS
0590 A9      =1474          MOV    R1,A            ;SAVE IT
0591 83      =1475          RET                    ;AND RETURN
             =1476
             =1477 ; DISPLAY BRIGHTNESS
             =1478
0592 B839    =1479 PHTMTR:  MOV    R0,#LOPHTR      ;GET THE LOW
0594 F0      =1480          MOV    A,@R0           ;RANGE PHOTOMETER
0595 37      =1481          CPL    A               ;READING AND CHECK
0596 53E0    =1482          ANL    A,#0E0H         ;FOR > 0E0H
0598 AD      =1483          MOV    R5,A            ;IF WE'RE
0599 969C    =1484          JNZ    PH1             ;OVERRANGE
059B 18      =1485          INC    R0              ;GET HI RANGE IF WE ARE
059C F0      =1486 PH1:     MOV    A,@R0           ;GET THE
059D AA      =1487          MOV    R2,A
059E 27      =1488          CLR    A
059F F451    =1489          CALL   DASL
05A1 F451    =1490          CALL   DASL
05A3 B839    =1491          MOV    R0,#LOPHTR
05A5 F410    =1492          CALL   DSTORE
05A7 B435    =1493          CALL   CHKVLU
             =1494 ; ADD OVERRANGE DISPLAY
05A9 B931    =1495          MOV    R1,#PHOTDS      ;BRIGHTNESS
05AB D45A    =1496          CALL   CONVD2          ;AND CONVERT TO DECIMAL
05AD FD      =1497          MOV    A,R5            ;CHECK IF WE NEED
05AE C6B6    =1498          JZ     PH2             ;A DECIMAL (LOW RANGE)
05B0 B831    =1499          MOV    R0,#PHOTDS      ;PUT THE
05B2 F0      =1500          MOV    A,@R0           ;DECIMAL AFTER
05B3 537F    =1501          ANL    A,#07FH         ;THE FIRST
05B5 A0      =1502          MOV    @R0,A           ;DIGIT
05B6 F45F    =1503 PH2:     CALL   DSPLAY          ;DISPLAY THE RESULT
05B8 83      =1504          RET
             =1505 ;
             =1506 ; INITIALIZE THE 8253
             =1507 ;
05B9 BAD2    =1508 IN8253:  MOV    R2,#CT8253 MOD 256   ;PNTR TO 8253 CONTROL TABLE
05BB BB03    =1509          MOV    R3,#3           ;INITIALIZE ALL THREE COUNTERS
05BD B8BF    =1510 IN1:     MOV    R0,#IOCNTM      ;ADDRESS THE 8253 MODE REGISTER
```

```
05BF FA      =1511          MOV     A,R2            ;GET CONTROL TABLE PNTR
05C0 1A      =1512          INC     R2              ;INCREMENT POINTER FOR NEXT TIME
05C1 A3      =1513          MOVP    A,@A            ;GET THE INITIAL MODE WORD FROM THE TABLE
05C2 90      =1514          MOVX    @R0,A           ;SET THE MODE
05C3 FA      =1515          MOV     A,R2            ;GET CONTROL TABLE PNTR
05C4 1A      =1516          INC     R2              ;INCREMENT PNTR FOR NEXT TIME
05C5 A3      =1517          MOVP    A,@A            ;GET COUNTER ADDRESS
05C6 A8      =1518          MOV     R0,A            ;ADDRESS THE COUNTER
05C7 B902    =1519          MOV     R1,#2           ;2 DATA WORD TO THE COUNTER
05C9 FA      =1520 IN2:     MOV     A,R2            ;GET CONTROL TABLE PNTR
05CA 1A      =1521          INC     R2              ;INCREMENT PNTR FOR NEXT TIME
05CB A3      =1522          MOVP    A,@A            ;GET DATA BYTE FROM THE TABLE
05CC 90      =1523          MOVX    @R0,A           ;AND TRANSMIT TO THE COUNTER
05CD E9C9    =1524          DJNZ    R1,IN2          ;ANOTHER DATA BYTE FOR THIS COUNTER
05CF EBBD    =1525          DJNZ    R3,IN1          ;ANOTHER COUNTER
05D1 83      =1526          RET
             =1527 ;
             =1528 ; 8253 CONTROL TABLE
             =1529 ;
05D2 36      =1530 CT8253:  DB      036H            ;COUNTER 0 IS IN SQUARE WAVE MODE
05D3 BC      =1531          DB      IOCNT0          ;IO ADDRESS FOR COUNTER 0
05D4 90      =1532          DB      090H            ;1000 HZ
05D5 01      =1533          DB      001             ;SQUARE WAVE
05D6 72      =1534          DB      072H            ;COUNTER 1 IS ONE SHOT
05D7 BD      =1535          DB      IOCNT1          ;I/O ADDRESS FOR COUNTER 1
05D8 00      =1536          DB      0
05D9 00      =1537          DB      0
05DA B2      =1538          DB      0B2H            ;CNTR1 MODE - ONE SHOT, 1 BYTE LOAD
05DB BE      =1539          DB      IOCNT2          ;I/O ADDRESS FOR COUNTER 2
05DC 00      =1540          DB      0
05DD 00      =1541          DB      0
             =1542
             =1543
             =1544 ; INITIALIZE THE DACS FOR 0 BRIGHTNESS AND NO CONTRAST
             =1545
05DE B83B    =1546 INDAC:   MOV     R0,#DACMSB      ;PNTR TO DAC BUFFER
05E0 B020    =1547          MOV     @R0,#020H       ;0 FOR BRIGHTNESS, MIDSCALE FOR CONTRAST
05E2 27      =1548          CLR     A
05E3 18      =1549          INC     R0
05E4 A0      =1550          MOV     @R0,A           ;CLEAR LS BYTE BRIGHTNESS
05E5 18      =1551          INC     R0
05E6 A0      =1552          MOV     @R0,A           ;CLEAR LS BYTE CONTRAST
05E7 F5      =1553          SEL     MB1
05E8 1400    =1554          CALL    OUTDAC          ;OUTPUT VALUES TO DAC
05EA E5      =1555          SEL     MB0
05EB 83      =1556          RET
             =1557 ; GET THE EXPOSURE TIME FROM THE DIP SWITCHES
             =1558 ;    R4 CONTAINS THE EXPOSURE TIME
             =1559
05EC B82B    =1563 EXPTM:   MOV     R0,#LDNSTY      ;PNTR TO EXP TM/LOW DENSITY INDEX
05EE F0      =1565          MOV     A,@R0           ;GET MS BYTE
05EF 47      =1566          SWAP    A               ;AND
05F0 5307    =1567          ANL     A,#07H          ;ISOLATE EXPOSURE TIME SPECIFICATION
05F2 AC      =1568          MOV     R4,A            ;SAVE THE EXPOSURE TIME
05F3 1C      =1569          INC     R4
05F4 2380    =1570          MOV     A,#080H
05F6 E7      =1571 EX2:     RL      A
05F7 ECF6    =1572          DJNZ    R4,EX2
05F9 AC      =1573          MOV     R4,A
05FA 83      =1574          RET
             =1575 $EJECT
```

```
0600            =1576           ORG     0600H
                =1577   ;
                =1578   ; WAIT FOR A SYNC PULSE, THEN READ THE PHOTOMETER
                =1579   ;    ON EXIT R2 = 0 IF TIMEOUT(NO SYNC PULSE)
                =1580   ;           R2 = 1 IF VERTICAL SYNC DETECTED
                =1581   ;    A THRU R3 CHANGED BY SUBROUTINE
                =1582   ;
0600 27         =1583   VSYNC:  CLR     A
0601 AA         =1584           MOV     R2,A
0602 62         =1585           MOV     T,A                     ;SET TIMER
0603 55         =1586           STRT    T                       ;START TIMER
0604 1632       =1587   VS1:    JTF     VS3                     ;TIMEOUT?
0606 4604       =1588           JNT1    VS1                     ;SYNC LOW
                =1589
                =1590   ; RASTER COMP
                =1591
0608 B8F7       =1592           MOV     R0,#IODPSW              ;CHECK IF
060A 80         =1593           MOVX    A,@R0                   ;RASTER COMP
060B 37         =1594           CPL     A
060C 922D       =1595           JB4     VS2                     ;ENABLED
060E B827       =1596           MOV     R0,#RCFLAG              ;COMPLEMENT
0610 2380       =1597           MOV     A,#080H                 ;RASTER COMP
0612 D0         =1598           XRL     A,@R0                   ;FLAG
0613 A0         =1599           MOV     @R0,A
0614 F22D       =1600           JB7     VS2                     ;NO RASTER COMP SIGNAL ON ODD SYNC PULSE
0616 B82B       =1604           MOV     R0,#LDNSTY              ;GET
0618 F0         =1606           MOV     A,@R0                   ;EXPOSURE
0619 BB01       =1607           MOV     R3,#1                   ;INITIALIZE COUNTER CONTROL
061B D226       =1608           JB6     VS7                     ;FOR 16 OR MORE VS, 1 RC PULSE EVERY ODD VS
061D 37         =1609           CPL     A
061E B22D       =1610           JB5     VS2                     ;NO RASTER COMP IF 2 OR LESS VERTICAL SYNC
0620 1B         =1611           INC     R3                      ;ASSUME 2 RC PULSES
0621 37         =1612           CPL     A
0622 9226       =1613           JB4     VS7                     ;8 VS?
0624 1B         =1614           INC     R3                      ;IF NOT 4 RC PULSES
0625 1B         =1615           INC     R3                      ;EVERY ODD VS
0626 2308       =1616   VS7:    MOV     A,#RSTBLD               ;OUTPUT
0628 8E         =1617           ORLD    P6,A                    ;A RC
0629 37         =1618           CPL     A                       ;PULSE
062A 9E         =1619           ANLD    P6,A
062B EB26       =1620           DJNZ    R3,VS7                  ;ANOTHER PULSE?
062D 1632       =1621   VS2:    JTF     VS3                     ;TIMEOUT
062F 562D       =1622           JT1     VS2                     ;SYNC HIGH?
0631 1A         =1623           INC     R2                      ;SHOW WE GOT A SYNC
0632 65         =1624   VS3:    STOP    TCNT
0633 D436       =1625           CALL    RDLL                    ;READ THE LIGHT LEVEL
0635 83         =1626           RET
                =1627
                =1628   ; READ THE LIGHT LEVEL
                =1629
0636 B8D8       =1630   RDLL:   MOV     R0,#IOCNV0              ;ADDRESS CHANNEL 0 OF MUX
0638 B939       =1631           MOV     R1,#LOPHTR              ;PNTR TO PHOTOMETER DATA AREA
063A 90         =1632   RDL1:   MOVX    @R0,A
063B 90         =1633           MOVX    @R0,A
063C BB05       =1634           MOV     R3,#5
063E EB3E       =1635   RDL2:   DJNZ    R3,RDL2
0640 2640       =1636   RDL3:   JNT0    RDL3                    ;WAIT UNTIL CONVERSION COMPLETE
0642 80         =1637           MOVX    A,@R0                   ;READ THE VALUE
0643 A1         =1638           MOV     @R1,A                   ;AND TRANSFER TO DATA AREA
0644 18         =1639           INC     R0                      ;ADDRESS OF NEXT MUX CHANNEL
0645 19         =1640           INC     R1                      ;PNTR TO NEXT DATA AREA LOCATION
0646 233B       =1641           MOV     A,#(HIPHTR+1)
```

```
0648 D9      =1642          XRL     A,R1
0649 963A    =1643          JNZ     RDL1
064B 83      =1644          RET
             =1645
             =1646 $EJECT
             =1647
             =1648 ; CLEAR THE DISPLAY BUFFER
             =1649
064C B831    =1650 CLRBFR:  MOV     R0,#DSPBFR      ;PNTR TO DISPLAY BUFFER
064E BA08    =1651          MOV     R2,#8           ;8 DIGITS IN BUFFER
0650 B080    =1652 CL1:     MOV     @R0,#080H       ;CLEAR THE CHARACTER
0652 18      =1653          INC     R0              ;INCREMENT BUFFER PNTR
0653 EA50    =1654          DJNZ    R2,CL1          ;ANOTHER CHARACTER
0655 83      =1655          RET
             =1656
             =1657 ; CONVERT A DP ACCUMULATOR INTO 3 DIGIT BUFFER FORMAT
             =1658
0656 BC91    =1659 CONVD1:  MOV     R4,#DGTVLU MOD 256
0658 C462    =1660          JMP     C08
             =1661
             =1662 ; CONVERT A POSITVE ONE BYTE INTEGER INTO TWO
             =1663 ; SEVEN SEGMENT FORMAT IN DISPLAY BUFFER.
             =1664 ; LEADING ZEROES ARE BLANKED
             =1665 ;       ON ENTRY - A CONTAINS THE INTEGER
             =1666 ;                  R1 POINTS TO THE DISPLAY BUFFER
             =1667 ;
             =1668 ;       ON EXIT  - R1 POINTS TO THE NEXT POSITION IN THE DISPLAY BUFFER
             =1669 ;       A THRU R4 ARE MODIFIED
             =1670
065A BC95    =1671 CONVD2:  MOV     R4,#DGTVL2 MOD 256
065C C460    =1672          JMP     C00
             =1673
             =1674 ; CONVERT A POSITIVE TWO BYTE INTEGER INTO THREE DIGIT
             =1675 ; SEVEN SEGMENT FORMAT IN A DISPLAY BUFFER.
             =1676 ; LEADING ZEROS ARE BLANKED
             =1677 ;       ON ENTRY - R0 POINTS TO THE TWO BYTE INTEGER
             =1678 ;                  R1 POINTS TO THE DISPLAY BUFFER
             =1679 ;       ON EXIT  - R1 POINTS TO THE NEXT POSITION IN THE DISPLAY BUFFER
             =1680 ;       A THRU R4 ARE MODIFIED
             =1681
065E BC91    =1682 CONVD3:  MOV     R4,#DGTVLU MOD 256
0660 F400    =1683 C00:     CALL    DLOAD           ;LOAD THE DP ACCUM
0662 85      =1684 C08:     CLR     F0              ;BLANK LEADING ZEROES FLAG
0663 AB      =1685          MOV     R3,A            ;SAVE THE MS BYTE
0664 B83E    =1686          MOV     R0,#TEMP        ;PNTR TO DP WORKING STORAGE
0666 B000    =1687          MOV     @R0,#0          ;CLEAR MS BYTE WORKING STORAGE
0668 FC      =1688 C01:     MOV     A,R4            ;GET THE TABLE ADDRESS
0669 A3      =1689          MOVP    A,@A            ;GET THE DIGIT WEIGHT
066A C690    =1690          JZ      C07             ;END OF TABLE
066C 18      =1691          INC     R0              ;PNTR TO LS BYTE WORKING STORAGE
066D A0      =1692          MOV     @R0,A           ;PLACE IN LS BYTE OF DP WORKING STORAGE
066E C8      =1693          DEC     R0              ;RESTORE PNTR TO DP PARAMETER
066F 07      =1694          DEC     A               ;CHECK FOR
0670 9674    =1695          JNZ     C02             ;LAST DIGIT
0672 85      =1696          CLR     F0              ;DON'T BLANK
0673 95      =1697          CPL     F0              ;IF LAST DIGIT
0674 B1FF    =1698 C02:     MOV     @R1,#0FFH       ;INITIALIZE THE DIGIT COUNT
0676 FB      =1699          MOV     A,R3            ;RESTORE DP ACCUMULATOR
0677 11      =1700 C03:     INC     @R1             ;INCREMENT DIGIT COUNT
0678 F42F    =1701          CALL    DSUB            ;SUBTRACT DIGIT VALUE
```

```
067A F27E     =1702           JB7     C04             ;LEAVE THIS DIGIT IF NEGATIVE
067C C477     =1703           JMP     C03             ;AND CONTINUE WITH THIS DIGIT
067E F423     =1704 C04:      CALL    DADD            ;ADJUST FOR EXTRA SUBTRACTION
0680 AB       =1705           MOV     R3,A            ;SAVE THE MS BYTE OF DP ACCUM
0681 F1       =1706           MOV     A,@R1           ;GET THE DIGIT
0682 B687     =1707           JF0     C05             ;ELIGIBLE FOR BLANKING?
0684 C689     =1708           JZ      C06             ;CHECK FOR A ZERO DIGIT
0686 95       =1709           CPL     F0              ;DON'T BLANK ZEROS
0687 0498     =1710 C05:      CALL    SGPTRN          ;DIGIT TO SEVEN
0689 4380     =1711 C06:      ORL     A,#080H         ;SUPPRESS DP
068B A1       =1712           MOV     @R1,A           ;SEGMENT FORMAT
068C 19       =1713           INC     R1              ;MOVE TO NEXT BUFFER POSITION
068D 1C       =1714           INC     R4              ;PNTR TO NEXT DIGIT VALUE
068E C468     =1715           JMP     C01             ;DO THE NEXT DIGIT
0690 83       =1716 C07:      RET
              =1717 ;
              =1718 ; DIGIT VALUE TABLE
              =1719 ;
0691 64       =1720 DGTVLU:   DB      100             ;HUNDREDS
0692 0A       =1721           DB      10              ;TENS
0693 01       =1722           DB      1               ;UNITS
0694 00       =1723           DB      0               ;TABLE TERMINATOR
0695 64       =1724 DGTVL2:   DB      100
0696 0A       =1725           DB      10
0697 00       =1726           DB      0
              =1727
              =1728 ; GET DISPLAY SEGMENT PATTERN
              =1729
0698 039C     =1730 SGPTRN:   ADD     A,#SEGTBL MOD 256
069A A3       =1731           MOVP    A,@A
069B 83       =1732           RET
              =1733 ;
              =1734 ; DIGIT TO SEVEN SEGMENT TABLE
              =1735 ;
069C FB       =1736 SEGTBL:   DB      PTRN0           ;0
069D 80       =1737           DB      PTRN1           ;1
069E ED       =1738           DB      PTRN2           ;2
069F F5       =1739           DB      PTRN3           ;3
06A0 B6       =1740           DB      PTRN4           ;4
06A1 D7       =1741           DB      PTRN5           ;5
06A2 1F       =1742           DB      PTRN6           ;6
06A3 F0       =1743           DB      PTRN7           ;7
06A4 FF       =1744           DB      PTRN8           ;8
06A5 F7       =1745           DB      PTRN9           ;9
06A6 FE       =1746           DB      PTRNA           ;A
06A7 9F       =1747           DB      PTRNB           ;B
06A8 CB       =1748           DB      PTRNC           ;C
06A9 BD       =1749           DB      PTRND           ;D
06AA CF       =1750           DB      PTRNE           ;E
06AB CE       =1751           DB      PTRNF           ;F
              =1752 $EJECT
              =1753
              =1754 ; PLACE DIAGNOSTIC MESSAGE IN DISPLAY BUFFER
              =1755 ;         ON ENTRY R2 CONTAINS MESSAGE ID
              =1756 ;         ON EXIT A IS ZERO IF FOG FILM MESSAGE DISPLAYED
              =1757 ;         WHEN ENTERED, OTHERWISE NON-ZERO
              =1758
06AC B831     =1759 MSGE:     MOV     R0,#PHOTDS      ;ADDRESS OF DIAGNOSTIC BUFFER
06AE F0       =1760           MOV     A,@R0           ;CHECK IF WE
06AF D3CE     =1761           XRL     A,#0CEH         ;HAVE FOGGED FILM
06B1 C6BE     =1762           JZ      MS2             ;DON'T CHANGE DISPLAY IF FILM FOGGED
```

```
06B3 FA      =1763            MOV   A,R2              ;GET THE MESSAGE #
06B4 E7      =1764            RL    A                 ;DOUBLE IT FOE TABLE INDEX
06B5 03BF    =1765            ADD   A,#MSGTBL MOD 256  ;MESSAGE TABLE ADDRESS
06B7 A0      =1766            MOV   @R0,A             ;SAVE TABLE POINTER
06B8 A3      =1767 MS1:       MOVP  A,@A              ;GET MESSAGE BITS
06B9 20      =1768            XCH   A,@R0             ;AND PUT IN BUFFER/GET TABLE PNTR
06BA 18      =1769            INC   R0                ;PNTR TO NEXT BUFFER ADDRESS
06BB 17      =1770            INC   A                 ;PNTR TO NEXT TABLE ENTRY
06BC A3      =1771            MOVP  A,@A              ;PUT NEXT TABLE ENTRY
06BD A0      =1772            MOV   @R0,A             ;INTO BUFFER
06BE 83      =1773 MS2:       RET
             =1774
06BF         =1775 MSGTBL     EQU   $
0000         =1776 MSGBLK     EQU   0
06BF 80      =1777            DB    080H,080H
06C0 80      =
0001         =1778 MSGNC      EQU   1
06C1 FA      =1779            DB    0FAH,0CBH
06C2 CB      =
0002         =1780 MSGOD      EQU   2
06C3 FB      =1781            DB    0FBH,0BDH
06C4 BD      =
0003         =1782 MSGCF      EQU   3
06C5 CB      =1783            DB    0CBH,0CEH
06C6 CE      =
0004         =1784 MSGFF      EQU   4
06C7 CE      =1785            DB    0CEH,0CEH
06C8 CE      =
0005         =1786 MSGNP      EQU   5
06C9 FA      =1787            DB    0FAH,0EEH
06CA EE      =
0006         =1788 MSGDD      EQU   6
06CB BD      =1789            DB    0BDH,0BDH
06CC BD      =
0007         =1790 MSGLL      EQU   7
06CD 8B      =1791            DB    08BH,08BH
06CE 8B      =
0008         =1792 MSGAC      EQU   8
06CF FE      =1793            DB    0FEH,0CBH
06D0 CB      =
0009         =1794 MSGOR      EQU   9
06D1 FB      =1795            DB    0FBH,0C2H
06D2 C2      =
000A         =1796 MSGNO      EQU   10
06D3 FA      =1797            DB    0FAH,0FBH
06D4 FB      =
000B         =1798 MSGAF      EQU   11
06D5 FE      =1799            DB    0FEH,0CEH
06D6 CE      =
000C         =1800 MSGEXP     EQU   12
000C         =1801 MSGEX0     EQU   12
06D7 CF      =1802            DB    0CFH,PTRN0
06D8 FB      =
000D         =1803 MSGEX1     EQU   13
06D9 CF      =1804            DB    0CFH,PTRN1
06DA B0      =
000E         =1805 MSGEX2     EQU   14
06DB CF      =1806            DB    0CFH,PTRN2
06DC ED      =
000F         =1807 MSGEX3     EQU   15
06DD CF      =1808            DB    0CFH,PTRN3
06DE F5      =
```

```
0010            =1809 MSGEX4  EQU     16
06DF CF         =1810         DB      0CFH,PTRN4
06E0 B6         =
0011            =1811 MSGEX5  EQU     17
06E1 CF         =1812         DB      0CFH,PTRN5
06E2 D7         =
0012            =1813 MSGEX6  EQU     18
06E3 CF         =1814         DB      0CFH,PTRN6
06E4 DF         =
                =1815
                =1816 ; GIVE A MESSAGE BEEP TO WAKE UP THE OPERATOR
                =1817 ;     R2 CONTAINS THE TONE VALUE
                =1818
06E5 BB00       =1819 BEEP:   MOV     R3,#0
06E7 2302       =1820 BP1:    MOV     A,#SPKR1
06E9 9E         =1821         ORLD    P6,A
06EA FA         =1822         MOV     A,R2
06EB EAEB       =1823 BP2:    DJNZ    R2,BP2
06ED AA         =1824         MOV     R2,A
06EE 230D       =1825         MOV     A,#SPKR0
06F0 9E         =1826         ANLD    P6,A
06F1 FA         =1827         MOV     A,R2
06F2 EAF2       =1828 BP3:    DJNZ    R2,BP3
06F4 AA         =1829         MOV     R2,A
06F5 EBE7       =1830         DJNZ    R3,BP1
06F7 83         =1831         RET
                =1832 $EJECT
                =1833
                =1834 ; DLOAD IS USED TO LOAD A NUMBER FROM INTERNAL RAM
                =1835 ; INTO THE DOUBLE PRECISION ACCUMULATOR (A,R2)
                =1836
0700            =1837         ORG     0700H
0700 18         =1838 DLOAD:  INC     R0              ;MOVE TO LOW ORDER
0701 F0         =1839         MOV     A,@R0           ;GET LOW ORDER BYTE
0702 AA         =1840         MOV     R2,A            ;AND PUT INTO LOW ORDER ACCUMULATOR
0703 C8         =1841         DEC     R0              ;ADJUST R0 BACK
0704 F0         =1842         MOV     A,@R0           ;AND GET THE HIGH ORDER BYTE
0705 F43F       =1843         CALL    FIXUP           ;MAKE INTO DP ACCUM
                =1844                                 ;AND FALL THRU TO TEST THE NUMBER
                =1845
                =1846 ; DTEST IS USED TO TEST THE VALUE OF THE DOUBLE
                =1847 ; PRECISION ACCUMULATOR.
                =1848 ;     ON RETURN CARRY SET FOR NON ZERO VALUE
                =1849
0707 97         =1850 DTEST:  CLR     C               ;ASSUME ZERO RESULT
0708 960E       =1851         JNZ     DTST1           ;JUMP IF NON-ZERO
070A 2A         =1852         XCH     A,R2            ;NOW GET LOW ORDER
070B C60F       =1853         JZ      DTST2           ;EXIT IF ZERO NUMBER
070D 2A         =1854         XCH     A,R2            ;RESTORE PROPER ORDER
070E A7         =1855 DTST1:  CPL     C               ;SHOW NON-ZER NUMBER
070F 83         =1856 DTST2:  RET                     ;AND RETURN
                =1857
                =1858 ; DSTORE IS USED TO STORE THE DOUBLE PRECISION ACCUMULATOR
                =1859 ; IN INTERNAL RAM
                =1860
0710 30         =1861 DSTORE: XCHD    A,@R0           ;STORE THE HIGH ORDER
0711 18         =1862         INC     R0
0712 2A         =1863         XCH     A,R2
0713 A0         =1864         MOV     @R0,A           ;STORE THE LOW ORDER TOO
0714 2A         =1865         XCH     A,R2
0715 C8         =1866         DEC     R0              ;ADJUST FOR NO CHANGE IN R0
```

```
0716 83       =1867         RET
              =1868
              =1869 ; DABS CONVERTS THE DOUBLE PRECISION ACCUMULATOR TO
              =1870 ; AN ABSOLUTE VALUE
              =1871
0717 F21A     =1872 DABS:   JB7     DAB1        ;FIRST CHECK IF IT'S NEGATIVE
0719 83       =1873         RET
071A 2A       =1874 DAB1:   XCH     A,R2        ;GET LS BYTE
071B 37       =1875         CPL     A
071C 0301     =1876         ADD     A,#01H      ;ADD THE 1
071E 2A       =1877         XCH     A,R2        ;NOW GET HIGH ORDR
071F 37       =1878         CPL     A           ;COMPLEMENT MS BYTE
0720 1300     =1879         ADDC    A,#0        ;AND ADD CARRY
0722 83       =1880         RET
              =1881 ;
0723 AB       =1882 DADD:   MOV     R3,A        ;SAVE HIGH ORDER FOR A BIT
0724 18       =1883         INC     R0
0725 F0       =1884         MOV     A,@R0       ;GET LOW ORDER OF ADDEND
0726 6A       =1885         ADD     A,R2        ;DO LOW ORDER SUM
0727 AA       =1886         MOV     R2,A
0728 C8       =1887         DEC     R0
0729 F0       =1888         MOV     A,@R0       ;GET HIGH ORDER OF ADDEND
072A F43F     =1889         CALL    FIXDP
072C 7B       =1890         ADDC    A,R3        ;DO HIGH ORDER WITH CARRY PROPAGATE
072D E407     =1891         JMP     DTEST       ;AND FINISH WITH A TEST OF THE RESULT
              =1892 ;
              =1893 ; DSUB IS USED TO SUBTRACT ONE DOUBLE PRECISION NUMBER
              =1894 ; FROM THE DOUBLE PRECISION ACCUMULATOR
              =1895 ;
072F 37       =1896 DSUB:   CPL     A
0730 AB       =1897         MOV     R3,A        ;SAVE THE HIGH ORDER
0731 18       =1898         INC     R0
0732 FA       =1899         MOV     A,R2        ;GET LOW ORDER OF ACCUMULATOR
0733 37       =1900         CPL     A
0734 60       =1901         ADD     A,@R0       ;DO DIFFERENCE THING
0735 37       =1902         CPL     A
0736 AA       =1903         MOV     R2,A        ;AND SET LOW ORDER
0737 C8       =1904         DEC     R0
0738 F0       =1905         MOV     A,@R0       ;GET HIGH ORDER OF ACCUMULATOR
0739 F43F     =1906         CALL    FIXDP
073B 7B       =1907         ADDC    A,R3        ;DO HIGH ORDER PART
073C 37       =1908         CPL     A
073D E407     =1909         JMP     DTEST       ;AN FINISH BY TESTING
              =1910
073F 43F0     =1911 FIXDP:  ORL     A,#0F0H
0741 7245     =1912         JB3     FX1
0743 530F     =1913         ANL     A,#0FH
0745 83       =1914 FX1:    RET
              =1915
              =1916 ; DASR WILL SHIFT THE ACCUMULATOR RIGHT ONE BIT
              =1917 ; THE SHIFT IS A SIGNED SHIFT
              =1918
0746 97       =1919 DASR:   CLR     C           ;INITIALIZE CARRY BIT TO ON
0747 A7       =1920         CPL     C
0748 F24B     =1921         JB7     DASR1       ;JMP IF NEGATIVE NUMBER
074A 97       =1922         CLR     C           ;SET CARRY TO SIGN BIT
074B 67       =1923 DASR1:  RRC     A           ;SHIFT HIGH ORDER
074C 2A       =1924         XCH     A,R2
074D 67       =1925         RRC     A           ;AND MOV TO LO ORDER TOO
074E 2A       =1926         XCH     A,R2
074F E407     =1927         JMP     DTEST       ;THEN SET CONDITION CODES
```

```
                =1928
                =1929 ; DASL IS USED TO SHIFT THE DOUBLE PRECISION ACCUMULATOR
                =1930 ; LEFT ONE BIT
                =1931
0751 2A         =1932 DASL:   XCH     A,R2            ;REVERSE HALVES
0752 97         =1933         CLR     C               ;AND CLEAR CARRY
0753 F7         =1934         RLC     A               ;INSERT A ZERO IN LOW ORDER
0754 2A         =1935         XCH     A,R2
0755 F7         =1936         RLC     A               ;AND PROPAGATE TO HIGH PART
0756 E407       =1937         JMP     DTEST           ;TEST THE RESULT
                =1938
                =1939 ; DELAY LOOP
                =1940
                =1941 ;   ON ENTRY R2 SPECIFIES THE DELAY IN MSEC
                =1942 ;   R2 AND R3 ARE MODIFIED
                =1943
0758 BBC8       =1944 DELAY:  MOV     R3,#200
075A EB5A       =1945 DL1:    DJNZ    R3,DL1
075C EA58       =1946         DJNZ    R2,DELAY
075E 83         =1947         RET
                =1948 $EJECT
                =1949 ;
                =1950 ; DISPLAY DRIVER
                =1951 ;   A THRU R3 ARE MODIFIED
                =1952 ;
075F 8A40       =1953 DSPLAY: ORL     P2,#CNTRLM      ;PUT DISPLAY IN CONTROL MODE
0761 B87F       =1954         MOV     R0,#IODSP       ;SELECT DISPLAY-CONTROL MODE
0763 23F0       =1955         MOV     A,#DSPMDE       ;LOAD THE
0765 90         =1956         MOVX    @R0,A           ;DISPLAY MODE
0766 9ABF       =1957         ANL     P2,#DATAM       ;PUT DISPALY IN DATA MODE
0768 BA08       =1958         MOV     R2,#NDIGIT      ;NO. OF DISPLAY DIGITS
076A BB75       =1959         MOV     R3,#DSPTBL MOD 256      ;DISPLAY BUFFER POINTER
076C FB         =1960 DSP1:   MOV     A,R3
076D A3         =1961         MOVP    A,@A
076E A9         =1962         MOV     R1,A
076F F1         =1963 DSP1A:  MOV     A,@R1           ;GET VALUE FROM BUFFER
0770 90         =1964 DSP1B:  MOVX    @R0,A           ;AND SEND IT TO DISPLAY
0771 1B         =1965         INC     R3              ;INCREMENT BUFFER POINTER
0772 EA6C       =1966         DJNZ    R2,DSP1         ;ANOTHER DIGIT?
0774 83         =1967         RET
                =1968
                =1969 ; DISPLAY TABLE FORMATTER
                =1970
0775 32         =1971 DSPTBL: DB      PHOTDS+1
0776 31         =1972         DB      PHOTDS
0777 35         =1981         DB      LODS+2
0778 34         =1982         DB      LODS+1
0779 33         =1983         DB      LODS
077A 38         =1984         DB      HIDS+2
077B 37         =1985         DB      HIDS+1
077C 36         =1986         DB      HIDS
                =1988 $EJECT
                =1989
                =1990 ; NITRON ROUTINES
                =1991
                =1992 ; ADDRESS SELECT
                =1993 ;   R1 CONTAINS THE NITRON ADDRESS
                =1994 ;   A,R2, AND R3 ARE MODIFIED
                =1995
077D 2301       =1996 ADDRIN: MOV     A,#ADDRMD       ;PUT THE DEVICE IN
077F 3D         =1997         MOVD    P5,A            ;ADDRESS MODE
```

```
0780 F9      =1998         MOV    A,R1           ;MOVE THE ADDRESS
0781 E7      =1999         RL     A              ;MOST SIGNIFICANT
0782 E7      =2000         RL     A              ;ADDRESS BIT
0783 E7      =2001         RL     A              ;IN FIRST
0784 BA05    =2002         MOV    R2,#5          ;NO. OF ADDRESS BITS
0786 F7      =2003 ADD1:   RLC    A              ;NEXT ADDRESS
0787 AB      =2004         MOV    R3,A           ;BIT
0788 997F    =2005         ANL    P1,#DAT0       ;CLEAR THE DATA BIT
078A E68E    =2006         JNC    ADD2           ;IS THIS TRUE?
078C 8980    =2007         ORL    P1,#DAT1       ;SET THE DATA BIT
078E F4A7    =2008 ADD2:   CALL   NITCLK         ;CLOCK THE ADDRESS BIT
0790 EA86    =2009         DJNZ   R2,ADD1        ;ANOTHER BIT?
0792 83      =2010         RET                   ;EXIT ROUTINE
             =2011
             =2012 ; ERASE A NITRON WORD
             =2013 ;       R1 CONTAINS THE NITRON ADDRESS
             =2014 ;       A,R2, AND R3 ARE MODIFIED
             =2015
0793 F47D    =2016 ERASE:  CALL   ADDRIN         ;LOAD THE ADDRESS
0795 F4A4    =2017         CALL   SETUP          ;SET-UP THE DEVICE
0797 2304    =2018         MOV    A,#ERASMD      ;PUT THE DEVICE
0799 3D      =2019         MOVD   P5,A           ;IN ERASE MODE
079A BB2F    =2020         MOV    R3,#47         ;47 x 6.4 = 300 MSEC DELAY
079C BA00    =2021 ER1:    MOV    R2,#0          ;6.4 MSEC INNER LOOP
079E F4A7    =2022 ER2:    CALL   NITCLK         ;CLOCK PULSE
07A0 EA9E    =2023         DJNZ   R2,ER2         ;END OF INNER LOOP?
07A2 EB9C    =2024         DJNZ   R3,ER1         ;END OF DELAY?
             =2025 ;       FALL THRU TO SETUP
             =2026
             =2027 ;SET-UP THE DEVICE
             =2028 ;       A IS MODIFIED
             =2029
07A4 2300    =2030 SETUP:  MOV    A,#STUPMD      ;PUT THE DEVICE
07A6 3D      =2031         MOVD   P5,A           ;IN SET UP MODE
             =2032 ;       FALL THRU TO NITRON CLOCK
             =2033
             =2034 ; NITRON CLOCK PULSE
             =2035
07A7 2308    =2036 NITCLK: MOV    A,#CLKPLS      ;SET THE
07A9 8D      =2037         ORLD   P5,A           ;CLOCK PULSE
07AA 37      =2038         CPL    A              ;AND THEN
07AB 9D      =2039         ANLD   P5,A           ;CLEAR IT
07AC FB      =2040         MOV    A,R3
07AD 83      =2041         RET
             =2042
             =2043 ; WRITE A NITRON WORD
             =2044 ;       A,R2 CONTAINS THE DATA
             =2045 ;       R0 CONTAINS THE 8035 ADDRESS
             =2046 ;       R1 CONTAINS THE NITRON ADDRESS
             =2047 ;       A,R2, AND R3 ARE MODIFIED
             =2048
07AE F493    =2049 WRITE:  CALL   ERASE          ;ERASE THE PREVIOUS DATA
07B0 2305    =2050         MOV    A,#SINMD       ;PUT THE DEVICE
07B2 3D      =2051         MOVD   P5,A           ;IN SERIAL DATA IN MODE
07B3 85      =2052         CLR    F0             ;INITIALIZE FOR 2 BYTE TRANSFER
07B4 F0      =2053         MOV    A,@R0          ;GET THE MS BYTE
07B5 18      =2054         INC    R0             ;PNTR TO LS BYTE
07B6 BA08    =2055 WR1:    MOV    R2,#8          ;BIT COUNTER
07B8 F7      =2056 WR2:    RLC    A              ;DATA
07B9 AB      =2057         MOV    R3,A           ;BIT
07BA 997F    =2058         ANL    P1,#DAT0       ;SET TO ZERO
```

```
07BC E6C0    =2059          JNC    WR3          ;IS THAT RIGHT
07BE 8980    =2060          ORL    P1,#DAT1     ;NO, CHANGE IT
07C0 F4A7    =2061 WR3:     CALL   NITCLK       ;CLOCK IT
07C2 EAB8    =2062          DJNZ   R2,WR2       ;ANOTHER BIT?
07C4 F0      =2063          MOV    A,@R0
07C5 95      =2064          CPL    F0
07C6 B6B6    =2065          JF0    WR1
07C8 C8      =2066          DEC    R0
07C9 2302    =2067          MOV    A,#WRTEMD    ;PUT THE DEVICE
07CB 3D      =2068          MOVD   P5,A         ;IN WRITE MODE
07CC BB04    =2069          MOV    R3,#4        ;4 x 6.4 = 25 MSEC DELAY
07CE BA00    =2070 WR4:     MOV    R2,#0        ;6.4 MSEC INNER LOOP
07D0 F4A7    =2071 WR5:     CALL   NITCLK       ;CLOCK
07D2 EAD0    =2072          DJNZ   R2,WR5       ;END OF INNER LOOP
07D4 EBCE    =2073          DJNZ   R3,WR4       ;END OF LOOP
             =2074 ;        FALL THRU TO STANDBY
             =2075 ;
             =2076 ; STANDBY
             =2077 ;        A IS MODIFIED
             =2078
07D6 2307    =2079 STNDBY:  MOV    A,#STNDMD    ;PUT DEVICE IN
07D8 3D      =2080          MOVD   P5,A         ;STAND-BY MODE
07D9 E4A7    =2081          JMP    NITCLK       ;AND CLOCK IT
             =2082
             =2083 ; READ A NITRON WORD
             =2084 ;   R0 CONTAINS ADDRESS
             =2085 ;   DATA IS RETURNED IN A,R2
             =2086 ;   A,R2,R3, AND F0 ARE MODIFIED
             =2087
07DB F47D    =2088 READ:    CALL   ADDRIN       ;SELECT THE ADDRESS
07DD 2303    =2089          MOV    A,#READMD    ;XFER THE
07DF 3D      =2090          MOVD   P5,A         ;ADDRESSED DATA
07E0 F4A7    =2091          CALL   NITCLK       ;TO THE OUPUT REGISTER
07E2 2306    =2092          MOV    A,#SOUTMD    ;PUT THE DEVICE
07E4 3D      =2093          MOVD   P5,A         ;IN SERIAL DATA OUT MODE
07E5 8980    =2094          ORL    P1,#DAT1     ;SET DATA HIGH TO READ
07E7 85      =2095          CLR    F0           ;2 BYTES
07E8 BB08    =2096 RD1:     MOV    R3,#8        ;8 BIT COUNTER
07EA F4A7    =2097 RD2:     CALL   NITCLK
07EC 09      =2098          IN     A,P1         ;GET DATA BIT
07ED F7      =2099          RLC    A            ;AND MERGE
07EE F0      =2100          MOV    A,@R0        ;INTO
07EF F7      =2101          RLC    A            ;RAM
07F0 A0      =2102          MOV    @R0,A
07F1 EBEA    =2103          DJNZ   R3,RD2       ;ANOTHER BIT?
07F3 18      =2104          INC    R0           ;MOVE PNTR TO NEXT BYTE
07F4 95      =2105          CPL    F0
07F5 B6E8    =2106          JF0    RD1
07F7 C8      =2107          DEC    R0           ;RESTORE
07F8 C8      =2108          DEC    R0           ;RAM PNTR
07F9 E4D6    =2109          JMP    STNDBY
             =2110 $EJECT
              2111 $INCLUDE (:F1:AUTCMP.SRC)
0800         =2112          ORG    0800H
             =2113
             =2114 ; OUTPUT DAC BUFFER TO DACS
             =2115 ;    IF DACERR = 0 THEN OUTPUT DIRECTLY
             =2116 ;    IF DACERR = 1 THEN UNRAVEL THE BITS
             =2117 ;    THIS OPTION IS REQUIRED FOR THE FIRST 627 LOGIC BOARD
             =2118
0000         =2119 DACERR   EQU    0
```

```
               =2120
0800 85        =2121 OUTDAC: CLR   F0              ;CLEAR F0 = CONTRAST DAC
0801 B9F7      =2122        MOV   R1,#IOBRHI      ;HI ORDER DA BR DAC
0803 95        =2123 OUT1:  CPL   F0              ;SWITCH DAC
0804 B83B      =2124        MOV   R0,#DACMSB      ;DAC BUFFER ADDR
0806 F0        =2125        MOV   A,@R0           ;GET MS NIBBLE
0807 B60A      =2126        JF0   OUT2            ;NIBBLE
0809 47        =2127        SWAP  A               ;AND
080A 5303      =2128 OUT2:  ANL   A,#03H          ;REMOVE EXTANEOUS BITS
080C 77        =2129        RR    A               ;POSITION TO
080D 77        =2130        RR    A               ;MS BITS OF BYTE
080E AC        =2131        MOV   R4,A            ;AND SAVE
080F 18        =2132        INC   R0              ;NOW MOVE PNTR
0810 B613      =2133        JF0   OUT3            ;TO LS
0812 18        =2134        INC   R0              ;BYTE
0813 F0        =2135 OUT3:  MOV   A,@R0           ;GET THE BYTE
0814 77        =2136        RR    A               ;AND REPOSITION
0815 77        =2137        RR    A               ;THE BITS
0816 AA        =2138        MOV   R2,A            ;AND SAVE
0817 533F      =2139        ANL   A,#03FH         ;FORM
0819 4C        =2140        ORL   A,R4            ;HI OUTPUT BYTE
081A 91        =2165        MOVX  @R1,A           ;OUTPUT HI DAC BYTE
081B FA        =2166        MOV   A,R2            ;GET LO BYTE
081C C9        =2167        DEC   R1              ;MOVE DA
081D 91        =2168        MOVX  @R1,A           ;OUTPUT LO DAC BYTE
081E B9EF      =2169        MOV   R1,#IOCTHI      ;HI ORDER CONTRAST DAC DA
0820 B603      =2170        JF0   OUT1            ;LAST DAC?
0822 83        =2171        RET
               =2172
               =2173 ; MONITOR MUST BE UNBLANKED WHEN THIS CODE IS EXECUTED
               =2174
0823 B8F7      =2175 AUTCMP: MOV  R0,#IODPSW      ;ARE WE
0825 80        =2176        MOVX  A,@R0           ;TO SET THE BRIGHTNESS
0826 D22C      =2177        JB6   AC0             ;AND CONTRAST DACS DIRECTLY
0828 5479      =2181        CALL  DIRDAC
082A 0474      =2183        JMP   AC5
082C B822      =2184 AC0:   MOV   R0,#CALSW       ;IS THE OPERATOR
082E F0        =2185        MOV   A,@R0           ;PLAYING WITH THE
082F C636      =2186        JZ    AC30            ;CALABRATION SWITCHES?
0831 B824      =2187        MOV   R0,#CALRDY      ;FORCE AT AUTOCOMP WHEN THE
0833 B0C0      =2188        MOV   @R0,#0C0H       ;OPERATOR QUITS DIDDLING
0835 83        =2189        RET
0836 B824      =2190 AC30:  MOV   R0,#CALRDY      ;GET THE
0838 F0        =2191        MOV   A,@R0           ;CALIBRATION STATUS
0839 53C0      =2192        ANL   A,#0C0H         ;INITIATE
083B D3C0      =2193        XRL   A,#0C0H         ;ANOTHER
083D C645      =2194        JZ    AC2             ;AUTOCOMP CYCLE
083F F0        =2195        MOV   A,@R0
0840 F29F      =2196        JB7   AC20            ;CALIBRATION COMPLETE?
0842 D26E      =2197        JB6   AC3             ;CALIBRATION IN PROGRESS?
0844 83        =2198        RET
               =2199
               =2200 ; INITIALIZE AUTOCOMP
               =2201
0845 F0        =2202 AC2:   MOV   A,@R0           ;GIVE UP
0846 37        =2203        CPL   A               ;IF AUTOCOMP
0847 C67C      =2204        JZ    AC10            ;OVER-RANGE
0849 07        =2205        DEC   A               ;OR AUTOCOMP
084A C67C      =2206        JZ    AC10            ;FAILURE
084C B82B      =2214        MOV   R0,#LDNSTY      ;GET
084E E5        =2215        SEL   MB0
```

```
084F F400    =2216          CALL    DLOAD         ;LOW DENSITY
0851 B82F    =2217          MOV     R0,#HDNSTY    ;SUBTRACT
0853 F42F    =2218          CALL    DSUB          ;HI DENSITY
0855 F5      =2220          SEL     MB1
0856 B824    =2221          MOV     R0,#CALRDY
0858 E65F    =2222          JNC     AC2C          ;OK IF EQUAL
085A F25F    =2231          JB7     AC2C
085C B0FD    =2233          MOV     @R0,#-3
085E 83      =2234          RET
             =2235
085F 23FB    =2236 AC2C:    MOV     A,#NOT BLANK  ;UNBLANK THE MONITOR
0861 9E      =2237          ANLD    P6,A          ;FOR AUTOCOMP
0862 B044    =2238          MOV     @R0,#044H     ;4 BITS ON FIRST APPROX
0864 A5      =2239          CLR     F1            ;ADJUST BRIGHTNESS FIRST
0865 14C9    =2240 AC1:     CALL    INISA         ;INITIALIZE BRIGHTNESS/CONTRAST SA
0867 B5      =2241          CPL     F1            ;SWITCH ADJUSTMENTS
0868 7665    =2242          JF1     AC1           ;CONTRAST SA?
086A 14EB    =2243 AC5A:    CALL    SELVID
086C 0474    =2244          JMP     AC5           ;START THE CALIBRATION
             =2245
086E 545E    =2246 AC3:     CALL    GTPHTR        ;GET THE PHOTOMETER VALUE
0870 EE7D    =2247          DJNZ    R6,AC11
0872 3400    =2248 AC4:     CALL    SAPPRX        ;DO NEXT PHASE OF SUCCESSIVE APPROX
0874 1400    =2249 AC5:     CALL    OUTDAC        ;OUTPUT TO THE DAC
0876 BE14    =2250          MOV     R6,#20        ;20 VS DELAY FOR PHOTOMETER
0878 B827    =2251          MOV     R0,#LSTPHT    ;INITIALIZE LAST READING
087A B0OF    =2252          MOV     @R0,#0FH      ;TO AN INVALID VALUE
087C 83      =2253 AC10:    RET
             =2254
             =2255 ; CHECK FOR STABLE READING
             =2256
087D AC      =2257 AC11:    MOV     R4,A          ;SAVE
087E 2A      =2258          XCH     A,R2          ;THE DP
087F AD      =2259          MOV     R5,A          ;ACCUM.
0880 2A      =2260          XCH     A,R2
0881 B827    =2261          MOV     R0,#LSTPHT    ;COMPARE WITH
0883 E5      =2262          SEL     MB0
0884 F42F    =2263          CALL    DSUB          ;PREV. READING
0886 F5      =2264          SEL     MB1
0887 FD      =2265          MOV     A,R5          ;RESTORE
0888 AA      =2266          MOV     R2,A          ;PHOTOMETER
0889 FC      =2267          MOV     A,R4          ;READING
088A B920    =2268          MOV     R1,#LSTCNT
088C 21      =2269          XCH     A,@R1
088D F695    =2270          JC      AC12
088F 03F0    =2271          ADD     A,#0F0H
0891 21      =2272          XCH     A,@R1
0892 E672    =2273          JNC     AC4
0894 83      =2274          RET
0895 530F    =2275 AC12:    ANL     A,#0FH
0897 4310    =2276          ORL     A,#010H
0899 21      =2277          XCH     A,@R1
089A E5      =2278          SEL     MB0
089B F410    =2279          CALL    DSTORE        ;STORE THE LAST READING
089D F5      =2280          SEL     MB1
089E 83      =2281          RET
             =2282
             =2283 ; TRACKING MODE
             =2284
089F B8F4    =2285 AC20:    MOV     R0,#IOUPR     ;INHIBIT TRACKING
08A1 80      =2286          MOVX    A,@R0         ;IF VIEW
```

```
08A2 32A5    =2287        JB1     AC23         ;DOOR OPEN
08A4 83      =2288        RET
08A5 B8F7    =2289 AC23:  MOV     R0,#IODPSW   ;OR IF TRACKING
08A7 80      =2290        MOVX    A,@R0        ;DISABLED BY
08A8 32AB    =2291        JB1     AC24         ;DIP SWITCH SETTING
08AA 83      =2292        RET
08AB EE7C    =2293 AC24:  DJNZ    R6,AC10      ;WAIT FOR 20 VS
08AD 545E    =2294        CALL    GTPHTR       ;GET PHOTOMETER VALUE
08AF B82F    =2301        MOV     R0,#HDNSTY
08B1 B9F7    =2302        MOV     R1,#IODPSW
08B3 81      =2303        MOVX    A,@R1
08B4 72B8    =2304        JB3     AC21         ;CHECK INVERSE VIDEO ON ALL CHANNELS
08B6 B82B    =2305        MOV     R0,#LDNSTY
08B8 FB      =2306 AC21:  MOV     A,R3
08B9 E5      =2307        SEL     MB0
08BA F42F    =2309        CALL    DSUB         ;ACTUAL-TARGET
08BC F5      =2310        SEL     MB1
08BD E66A    =2311        JNC     AC5A         ;NO ACTION IF DEAD ON
08BF F2C5    =2312        JB7     AC22         ;ABOVE TARGET?
08C1 5438    =2313        CALL    DECRBR       ;INCREMENT BRIGHTNESS
08C3 046A    =2314        JMP     AC5A
08C5 5433    =2315 AC22:  CALL    INCRBR
08C7 046A    =2316        JMP     AC5A
             =2317
             =2318 ; INITIALIZE SUCCESSIVE APPROXIMATION REGISTERS
             =2319
08C9 76D5    =2320 INISA: JF1     ISA1
08CB 2302    =2321        MOV     A,#02H
08CD BA00    =2322        MOV     R2,#0
08CF 34E0    =2323        CALL    STRDAC
08D1 2302    =2324        MOV     A,#02H
08D3 04E4    =2325        JMP     ISA3
             =2326
             =2327 ; INITIALIZE CONTRAST DAC
             =2328
08D5 BA03    =2329 ISA1:  MOV     R2,#03H
08D7 B823    =2330        MOV     R0,#CNRAST
08D9 F0      =2331        MOV     A,@R0
08DA 32DE    =2332        JB1     ISA2
08DC BA01    =2333        MOV     R2,#01H
08DE 27      =2334 ISA2:  CLR     A
08DF 2A      =2335        XCH     A,R2
08E0 34E0    =2336        CALL    STRDAC
08E2 2301    =2337        MOV     A,#01H
             =2338
             =2339 ; INITIALIZE SA REGISTER
             =2340
08E4 B81C    =2341 ISA3:  MOV     R0,#SAREG
08E6 A0      =2342        MOV     @R0,A
08E7 18      =2343        INC     R0
08E8 B000    =2344        MOV     @R0,#0
08EA 83      =2345        RET
             =2346
             =2347 ; SELECT PROPER VIDEO
             =2348
08EB 2303    =2349 SELVID: MOV    A,#VCLR      ;CLEAR VIDEO (DIM VIDEO)
08ED 9F      =2350        ANLD    P7,A         ;TO PREPARE FOR SELECTION
08EE 2304    =2356        MOV     A,#HISS
08F0 76F4    =2357        JF1     SLV1         ;CONTRAST?
08F2 2308    =2358        MOV     A,#LISS      ;PUT UP LOW SIGNAL
08F4 8F      =2360 SLV1:  ORLD    P7,A         ;COMPLETE THE SELECTION
```

```
08F5 83          =2361           RET
                 =2362           $EJECT
0900             =2363           ORG     0900H
                 =2364
                 =2365 ; FORMAT NEW DAC VALUE
                 =2366 ;     THE DAC TO BE FORMATTED IS SPECIFIED IN F1
                 =2367 ;     F1 = 0 FOR BRIGHTNESS DAC
                 =2368 ;     F1 = 1 FOR CONTRAST DAC
                 =2369 ; THE PHOTOMETER VALUE IS IN A,R2
                 =2370
0900 AC          =2376 SAPPRX:   MOV     R4,A
0901 34A1        =2377           CALL    GETRQ           ;GET PNTR TO TARGET VALUE
0903 FC          =2378           MOV     A,R4
0904 E5          =2380 SAP1:     SEL     MB0
0905 F42F        =2381           CALL    DSUB            ;COMPARE WITH CURRENT VALUE (ACTUAL-TARGET)
0907 B83E        =2382           MOV     R0,#TEMP
0909 F410        =2383           CALL    DSTORE
090B F5          =2384           SEL     MB1
090C 85          =2385           CLR     F0
090D F210        =2386           JB7     SAP2            ;IF ABOVE TARGET, CLEAR FLAG
090F 95          =2387           CPL     F0
0910 34D0        =2388 SAP2:     CALL    GETDAC          ;GET THE DAC VALUE
0912 5400        =2389           CALL    UPDATE          ;UPDATE DAC VALUE
0914 34E0        =2390           CALL    STRDAC          ;AND RESTORE
0916 B824        =2391           MOV     R0,#CALRDY      ;DECREMENT # OF
0918 F0          =2392           MOV     A,@R0           ;OF BITS IN
0919 07          =2393           DEC     A               ;THIS APPROX
091A A0          =2394           MOV     @R0,A           ;PHASE
091B 530F        =2395           ANL     A,#0FH          ;MORE REMAINING
091D 9640        =2396           JNZ     SAP5            ;REMAINING?
091F 34D0        =2397 SAP3:     CALL    GETDAC
0921 B5          =2398           CPL     F1
0922 7633        =2399           JF1     SAP4            ;INCREMENT ON BRIGHTNESS DAC ONLY
0924 B820        =2400           MOV     R0,#LSTCNT      ;STORE THE
0926 E5          =2401           SEL     MB0             ;LAST CONTRAST DAC
0927 F410        =2402           CALL    DSTORE          ;VALUE
0929 F5          =2403           SEL     MB1
092A B824        =2404           MOV     R0,#CALRDY
092C F0          =2405           MOV     A,@R0
092D 47          =2406           SWAP    A
092E 17          =2407           INC     A
092F 47          =2408           SWAP    A
0930 F233        =2409           JB7     SAP4            ;DON'T UPDATE IF AT END OF TABLE
0932 A0          =2410           MOV     @R0,A
0933 F0          =2411 SAP4:     MOV     A,@R0
0934 47          =2412           SWAP    A
0935 5303        =2413           ANL     A,#03H
0937 039D        =2414           ADD     A,#(SATBL MOD 256)
0939 A3          =2415           MOVP    A,@A
093A 30          =2416           XCHD    A,@R0           ;FOR NEXT PHASE
093B 14C9        =2417           CALL    INISA
093D 14EB        =2418           CALL    SELVID
093F 83          =2419           RET
0940 34D0        =2420 SAP5:     CALL    GETDAC          ;GET THE DAC VALUE
0942 5413        =2421           CALL    NXTAPR          ;AND INSERT THE NEXT TEST BIT
0944 F649        =2422           JC      SAP6            ;ANOTHER TEST BIT?
0946 34E0        =2423           CALL    STRDAC          ;STORE NEXT TEST VALUE IN DAC
0948 83          =2424           RET
0949 B824        =2425 SAP6:     MOV     R0,#CALRDY
094B 764F        =2426           JF1     SAP7            ;NO, CONTRAST ADJUSTMENT DONE YET?
094D 241F        =2427           JMP     SAP3            ;TRY THE NEXT PARAMETER
```

```
094F 34D0   =2428 SAP7:   CALL   GETDAC       ;GET CURRENT CONTRAST DAC VALUE
0951 B820   =2429         MOV    R0,#LSTCNT   ;PNTR TO LAST CONTRAST DAC VALUE
0953 E5     =2430         SEL    MB0
0954 F42F   =2431         CALL   DSUB         ;GET
0956 F417   =2432         CALL   DABS         ;DIFFERENCE
0958 F5     =2433         SEL    MB1
0959 2A     =2434         XCH    A,R2
095A 53FE   =2435         ANL    A,#0FEH
095C 961F   =2436         JNZ    SAP3         ;CONTINUE IF CONTRAST CHANGED
095E B824   =2437         MOV    R0,#CALRDY
0960 34D0   =2438         CALL   GETDAC       ;GET CONTRAST DAC VALUE
0962 AB     =2439         MOV    R3,A
0963 4A     =2440         ORL    A,R2         ;ERROR IF
0964 C69A   =2441         JZ     SAP11        ;CONTRAST DAC AT ZERO
0966 FB     =2442         MOV    A,R3
0967 37     =2443         CPL    A
0968 5303   =2444         ANL    A,#03H
096A 2A     =2445         XCH    A,R2
096B 37     =2446         CPL    A
096C 4A     =2447         ORL    A,R2         ;ERROR IF
096D C69A   =2448         JZ     SAP11        ;CONTRAST DAC AT FULL SCALE
096F B83E   =2449         MOV    R0,#TEMP     ;GET THE LAST
0971 E5     =2450         SEL    MB0
0972 F400   =2451         CALL   DLOAD        ;CONTRAST ERROR
0974 F417   =2452         CALL   DABS
0976 F5     =2453         SEL    MB1
0977 B824   =2454         MOV    R0,#CALRDY
0979 9680   =2455         JNZ    SAP8A
097B FA     =2456         MOV    A,R2
097C 53F8   =2457         ANL    A,#0F8H
097E C683   =2458         JZ     SAP8
0980 B0FE   =2459 SAP8A:  MOV    @R0,#-2
0982 83     =2460         RET
0983 B000   =2461 SAP8:   MOV    @R0,#0H      ;SET CALIBRATION FOR NO TRACKING
0985 A5     =2462         CLR    F1           ;TRACK BRIGHTNESS DAC
0986 B923   =2463         MOV    R1,#CMRAST   ;GET THE
0988 F1     =2464         MOV    A,@R1        ;CAMERA
0989 37     =2465         CPL    A            ;STATUS
098A 328D   =2466         JB1    SAP9         ;NEGATIVE IMAGE
098C B5     =2467         CPL    F1           ;NO, POSITIVE IMAGE - TRACK CONTRAST DAC
098D 53F0   =2468 SAP9:   ANL    A,#0F0H
098F C699   =2469         JZ     SAP10
0991 D3F0   =2470         XRL    A,#0F0H
0993 C699   =2471         JZ     SAP10
0995 B080   =2472         MOV    @R0,#080H
0997 14EB   =2473         CALL   SELVID
0999 83     =2474 SAP10:  RET
            =2475
099A B0FF   =2476 SAP11:  MOV    @R0,#-1      ;OVER-RANGE INDICATION
099C 83     =2477         RET
            =2478
099D 04     =2479 SATBL:  DB     4
099E 06     =2480         DB     6
099F 08     =2481         DB     8
09A0 0C     =2482         DB     12
            =2484
            =2485 ; GET PICTURE REQUIREMENTS
            =2486
09A1 B823   =2487 GETRQ:  MOV    R0,#CMRAST   ;GET IDENTITY
09A3 F0     =2488         MOV    A,@R0        ;OF SELECTED
09A4 530C   =2489         ANL    A,#0CH       ;CHANNEL
```

```
09A6 77      =2490           RR      A
09A7 77      =2491           RR      A
09A8 17      =2492           INC     A
09A9 A9      =2493           MOV     R1,A
09AA 2310    =2494           MOV     A,#010H
09AC 77      =2495 GTRQ1:    RR      A
09AD E9AC    =2496           DJNZ    R1,GTRQ1
09AF AB      =2497           MOV     R3,A
09B0 B9F7    =2498           MOV     R1,#IODPSW      ;GET VIDEO
09B2 81      =2499           MOVX    A,@R1           ;SENSE FOR
09B3 5B      =2500           ANL     A,R3            ;SELECTED CHANNEL
09B4 BB00    =2501           MOV     R3,#0           ;ASSUME NORMAL
09B6 968A    =2502           JNZ     GTRQ2           ;CHECK ASSUMPTION
09B8 BB04    =2503           MOV     R3,#4           ;AND INSERT OFFSET IF INVERSE
09BA F0      =2504 GTRQ2:    MOV     A,@R0           ;GET CAMERA STATUS
09BB 32BF    =2505           JB1     GTRQ3           ;AND CHECK FOR FUSITIVE
09BD 1B      =2506           INC     R3              ;CHANGE OFFSET
09BE 1B      =2507           INC     R3              ;IF NEGATIVE
09BF 76C2    =2508 GTRQ3:    JF1     GTRQ4           ;INCREMENT TABLE
09C1 1B      =2509           INC     R3              ;OFFSET IF BRIGHTNESS ADJUSTMENT
09C2 FB      =2510 GTRQ4:    MOV     A,R3            ;FORM TABLE
09C3 03C8    =2511           ADD     A,#TRGT MOD 256 ;PNTR
09C5 A3      =2512           MOVP    A,@A            ;AND GET
09C6 A8      =2513           MOV     R0,A            ;PNTR TO TARGET VALUE
09C7 83      =2514           RET
             =2515
             =2516 ; TARGET SOURCE
             =2517
09C8 2B      =2518 TRGT:     DB      LDNSTY          ;CONTRAST ADJUST/POSITIVE/N USER VIDEO
09C9 2F      =2519           DB      HDNSTY          ;BRIGHTNESS ADJUST/POSITIVE/N USER VIDEO
09CA 2F      =2520           DB      HDNSTY          ;CONTRAST ADJUST/NEGATIVE USER VIDEO
09CB 2B      =2521           DB      LDNSTY          ;BRIGHTNESS ADJUST/NEGATIVE/N USER VIDEO
09CC 2F      =2522           DB      HDNSTY          ;CONTRAST ADJUST/POSITIVE/I USER VIDEO
09CD 2B      =2523           DB      LDNSTY          ;BRIGHTNESS ADJUST/POSITIVE/I USER VIDEO
09CE 2B      =2524           DB      LDNSTY          ;CONTRAST ADJUST/NEGATIVE/I USER VIDEO
09CF 2F      =2525           DB      HDNSTY          ;BRIGHTNESS ADJUST/POSITIVE/I USER VIDEO
             =2526
             =2528
             =2529 ; GET DAC VALUE IN DP FORMAT
             =2530
09D0 B93B    =2531 GETDAC:   MOV     R1,#DACMSB      ;GET DAC
09D2 F1      =2532           MOV     A,@R1
09D3 19      =2533           INC     R1              ;MOVE PNTR TO LS BYTE BR DAC
09D4 19      =2534           INC     R1
09D5 47      =2535           SWAP    A
09D6 76DA    =2536           JF1     GETD1           ;CONTRAST DAC?
09D8 C9      =2537           DEC     R1
09D9 47      =2538           SWAP    A               ;POSITION CONTRAST DAC VALUE
09DA 5303    =2539 GETD1:    ANL     A,#03H
09DC AA      =2540           MOV     R2,A            ;SAVE THESE BITS
09DD F1      =2541           MOV     A,@R1           ;GET LS BYTE
09DE 2A      =2542           XCH     A,R2            ;AND MAKE DP ACCUM
09DF 83      =2543           RET
             =2544
             =2545 ; STORE DP VALUE IN DAC BUFFER
             =2546
09E0 B93B    =2547 STRDAC:   MOV     R1,#DACMSB
09E2 76E7    =2548           JF1     STRD1           ;CONTRAST DAC?
09E4 31      =2549           XCHD    A,@R1
09E5 24EE    =2550           JMP     STRD2
09E7 47      =2551 STRD1:    SWAP    A               ;POSITION CONTRAST
```

```
09E8 21      =2552          XCH    A,@R1         ;MERGE WITH OTHER BITS
09E9 530F    =2553          ANL    A,#0FH
09EB 41      =2554          ORL    A,@R1
09EC A1      =2555          MOV    @R1,A
09ED 19      =2556          INC    R1
09EE 19      =2557 STRD2:   INC    R1
09EF FA      =2558          MOV    A,R2
09F0 A1      =2559          MOV    @R1,A
09F1 83      =2560          RET                  ;AND EXIT
             =2561 $EJECT
             =2562
0A00         =2563          ORG    0A00H
             =2564
0A00 AB      =2565 UPDATE:  MOV    R3,A
0A01 7604    =2566          JF1    UPD3
0A03 95      =2567          CPL    F0
0A04 B611    =2568 UPD3:    JF0    UPD1          ;IF BELOW TARGET, LEAVE BIT
0A06 B81C    =2569          MOV    R0,#SAREG     ;NO, PNTR TO SA REGISTER
0A08 F0      =2570          MOV    A,@R0         ;GET MS BYTE APPROXIMATION REGISTER
0A09 37      =2571          CPL    A             ;REMOVE
0A0A 5B      =2572          ANL    A,R3          ;TEST BIT FROM
0A0B AB      =2573          MOV    R3,A          ;DAC VALUE
0A0C 18      =2574          INC    R0            ;PNTR TO LS BYTE
0A0D F0      =2575          MOV    A,@R0         ;GET LS BYTE OF APPROX REGISTER
0A0E 37      =2576          CPL    A             ;REMOVE
0A0F 5A      =2577          ANL    A,R2          ;TEST BIT FROM
0A10 AA      =2578          MOV    R2,A          ;DAC VALUE
0A11 FB      =2579 UPD1:    MOV    A,R3
0A12 83      =2580          RET
             =2581
             =2582 ; FORM NXT APPROXIMATION
             =2583
0A13 97      =2584 NXTAPR:  CLR    C
0A14 AB      =2585          MOV    R3,A
0A15 7619    =2586          JF1    NXT3          ;CONTRAST?
0A17 4422    =2587          JMP    NXT5          ;NO SPECIAL PROCESSING FOR BRIGHTNESS
0A19 B823    =2588 NXT3:    MOV    R0,#CMRAST    ;GET THE
0A1B F0      =2589          MOV    A,@R0         ;CAMERA STATUS
0A1C 3222    =2590          JB1    NXT5          ;REVERSE VIDEO
0A1E 2301    =2591 NXT4:    MOV    A,#01H
0A20 5B      =2592          ANL    A,R3
0A21 AB      =2593          MOV    R3,A
0A22 B81C    =2594 NXT5:    MOV    R0,#SAREG
0A24 F0      =2595          MOV    A,@R0
0A25 67      =2596          RRC    A
0A26 A0      =2597          MOV    @R0,A
0A27 4B      =2598          ORL    A,R3
0A28 AB      =2599          MOV    R3,A
0A29 18      =2600          INC    R0
0A2A F0      =2601          MOV    A,@R0
0A2B 67      =2602          RRC    A
0A2C F632    =2603          JC     NXT2
0A2E A0      =2604          MOV    @R0,A
0A2F 4A      =2605          ORL    A,R2
0A30 AA      =2606          MOV    R2,A
0A31 FB      =2607          MOV    A,R3
0A32 83      =2608 NXT2:    RET
             =2609
             =2610 ; INCREMENT BRIGHTNESS DAC
             =2611
0A33 27      =2612 INCRBR:  CLR    A             ;ADJUST BY
```

```
0A34 AA        =2613           MOV     R2,A            ;+1
0A35 1A        =2614           INC     R2
0A36 443B      =2615           JMP     DEC1
               =2616
               =2617 ; DECREMENT BRIGHTNESS DAC
               =2618
0A38 23FF      =2619 DECRBR:   MOV     A,#-1           ;ADJUST BY
0A3A AA        =2620           MOV     R2,A            ;-1
0A3B B83B      =2621 DEC1:     MOV     R0,#DACMSB      ;POINTER TO BRIGHTNESS
0A3D E5        =2622           SEL     MB0
0A3E F423      =2623           CALL    DADD            ;ADD ADJUSTMENT
0A40 F5        =2624           SEL     MB1
0A41 F249      =2625           JB7     DEC2            ;NO CHANGE IF THIS MAKES IT NEGATIVE
0A43 5249      =2626           JB2     DEC2            ;NO CHANGE IF OVERFLOW
0A45 E5        =2627           SEL     MB0
0A46 F410      =2628           CALL    DSTORE          ;UPDATE THE DAC VALUE
0A48 F5        =2629           SEL     MB1
0A49 83        =2630 DEC2:     RET
               =2631
               =2632 ; BINARY MULTIPLY
               =2633 ;     MULTIPLIER AND MULTIPLICAND ARE IN A AND R2
               =2634 ;     RESULT IS IN A,R2
               =2635
0A4A BB08      =2636 BMPY:     MOV     R3,#08H         ;SET COUNTER TO 8
0A4C A9        =2637           MOV     R1,A
0A4D 27        =2638           CLR     A
0A4E 97        =2639           CLR     C
               =2640
0A4F 67        =2641 BMP1:     RRC     A
0A50 29        =2642           XCH     A,R1
0A51 67        =2643           RRC     A
0A52 29        =2644           XCH     A,R1
0A53 E656      =2645           JNC     BMP3            ;IF CARRY = 1 ADD, OTHERWISE DON'T
0A55 6A        =2646           ADD     A,R2            ;ADD MULTIPLICAND TO ACCUMULATOR
               =2647
0A56 EB4F      =2648 BMP3:     DJNZ    R3,BMP1         ;ANOTHER BIT?
0A58 67        =2649           RRC     A
0A59 29        =2650           XCH     A,R1
0A5A 67        =2651           RRC     A
0A5B AA        =2652           MOV     R2,A
0A5C F9        =2653           MOV     A,R1
0A5D 83        =2654           RET
               =2655
               =2656 ; GET THE PHOTOMETER LIGHT LEVEL; IN UNITS OF .4 FL
               =2657 ;     RETURN AS DP ACCUM
               =2658
0A5E B839      =2659 GTPHTR:   MOV     R0,#LOPHTR      ;PNTR TO PHOTOMETER LO RANGE RDG
0A60 F0        =2660           MOV     A,@R0           ;GET THE RDG
0A61 37        =2661           CPL     A               ;CHECK FOR AN
0A62 53E0      =2662           ANL     A,#0E0H         ;VALUE > 0E0H
0A64 C66E      =2663           JZ      GP1             ;OVERFLOW?
0A66 F0        =2664           MOV     A,@R0
0A67 BA66      =2665           MOV     R2,#066H        ;MULTIPLY BY .4
0A69 544A      =2666           CALL    BMPY
0A6B AA        =2667           MOV     R2,A            ;OK ON THIS RANGE
0A6C 27        =2668           CLR     A               ;FORM THE DP
0A6D 83        =2669           RET                     ;ACCUM AND RETURN
0A6E 18        =2670 GP1:      INC     R0              ;PNTR TO NEXT SCALE
0A6F F0        =2671           MOV     A,@R0
```

```
0A70 AA      =2672          MOV    R2,A
0A71 27      =2673          CLR    A
0A72 E5      =2674          SEL    MB0
0A73 F451    =2675          CALL   DASL          ;NOW TIMES TWO
0A75 F451    =2676          CALL   DASL          ;THEN TIMES FOUR
0A77 F5      =2677          SEL    MB1
0A78 83      =2678          RET
             =2679
             =2680 ; DIRECT OUTPUT TO DAC
             =2681
0A79 A5      =2682 DIRDAC:  CLR    F1            ;BRIGHTNESS FIRST
0A7A 34A1    =2686          CALL   GETRQ         ;GET PARAMETER POINTER
0A7C E5      =2688          SEL    MB0
0A7D F400    =2689          CALL   DLOAD         ;PARAMETER FOR BRIGHTNESS DAC
0A7F F5      =2690          SEL    MB1
0A80 34E0    =2691          CALL   STRDAC        ;FORMAT FOR BRIGHTNESS DAC
0A82 B5      =2692          CPL    F1            ;CONTRAST DAC NEXT
0A83 B83E    =2693          MOV    R0,#TEMP      ;STORE THE
0A85 2301    =2694          MOV    A,#01H        ;CONTRAST DAC
0A87 BAF4    =2695          MOV    R2,#0F4H      ;OFFSET
0A89 E5      =2696          SEL    MB0
0A8A F410    =2697          CALL   DSTORE
0A8C F5      =2701          SEL    MB1
0A8D 34A1    =2702          CALL   GETRQ
0A8F 232B    =2703          MOV    A,#LDNSTY
0A91 85      =2704          CLR    F0
0A92 D8      =2705          XRL    A,R0
0A93 9696    =2706          JNZ    DIR1
0A95 95      =2707          CPL    F0
0A96 E5      =2708 DIR1:    SEL    MB0
0A97 F400    =2710          CALL   DLOAD         ;LOAD THE PARAMETER
0A99 F446    =2711          CALL   DASR          ;HALVE IT
0A9B F5      =2712          SEL    MB1
0A9C B83E    =2713          MOV    R0,#TEMP      ;GET PNTR TO MAGNITUDE OF OFFSET
0A9E B6AC    =2714          JF0    DIR2          ;JUMP FOR PROPER DIRECTION
0AA0 E5      =2715          SEL    MB0
0AA1 F410    =2716          CALL   DSTORE
0AA3 2301    =2717          MOV    A,#01H
0AA5 BAF4    =2718          MOV    R2,#0F4H
0AA7 F42F    =2719          CALL   DSUB
0AA9 F5      =2720          SEL    MB1
0AAA 44B0    =2721          JMP    DIR3
0AAC E5      =2722 DIR2:    SEL    MB0
0AAD F423    =2723          CALL   DADD
0AAF F5      =2724          SEL    MB1
0AB0 34E0    =2725 DIR3:    CALL   STRDAC        ;FORMAT FOR CONTRAST DAC
0AB2 83      =2726          RET
              2727 $INCLUDE (:F1:TRAVEL.SRC)
0B00         =2728          ORG    0B00H
             =2729
             =2730 ; GET TRAVEL DISTANCE TO NEXT EXPOSURE POSITION
             =2731 ;   ADJUST FOR ERROR IN PREVIOUS POSITION
             =2732 ;   A CONTAINS MOTOR SELECT FLAG ON SUBROUTINE ENTRY
             =2733 ;   A,R0,R2 AND R3 ARE MODIFIED BY THE SUBROUTINE
             =2734
```

```
0B00 B825    =2735 GTTRVL:  MOV   R0,#YCORR      ;PNTR TO Y CORR
0B02 7605    =2736          JF1   GE2            ;Y MOVEMENT
0B04 18      =2737          INC   R0             ;NO, PNTR TO X CORR
0B05 F0      =2738 GE2:     MOV   A,@R0          ;GET LS BYTE
0B06 AA      =2739          MOV   R2,A           ;CORRECTION
0B07 F20C    =2740          JB7   GE3            ;NEGATIVE
0B09 27      =2741          CLR   A              ;NO, CLEAR MS BYTE
0B0A 640E    =2742          JMP   GE4
0B0C 23FF    =2743 GE3:     MOV   A,#0FFH        ;MAKE MS BYTE NEGATIVE
0B0E B81C    =2744 GE4:     MOV   R0,#PMSB       ;AND STORE
0B10 E5      =2745          SEL   MB0
0B11 F410    =2746          CALL  DSTORE         ;AS POSITION
0B13 F5      =2747          SEL   MB1
0B14 B823    =2748          MOV   R0,#CMRAST     ;GET NO. OF
0B16 F0      =2749          MOV   A,@R0          ;EXPOSURES REMAINING
0B17 47      =2750          SWAP  A
0B18 530F    =2751          ANL   A,#0FH
0B1A 07      =2752          DEC   A
0B1B AC      =2753          MOV   R4,A           ;SAVE # EXP
0B1C B8F5    =2754          MOV   R0,#IOCAL      ;GET EMULSION
0B1E 80      =2755          MOVX  A,@R0          ;SIDE DOWN FLAG
0B1F F7      =2756          RLC   A              ;FLAG
0B20 18      =2760          INC   R0
0B21 80      =2761          MOVX  A,@R0          ;AND EXPOSURE #
0B22 AD      =2762          MOV   R5,A           ;SAVE THEM
0B23 77      =2763          RR    A
0B24 77      =2764          RR    A
0B25 F7      =2765          RLC   A
0B26 531F    =2766          ANL   A,#01FH
0B28 0302    =2767          ADD   A,#PNTRTB MOD 256   ;GET ADDR OF
0B2A 9400    =2768          CALL  GTROM          ;MOVEMENT CONTROL BLOCK
0B2C 6C      =2769          ADD   A,R4           ;ADDRESS OF BYTE FOR CURRENT MOVEMENT
0B2D 9400    =2770          CALL  GTROM          ;GET MOVEMENT SPECIFIER
0B2F 7632    =2771          JF1   GE5            ;Y MOVEMENT
0B31 47      =2772          SWAP  A              ;NO, POSITION TO X
0B32 530F    =2773 GE5:     ANL   A,#0FH
0B34 C65B    =2774          JZ    GE10
0B36 B81C    =2775          MOV   R0,#PMSB
0B38 07      =2776          DEC   A
0B39 2D      =2777          XCH   A,R5           ;SAVE MOVEMENT SPECIFIER
0B3A 530C    =2778          ANL   A,#0CH
0B3C AC      =2779          MOV   R4,A
0B3D D30C    =2780          XRL   A,#0CH
0B3F 9643    =2781          JNZ   GE6
0B41 BC04    =2782          MOV   R4,#04H
0B43 FC      =2783 GE6:     MOV   A,R4
0B44 E7      =2784          RL    A
0B45 AC      =2785          MOV   R4,A
0B46 E7      =2786          RL    A
0B47 6C      =2787          ADD   A,R4
0B48 0394    =2788          ADD   A,#TBLEXP MOD 256   ;GET EXPOSURE TABLE PNTR
0B4A 6D      =2789          ADD   A,R5
0B4B 6D      =2790          ADD   A,R5
0B4C AB      =2791          MOV   R3,A
0B4D 9400    =2792          CALL  GTROM          ;GET MS BYTE
0B4F AA      =2793          MOV   R2,A           ;AND STORE IN MS BYTE
0B50 1B      =2794          INC   R3             ;INCREMENT TABLE PNTR TO NEXT BYTE
0B51 FB      =2795          MOV   A,R3           ;GET LS BYTE
0B52 9400    =2796          CALL  GTROM          ;AND TRANSFER TO
0B54 2A      =2797          XCH   A,R2           ;LS MOVE BYTE
0B55 E5      =2798          SEL   MB0
```

```
0B56 F423    =2799          CALL    DADD
0B58 F410    =2800          CALL    DSTORE
0B5A F5      =2801          SEL     MB1
0B5B 83      =2802 GE10:    RET
             =2803 $EJECT
             =2804
0C00         =2805          ORG     0C00H
             =2806
0C00 A3      =2807 GTROM:   MOVP    A,@A
0C01 83      =2808          RET
0C02 82      =2809 PNTRTB:  DB      OP29DN MOD 256
0C03 8B      =2810          DB      OP29UP MOD 256
0C04 76      =2811          DB      OP26DN MOD 256
0C05 7C      =2812          DB      OP26UP MOD 256
0C06 6E      =2813          DB      OP24DN MOD 256
0C07 72      =2814          DB      OP24UP MOD 256
0C08 76      =2815          DB      OP26DN MOD 256
0C09 7C      =2816          DB      OP26UP MOD 256
0C0A 5C      =2817          DB      OP19DN MOD 256
0C0B 65      =2818          DB      OP19UP MOD 256
0C0C 50      =2819          DB      OP16DN MOD 256
0C0D 56      =2820          DB      OP16UP MOD 256
0C0E 48      =2821          DB      OP14DN MOD 256
0C0F 4C      =2822          DB      OP14UP MOD 256
0C10 50      =2823          DB      OP16DN MOD 256
0C11 56      =2824          DB      OP16UP MOD 256
0C12 36      =2825          DB      STD9DN MOD 256
0C13 3F      =2826          DB      STD9UP MOD 256
0C14 2A      =2827          DB      STD6DN MOD 256
0C15 30      =2828          DB      STD6UP MOD 256
0C16 22      =2829          DB      STD4DN MOD 256
0C17 26      =2830          DB      STD4UP MOD 256
0C18 2A      =2831          DB      STD6DN MOD 256
0C19 30      =2832          DB      STD6UP MOD 256
0C1A 36      =2833          DB      STD9DN MOD 256
0C1B 3F      =2834          DB      STD9UP MOD 256
0C1C 2A      =2835          DB      STD6DN MOD 256
0C1D 30      =2836          DB      STD6UP MOD 256
0C1E 22      =2837          DB      STD4DN MOD 256
0C1F 26      =2838          DB      STD4UP MOD 256
0C20 2A      =2839          DB      STD6DN MOD 256
0C21 30      =2840          DB      STD6UP MOD 256
             =2841
0001         =2842 YPOS     EQU     1H
0002         =2843 YNEG     EQU     2H
0003         =2844 YOFF1    EQU     3H
0004         =2845 YOFF2    EQU     4H
0005         =2846 YSLW1    EQU     5H
0006         =2847 YSLW2    EQU     6H
0070         =2848 XPOS     EQU     70H
0080         =2849 XNEG     EQU     80H
0090         =2850 XOFF1    EQU     90H
00A0         =2851 XOFF2    EQU     0A0H
00B0         =2852 XSLW1    EQU     0B0H
00C0         =2853 XSLW2    EQU     0C0H
             =2854
0C22 70      =2855 STD4DN:  DB      XPOS
0C23 81      =2856          DB      XNEG+YPOS
0C24 70      =2857          DB      XPOS
0C25 93      =2858          DB      XOFF1+YOFF1
```

```
0C26 80         =2859 STD4UP: DB    XNEG
0C27 71         =2860         DB    XPOS+YPOS
0C28 80         =2861         DB    XNEG
0C29 A3         =2862         DB    XOFF2+YOFF1
0C2A 70         =2863 STD6DN: DB    XPOS
0C2B 81         =2864         DB    XNEG+YPOS
0C2C 70         =2865         DB    XPOS
0C2D 81         =2866         DB    XNEG+YPOS
0C2E 70         =2867         DB    XPOS
0C2F 93         =2868         DB    XOFF1+YOFF1
0C30 80         =2869 STD6UP: DB    XNEG
0C31 71         =2870         DB    XPOS+YPOS
0C32 80         =2871         DB    XNEG
0C33 71         =2872         DB    XPOS+YPOS
0C34 80         =2873         DB    XNEG
0C35 A3         =2874         DB    XOFF2+YOFF1
0C36 70         =2875 STD9DN: DB    XPOS
0C37 70         =2876         DB    XPOS
0C38 C1         =2877         DB    XSLW2+YPOS
0C39 70         =2878         DB    XPOS
0C3A 70         =2879         DB    XPOS
0C3B C1         =2880         DB    XSLW2+YPOS
0C3C 70         =2881         DB    XPOS
0C3D 70         =2882         DB    XPOS
0C3E 93         =2883         DB    XOFF1+YOFF1
0C3F 80         =2884 STD9UP: DB    XNEG
0C40 80         =2885         DB    XNEG
0C41 C1         =2886         DB    XSLW2+YPOS
0C42 80         =2887         DB    XNEG
0C43 80         =2888         DB    XNEG
0C44 C1         =2889         DB    XSLW2+YPOS
0C45 80         =2890         DB    XNEG
0C46 80         =2891         DB    XNEG
0C47 A3         =2892         DB    XOFF2+YOFF1
0C48 02         =2893 OP14DN: DB    YNEG
0C49 71         =2894         DB    YPOS+XPOS
0C4A 02         =2895         DB    YNEG
0C4B 94         =2896         DB    YOFF2+XOFF1
0C4C 02         =2897 OP14UP: DB    YNEG
0C4D 81         =2898         DB    XNEG+YPOS
0C4E 02         =2899         DB    YNEG
0C4F A4         =2900         DB    XOFF2+YOFF2
0C50 02         =2901 OP16DN: DB    YNEG
0C51 02         =2902         DB    YNEG
0C52 75         =2903         DB    YSLW1+XPOS
0C53 02         =2904         DB    YNEG
0C54 02         =2905         DB    YNEG
0C55 94         =2906         DB    YOFF2+XOFF1
0C56 02         =2907 OP16UP: DB    YNEG
0C57 02         =2908         DB    YNEG
0C58 85         =2909         DB    XNEG+YSLW1
0C59 02         =2910         DB    YNEG
0C5A 02         =2911         DB    YNEG
0C5B A4         =2912         DB    XOFF2+YOFF2
0C5C 02         =2913 OP19DN: DB    YNEG
0C5D 02         =2914         DB    YNEG
0C5E 76         =2915         DB    YSLW2+XPOS
0C5F 02         =2916         DB    YNEG
0C60 02         =2917         DB    YNEG
0C61 76         =2918         DB    YSLW2+XPOS
0C62 02         =2919         DB    YNEG
```

```
0C63 02      =2920            DB    YNEG
0C64 94      =2921            DB    YOFF2+XOFF1
0C65 02      =2922 OP19UP:    DB    YNEG
0C66 02      =2923            DB    YNEG
0C67 85      =2924            DB    XNEG+YSLW1
0C68 02      =2925            DB    YNEG
0C69 02      =2926            DB    YNEG
0C6A 85      =2927            DB    XNEG+YSLW1
0C6B 02      =2928            DB    YNEG
0C6C 02      =2929            DB    YNEG
0C6D A4      =2930            DB    XOFF2+YOFF2
0C6E 01      =2931 OP24DN:    DB    YPOS
0C6F 82      =2932            DB    XNEG+YNEG
0C70 01      =2933            DB    YPOS
0C71 A3      =2934            DB    XOFF2+YOFF1
0C72 01      =2935 OP24UP:    DB    YPOS
0C73 72      =2936            DB    XPOS+YNEG
0C74 01      =2937            DB    YPOS
0C75 93      =2938            DB    XOFF1+YOFF1
0C76 01      =2939 OP26DN:    DB    YPOS
0C77 01      =2940            DB    YPOS
0C78 86      =2941            DB    XNEG+YSLW2
0C79 01      =2942            DB    YPOS
0C7A 01      =2943            DB    YPOS
0C7B A3      =2944            DB    XOFF2+YOFF1
0C7C 01      =2945 OP26UP:    DB    YPOS
0C7D 01      =2946            DB    YPOS
0C7E 76      =2947            DB    XPOS+YSLW2
0C7F 01      =2948            DB    YPOS
0C80 01      =2949            DB    YPOS
0C81 93      =2950            DB    XOFF1+YOFF1
0C82 01      =2951 OP29DN:    DB    YPOS
0C83 01      =2952            DB    YPOS
0C84 82      =2953            DB    XNEG+YNEG
0C85 01      =2954            DB    YPOS
0C86 01      =2955            DB    YPOS
0C87 82      =2956            DB    XNEG+YNEG
0C88 01      =2957            DB    YPOS
0C89 01      =2958            DB    YPOS
0C8A A3      =2959            DB    XOFF2+YOFF1
0C8B 01      =2960 OP29UP:    DB    YPOS
0C8C 01      =2961            DB    YPOS
0C8D 72      =2962            DB    XPOS+YNEG
0C8E 01      =2963            DB    YPOS
0C8F 01      =2964            DB    YPOS
0C90 72      =2965            DB    XPOS+YNEG
0C91 01      =2966            DB    YPOS
0C92 01      =2967            DB    YPOS
0C93 93      =2968            DB    XOFF1+YOFF1
             =2969
             =3017
             =3018 ; 9 EXPOSURES - 627
             =3019
0C94 00FE    =3020 TBLEXP:    DW    254     ;YPOS
0C96 FF02    =3021            DW    -254    ;YNEG
0C98 FFDC    =3022            DW    -36     ;YOFF1
0C9A 01D8    =3023            DW    472     ;YOFF2
0C9C 01FC    =3024            DW    508     ;YSLW1
0C9E FE04    =3025            DW    -508    ;YSLW2
0CA0 00BF    =3026            DW    191     ;XPOS
0CA2 FF41    =3027            DW    -191    ;XNEG
```

```
OCA4 FFDC    =3028         DW      -36       ;XOFF1
OCA6 015A    =3029         DW      346       ;XOFF2
OCA8 0000    =3030         DW      0         ;XSLW1
OCAA 0000    =3031         DW      0         ;XSLW2
             =3032
             =3033 ; 6 EXPOSURES - 627
             =3034
OCAC 00E5    =3035         DW      229       ;YPOS
OCAE FF1B    =3036         DW      -229      ;YNEG
OCB0 FFF5    =3037         DW      -11       ;YOFF1
OCB2 01BF    =3038         DW      447       ;YOFF2
OCB4 01CA    =3039         DW      458       ;YSLW1
OCB6 FE36    =3040         DW      -458      ;YSLW2
OCB8 012D    =3041         DW      301       ;XPOS
OCBA FED3    =3042         DW      -301      ;XNEG
OCBC FFF5    =3043         DW      -11       ;XOFF1
OCBE 0122    =3044         DW      290       ;XOFF2
OCC0 0000    =3045         DW      0         ;XSLW1
OCC2 0000    =3046         DW      0         ;XSLW2
             =3047
             =3048 ; 4 EXPOSURES - 627
             =3049
OCC4 017E    =3050         DW      382       ;YPOS
OCC6 FE82    =3051         DW      -382      ;YNEG
OCC8 001B    =3052         DW      27        ;YOFF1
OCCA 0199    =3053         DW      409       ;YOFF2
OCCC 0000    =3054         DW      0         ;YSLW1
OCCE 0000    =3055         DW      0         ;YSLW2
OCD0 0123    =3056         DW      291       ;XPOS
OCD2 FEDD    =3057         DW      -291      ;XNEG
OCD4 0009    =3058         DW      9         ;XOFF1
OCD6 012C    =3059         DW      300       ;XOFF2
OCD8 0000    =3060         DW      0         ;XSLW1
OCDA 0000    =3061         DW      0         ;XSLW2
             =3063 $EJECT
              3064 $INCLUDE (:F1:DIAGTS.SRC)
             =3065
OD00         =3066         ORG     0D00H
             =3067
             =3068 ; TEST JUMP TABLE
             =3069
OD00 2F      =3070 JMPTBL: DB      NOTST MOD 256
OD01 32      =3071         DB      TSTDSP MOD 256
OD02 68      =3072         DB      TSTCAL MOD 256
OD03 7A      =3073         DB      TSTSYN MOD 256
OD04 B3      =3074         DB      TSTXNS MOD 256
OD05 B5      =3075         DB      TSTYNS MOD 256
OD06 B7      =3076         DB      TSTX0 MOD 256
OD07 B9      =3077         DB      TSTY0 MOD 256
OD08 A3      =3078         DB      TSTST0 MOD 256  ;TEST 8
OD09 A7      =3079         DB      TSTST1 MOD 256  ;TEST 9
OD0A AB      =3080         DB      TSTST2 MOD 256  ;TEST 10
OD0B AF      =3081         DB      TSTST3 MOD 256  ;TEST 11
OD0C BB      =3082         DB      TSTAC MOD 256   ;TEST 12 - AUTOCOMP TEST BACK PORCH SAMPLE
OD0D BB      =3083         DB      TSTAC MOD 256   ;TEST 13 - AUTOCOMP TEST HIGH IMAGE SAMPLE
OD0E BB      =3084         DB      TSTAC MOD 256   ;TEST 14 - AUTOCOMP TEST LOW IMAGE SAMPLE
OD0F BB      =3085         DB      TSTAC MOD 256   ;TEST 15 - AUTOCOMP TEST USER VIDEO
OD10 BD      =3086         DB      TSTAD0 MOD 256  ;TEST 16 - A/D TEST, CHANNELS 0 & 1
OD11 BD      =3087         DB      TSTAD0 MOD 256  ;TEST 17 - A/D TEST, CHANNELS 1 & 2
OD12 BD      =3088         DB      TSTAD0 MOD 256  ;TEST 18 - A/D TEST, CHANNELS 2 & 3
OD13 BD      =3089         DB      TSTAD0 MOD 256  ;TEST 19 - A/D TEST, CHANNELS 3 & 4
```

```
0D14 BD      =3090           DB      TSTAD0 MOD 256      ;TEST 20 - A/D TEST, CHANNELS 4 & 5
0D15 BD      =3091           DB      TSTAD0 MOD 256      ;TEST 21 - A/D TEST, CHANNELS 5 & 6
0D16 BD      =3092           DB      TSTAD0 MOD 256      ;TEST 22 - A/D TEST, CHANNELS 6 & 7
0D17 2F      =3093           DB      NOTST MOD 256       ;TEST 23
0D18 BF      =3094           DB      TSTDAC MOD 256      ;TEST 24 - D/A TEST BACK PORCH SAMPLE
0D19 BF      =3095           DB      TSTDAC MOD 256      ;TEST 25 - D/A TEST HIGH IMAGE SAMPLE
0D1A BF      =3096           DB      TSTDAC MOD 256      ;TEST 27 - D/A TEST LOW IMAGE SAMPLE
0D1B BF      =3097           DB      TSTDAC MOD 256      ;TEST 28 - D/A TEST USER VIDEO
0D1C 2F      =3098           DB      NOTST MOD 256       ;TEST 29
0D1D 2F      =3099           DB      NOTST MOD 256       ;TEST 30
0D1E 2F      =3100           DB      NOTST MOD 256       ;TEST 31
             =3101
             =3102 ; DISPATCH TO SPECIFIED TEST ROUTINE
             =3103 ;    ON XFER TO TEST ROUTINE, R2 = 0 IF TEST
             =3104 ;    IS UNCHANGED FROM LAST TEST
             =3105
0D1F B8F7    =3106 TEST:     MOV     R0,#IODPSW          ;DIP SWITCH ADDRESS
0D21 80      =3107           MOVX    A,@R0               ;GET BYTE
0D22 37      =3108           CPL     A
0D23 B820    =3109           MOV     R0,#TSTNO           ;PNTR TO CURRENT TEST #
0D25 531F    =3110           ANL     A,#01FH             ;WE DON'T HAVE ALL THOSE TESTS
0D27 AB      =3111           MOV     R3,A                ;SAVE THE TEST #
0D28 20      =3112           XCH     A,@R0
0D29 D0      =3113           XRL     A,@R0
0D2A AA      =3114           MOV     R2,A
0D2B FB      =3115           MOV     A,R3
0D2C 0300    =3116           ADD     A,#JMPTBL MOD 256   ;AND FIND THE TEST ADDRESS
0D2E B3      =3117           JMPP    @A                  ;GO TO THE TEST
             =3118
0D2F E5      =3119 NOTST:    SEL     MB0
0D30 A400    =3120           JMP     CHKTST
             =3121 $EJECT
             =3122
             =3123 ; TEST 8 DIGIT DISPLAY
             =3124
0D32 FA      =3125 TSTDSP:   MOV     A,R2                ;TEST #
0D33 C63A    =3126           JZ      TD1                 ;SAME AS LAST TIME THRU?
0D35 27      =3127           CLR     A
0D36 AE      =3128           MOV     R6,A
0D37 AF      =3129           MOV     R7,A                ;NO, START AT THE BEGINNING
0D38 A44D    =3130           JMP     TD2
0D3A B8F4    =3131 TD1:      MOV     R0,#IOOPR           ;SEE IF
0D3C 80      =3132           MOVX    A,@R0               ;ANYONE IS LEANING
0D3D 5301    =3133           ANL     A,#NEXPSE           ;ON THE EXPOSE BUTTON
0D3F 2E      =3134           XCH     A,R6
0D40 DE      =3135           XRL     A,R6
0D41 C62F    =3136           JZ      NOTST
0D43 FE      =3137           MOV     A,R6
0D44 962F    =3138           JNZ     NOTST
0D46 1F      =3139           INC     R7                  ;INCREMENT DISPLAY DIGITS IF
0D47 FF      =3140           MOV     A,R7                ;EXPOSE BUTTON
0D48 D30A    =3141           XRL     A,#10               ;PUSHED
0D4A 964D    =3142           JNZ     TD2
0D4C AF      =3143           MOV     R7,A
0D4D BA08    =3144 TD2:      MOV     R2,#8               ;EIGHT DIGIT DISPLAY
0D4F B838    =3145           MOV     R0,#(DSPBFR+7)
0D51 FF      =3146           MOV     A,R7                ;BEGINING
0D52 A9      =3147           MOV     R1,A                ;DIGIT
0D53 F9      =3148 TD3:      MOV     A,R1                ;GET NEXT DIGIT
0D54 E5      =3149           SEL     MB0
0D55 D498    =3150           CALL   SGPTRN               ;GET THE PATTERN
```

```
0D57 F5      =3151           SEL     MB1
0D58 A0      =3152           MOV     @R0,A       ;AND PUT IN THE
0D59 C8      =3153           DEC     R0          ;PNTR TO NEXT BUFFER POSITION
0D5A 19      =3154           INC     R1          ;NEXT DIGIT
0D5B F9      =3155           MOV     A,R1        ;CHECK FOR
0D5C D30A    =3156           XRL     A,#10       ;AN OVERFLOW
0D5E 9661    =3157           JNZ     TD4
0D60 A9      =3158           MOV     R1,A
0D61 EA53    =3159 TD4:      DJNZ    R2,TD3      ;ANOTHER DIGIT
0D63 E5      =3160           SEL     MB0
0D64 F45F    =3161           CALL    DSPLAY      ;UPDATE THE DISPLAY
0D66 A400    =3162           JMP     CHKTST      ;AND CHECK THE MODE AGAIN
             =3163 $EJECT
             =3164
0D68 2364    =3165 TSTCAL:   MOV     A,#100      ;8 MSEC DELAY TO
0D6A 62      =3166           MOV     T,A         ;SIMULATE VIDEO
0D6B 55      =3167           STRT    T           ;SYNC TIMING
0D6C 1670    =3168 TC1:      JTF     TC2
0D6E A46C    =3169           JMP     TC1
0D70 65      =3170 TC2:      STOP    TCNT
0D71 E5      =3171           SEL     MB0
0D72 5424    =3172           CALL    CACHNL
0D74 5438    =3173           CALL    CALIB
0D76 F45F    =3174           CALL    DSPLAY
0D78 A400    =3175           JMP     CHKTST
             =3176
0D7A E5      =3177 TSTSYN:   SEL     MB0
0D7B D400    =3178           CALL    VSYNC       ;WAIT FOR SYNC
0D7D F5      =3179           SEL     MB1
0D7E FA      =3180           MOV     A,R2        ;GET THE SYNC FLAG
0D7F BA00    =3181           MOV     R2,#MSGBLK  ;ASSUME EVERTHING OK
0D81 9685    =3182           JNZ     TS1         ;CHECK THE SYNC FLAG
0D83 BA05    =3183           MOV     R2,#MSGNP   ;WE DON'T HAVE A PICTURE
0D85 E5      =3184 TS1:      SEL     MB0
0D86 D4AC    =3185           CALL    MSGE        ;PUT THE MESSAGE INTO THE BUFFER
0D88 F5      =3186           SEL     MB1
0D89 A5      =3187           CLR     F1
0D8A B839    =3188           MOV     R0,#LOPHTR
0D8C B933    =3192           MOV     R1,#LODS
0D8E F0      =3194 TS2:      MOV     A,@R0
0D8F AA      =3195           MOV     R2,A
0D90 27      =3196           CLR     A
0D91 B83E    =3197           MOV     R0,#TEMP
0D93 E5      =3198           SEL     MB0
0D94 F410    =3199           CALL    DSTORE
0D96 D45E    =3200           CALL    CONVD3
0D98 F5      =3201           SEL     MB1
0D99 B83A    =3202           MOV     R0,#HIPHTR
0D9B B5      =3203           CPL     F1
0D9C 768E    =3204           JF1     TS2
0D9E E5      =3205           SEL     MB0
0D9F F45F    =3206           CALL    DSPLAY
0DA1 A400    =3207           JMP     CHKTST
             =3208
             =3209 ; DISPLAY STATUS POINTS
             =3210
0DA3 B8F4    =3211 TSTST0:   MOV     R0,#IOOPR   ;OPERATOR STATUS BYTE
0DA5 E400    =3212           JMP     TSI1
0DA7 B8F5    =3213 TSTST1:   MOV     R0,#IOCAL   ;CALIBRATION INPUTS
0DA9 E400    =3214           JMP     TSI1
0DAB B8F7    =3215 TSTST2:   MOV     R0,#IODPSW  ;DIP SWITCH INPUT
```

```
0DAD E400      =3216            JMP    TSI1
0DAF B8F6      =3217 TSTST3:    MOV    R0,#IOAUX        ;AUXILLARY STATUS INPUTS
0DB1 E400      =3218            JMP    TSI1
               =3219 ;
               =3220 ; OFF PAGE TRANSFER TABLE
               =3221
0DB3 C400      =3222 TSTXNS:    JMP    TSTX
0DB5 C403      =3223 TSTYNS:    JMP    TSTY
0DB7 C400      =3224 TSTX0:     JMP    TSTX
0DB9 C403      =3225 TSTY0:     JMP    TSTY
0DBB E459      =3226 TSTAC:     JMP    TSTAUT
0DBD E422      =3227 TSTADU:    JMP    TSTAU
0DBF E48A      =3228 TSTDAC:    JMP    TSTUA
               =3229 $EJECT
0E00           =3230            ORG    0E00H
               =3231
               =3232 ;TEST X/Y MOTION
               =3233
0E00 A5        =3234 TSTX:      CLR    F1
0E01 C405      =3235            JMP    TQD1
0E03 A5        =3236 TSTY:      CLR    F1
0E04 B5        =3237            CPL    F1
0E05 FB        =3238 TQD1:      MOV    A,R3             ;SAVE THE
0E06 37        =3239            CPL    A
0E07 AE        =3240            MOV    R6,A             ;TEST NUMBER
0E08 E5        =3241            SEL    MB0
0E09 7491      =3242            CALL   STOPMT           ;STOP THE MOTORS
0E0B BA96      =3243            MOV    R2,#150          ;DELAY FOR 150 MSE
0E0D F458      =3244            CALL   DELAY            ;FOR ALL MOTION TO STOP
0E0F BD64      =3245            MOV    R5,#064H
0E11 741C      =3246            CALL   BACK             ;MOVE BACK TO HOME
0E13 27        =3247            CLR    A
0E14 AF        =3248            MOV    R7,A
0E15 749E      =3249            CALL   STRTMT           ;START THE MOTORS
0E17 BA04      =3250            MOV    R2,#4
0E19 F458      =3251            CALL   DELAY
0E1B 7494      =3252            CALL   GETQAD           ;GET THE QUAD BITS
0E1D F5        =3253            SEL    MB1
0E1E B9F6      =3254            MOV    R1,#IOAUX        ;PNTR FOR TEST BIT INPUT
0E20 C436      =3255            JMP    TQD3             ;AND INITIALIZE
               =3256
0E22 81        =3257 TQD2:      MOVX   A,@R1            ;GET TEST ENABLE BIT
0E23 323F      =3258            JB1    TQD5             ;STILL IN TEST MODE?
0E25 19        =3259            INC    R1               ;PNTR TO TEST NUMBER
0E26 81        =3260            MOVX   A,@R1            ;GET THE TEST NUMBER
0E27 C9        =3261            DEC    R1
0E28 DE        =3262            XRL    A,R6             ;COMPARE WITH PREV TEST #
0E29 963F      =3263            JNZ    TQD5             ;EXIT IF TEST # CHANGED
0E2B E5        =3264            SEL    MB0
0E2C 7494      =3265            CALL   GETQAD           ;GET THE QUAD BITS
0E2E F5        =3266            SEL    MB1
0E2F D0        =3267            XRL    A,@R0            ;COMPARE WITH LAST VALUE
0E30 C622      =3268            JZ     TQD2             ;TRY AGAIN IF NO CHANGE
0E32 F0        =3269            MOV    A,@R0            ;GET NEW QUAD BITS
0E33 DD        =3270            XRL    A,R5             ;COMPARE WITH NEXT QUAD BITS
0E34 9648      =3271            JNZ    QFAIL            ;ALERT IF BAD BITS
0E36 F0        =3272 TQD3:      MOV    A,@R0
0E37 0363      =3273            ADD    A,#QADTBL MOD 256
0E39 A3        =3274            MOVP   A,@A
0E3A AD        =3275            MOV    R5,A
0E3B EF22      =3276            DJNZ   R7,TQD2          ;256 PULSES YET?
```

```
0E3D C405    =3277         JMP     TQD1
             =3278
0E3F E5      =3279 TQD5:   SEL     MB0
0E40 7491    =3280         CALL    STOPMT          ;WRAP UP THE
0E42 BA96    =3281         MOV     R2,#150         ;TEST IF TEST #
0E44 F458    =3282         CALL    DELAY           ;CHANGED
0E46 A400    =3283         JMP     CHKTST
             =3284
0E48 FE      =3285 QFAIL:  MOV     A,R6
0E49 3236    =3286         JB1     TQD3
0E4B E5      =3287         SEL     MB0
0E4C 7491    =3288         CALL    STOPMT          ;STOP THE MOTORS
0E4E BA96    =3289         MOV     R2,#150
0E50 F458    =3290         CALL    DELAY
0E52 FF      =3291         MOV     A,R7            ;GET # OF
0E53 37      =3292         CPL     A               ;EDGES
0E54 AA      =3293         MOV     R2,A
0E55 27      =3294         CLR     A
0E56 B83E    =3295         MOV     R0,#TEMP
0E58 F410    =3296         CALL    DSTORE
0E5A B936    =3300         MOV     R1,#HIDS        ;PUT INTO HI DENSITY
0E5C D45E    =3302         CALL    CONVD3          ;BUFFER
0E5E F45F    =3303         CALL    DSPLAY          ;AND DISPLAY
0E60 F5      =3304         SEL     MB1
0E61 C448    =3305         JMP     QFAIL
             =3306
0E63 01      =3307 QADTBL: DB      1
0E64 03      =3308         DB      3
0E65 00      =3309         DB      0
0E66 02      =3310         DB      2
             =3311 $EJECT
0F00         =3312         ORG     0F00H
0F00 FA      =3313 TSI1:   MOV     A,R2
0F01 C606    =3314         JZ      TSI2
0F03 F0      =3315         MOV     A,@R0
0F04 37      =3316         CPL     A
0F05 AE      =3317         MOV     R6,A
0F06 80      =3318 TSI2:   MOVX    A,@R0           ;GET THE STATUS BYTE
0F07 AB      =3319         MOV     R3,A            ;SAVE IT
0F08 2E      =3320         XCH     A,R6
0F09 DE      =3321         XRL     A,R6
0F0A C6D1    =3322         JZ      NOTST1
0F0C B931    =3323         MOV     R1,#DSPBFR      ;DISPLAY BUFFER PNTR
0F0E BA08    =3324         MOV     R2,#8           ;COUNTER FOR 8 STATUS POINTS
0F10 FB      =3325 TSI3:   MOV     A,R3            ;GET THE
0F11 F7      =3326         RLC     A               ;NEXT STATUS
0F12 AB      =3327         MOV     R3,A            ;POINT
0F13 23FB    =3328         MOV     A,#PTRN0        ;ASSUME OFF
0F15 E619    =3329         JNC     TSI4            ;CHECK THE ASSUMPTION
0F17 23B0    =3330         MOV     A,#PTRN1        ;WRONG; CHANGE IT
0F19 A1      =3331 TSI4:   MOV     @R1,A           ;PUT DIGIT IN BUFFER
0F1A 19      =3332         INC     R1              ;NEXT BUFFER POSITION
0F1B EA10    =3333         DJNZ    R2,TSI3         ;ANOTHER POINT?
0F1D E5      =3334         SEL     MB0
0F1E F45F    =3335         CALL    DSPLAY
0F20 A400    =3336         JMP     CHKTST
             =3337 $EJECT
             =3338
             =3339 ; A/D TESTS
             =3340
0F22 FB      =3341 TSTAD:  MOV     A,R3            ;GET THE TEST #
```

```
OF23 AC       =3342            MOV     R4,A
OF24 E5       =3343            SEL     MB0
OF25 D400     =3344            CALL    VSYNC
OF27 F5       =3345            SEL     MB1
OF28 FC       =3346            MOV     A,R4
OF29 5307     =3347            ANL     A,#07H          ;ISOLATE A/D CHANNEL #
OF2B 03D8     =3348            ADD     A,#IOCNV0       ;GET A/D ADDRESS
OF2D A8       =3349            MOV     R0,A            ;AND SAVE IT
OF2E B939     =3350            MOV     R1,#LOPHTR      ;START THE DISPLAY WITH BRIGHTNESS
OF30 A5       =3351            CLR     F1
OF31 90       =3352 TA1:       MOVX    @R0,A
OF32 90       =3353            MOVX    @R0,A           ;START A CONVERSION
OF33 BB05     =3354            MOV     R3,#5
OF35 EB35     =3355 TA3:       DJNZ    R3,TA3
OF37 2637     =3356 TA2:       JNT0    TA2             ;CONVERSION COMPLETE
OF39 80       =3357            MOVX    A,@R0           ;READ THE A/D
OF3A A1       =3358            MOV     @R1,A           ;AND SAVE IT FOR NOW
OF3B 18       =3359            INC     R0              ;MOVE TO NEXT CHANNEL
OF3C 19       =3360            INC     R1              ;INCREMENT BUFFER POINTER
OF3D B5       =3361            CPL     F1
OF3E 7631     =3362            JF1     TA1             ;ANOTHER CHANNEL?
              =3363
              =3364 ; DISPLAY THE RESULTS
              =3365
OF40 B839     =3366            MOV     R0,#LOPHTR
OF42 B933     =3370            MOV     R1,#LODS
OF44 F0       =3372 TA4:       MOV     A,@R0
OF45 AA       =3373            MOV     R2,A
OF46 27       =3374            CLR     A
OF47 B83E     =3375            MOV     R0,#TEMP
OF49 E5       =3376            SEL     MB0
OF4A F410     =3377            CALL    DSTORE
OF4C D45E     =3378            CALL    CONVD3
OF4E F5       =3379            SEL     MB1
OF4F B83A     =3380            MOV     R0,#(LOPHTR+1)
OF51 B5       =3381            CPL     F1
OF52 7644     =3382            JF1     TA4
OF54 E5       =3383            SEL     MB0
OF55 F45F     =3384            CALL    DSPLAY          ;DISPLAY THE RESULTS
OF57 A400     =3385            JMP     CHKTST
              =3386 $LIST
              =3387
              =3388 ; AUTOCOMP TEST - THIS SET OF TESTS PROVIDE THE USER
              =3389 ; WITH THE CAPABILITY OF EXAMINING THE DACS AFTER AN
              =3390 ; AUTOCOMP AND DETERMING PHOTOMETER READINGS FOR VARIOUS
              =3391 ; SIGNAL SOURCES (HIGH, LOW, BACK PORCH, AND USER)
              =3392
OF59 E5       =3393 TSTAUT:    SEL     MB0
OF5A D400     =3394            CALL    VSYNC           ;WAIT FOR V SYNC
OF5C F5       =3395            SEL     MB1
OF5D 23FB     =3396            MOV     A,#NOT BLANK    ;UNBLANK THE
OF5F 9E       =3397            ANLD    P6,A            ;MONITOR
OF60 2303     =3398            MOV     A,#VCLR         ;CLEAR VIDEO
OF62 9F       =3399            ANLD    P7,A            ;SELECTION
OF63 B820     =3400            MOV     R0,#TSTNO
OF65 F0       =3401            MOV     A,@R0
OF66 5303     =3402            ANL     A,#03H          ;SOURCE
OF68 E7       =3403            RL      A               ;MOVE TO
OF69 E7       =3404            RL      A               ;PROPER POSITION
OF6A 8F       =3405            ORLD    P7,A            ;AND SELECT SOURCE
OF6B 1400     =3406            CALL    OUTDAC          ;UPDATE DACS
```

```
0F6D A5        =3407           CLR     F1              ;START WITH THE BRIGHTNESS DAC
0F6E 3400      =3408           CALL    GETDAC          ;GET THE DAC VALUE
0F70 B83E      =3409           MOV     R0,#TEMP        ;STORE IT TEMPORARILY
0F72 B933      =3413           MOV     R1,#LODS        ;LOW DENSITY INDEX DISPLAY
0F74 E5        =3415           SEL     MB0
0F75 F410      =3416           CALL    DSTORE          ;STORE THE BRIGHTNESS DAC VALUE
0F77 D45E      =3417           CALL    CONVD3          ;XFER TO DISPLAY BUFFER
0F79 F5        =3418           SEL     MB1
0F7A B5        =3419           CPL     F1              ;NOW SHOW CONTRAST DAC
0F7B 3400      =3420           CALL    GETDAC          ;GET THE DAC VALUE
0F7D B83E      =3421           MOV     R0,#TEMP        ;STORE IT TEMPORARILY
0F7F B936      =3425           MOV     R1,#HIDS        ;HI DENSITY INDEX DISPLAY
0F81 E5        =3427           SEL     MB0
0F82 F410      =3428           CALL    DSTORE          ;STORE THE CONTRAST DAC VALUE
0F84 D45E      =3429           CALL    CONVD3          ;XFER TO DISPLAY VALUE
0F86 B492      =3430           CALL    PHTMTR          ;DISPLAY THE RESULTS
0F88 A400      =3431           JMP     CHKTST          ;CHECK IF WE'RE STILL TESTING
               =3432 $EJECT
               =3438 ; DAC TEST - VALUE DISPLAYED ON LOW/HIGH DENSITY INDEX
               =3439 ; DISPLAYS IS OUTPUT TO THE BRIGHTNESS AND CONTRAST
               =3440 ; DACS RESPECTIVELY
               =3442
0F8A 23FB      =3443 TSTDA:    MOV     A,#NOT BLANK
0F8C 9E        =3444           ANLD    P6,A
0F8D 2303      =3445           MOV     A,#VCLR         ;CLEAR VIDEO
0F8F 9F        =3446           ANLD    P7,A            ;SELECTION
0F90 FB        =3447           MOV     A,R3            ;GET VIDEO
0F91 5303      =3448           ANL     A,#03H          ;SOURCE
0F93 E7        =3449           RL      A               ;MOVE TO
0F94 E7        =3450           RL      A               ;PROPER POSITION
0F95 8F        =3451           ORLD    P7,A            ;AND SELECT SOURCE
0F96 E5        =3452           SEL     MB0
0F97 5438      =3456           CALL    CALIB           ;UPDATE LOW/HIGH DENSITY INDEX PARAMETERS
0F99 F5        =3458           SEL     MB1
0F9A F4AE      =3459           CALL    DIRSET
0F9C 1400      =3460           CALL    OUTDAC          ;UPDATE DACS
0F9E E5        =3461           SEL     MB0
0F9F D400      =3462           CALL    VSYNC           ;WAIT FOR V SYNC
0FA1 F5        =3463           SEL     MB1
0FA2 B83A      =3464           MOV     R0,#HIPHTR      ;GET THE
0FA4 F0        =3465           MOV     A,@R0           ;PHTR READING
0FA5 B931      =3466           MOV     R1,#PHOTDS      ;PNTR TO DISPLAY BUFFER
0FA7 F4C1      =3467           CALL    GETHEX          ;CONVERT RDG TO HEX
0FA9 E5        =3468           SEL     MB0
0FAA F45F      =3469           CALL    DSPLAY          ;DISPLAY THE RESULT
0FAC A400      =3470           JMP     CHKTST          ;CHECK IF WE'RE STILL TESTING
               =3471
0FAE A5        =3472 DIRSET:   CLR     F1              ;BRIGHTNESS DAC FIRST
0FAF B328      =3476           MOV     R0,#LDNSTY      ;GET THE LOW DENSITY
0FB1 E5        =3478           SEL     MB0
0FB2 F400      =3479           CALL    DLOAD           ;PARAMETER
0FB4 F5        =3480           SEL     MB1
0FB5 34E0      =3481           CALL    STRDAC          ;AND FORMAT FOR DAC
0FB7 B5        =3482           CPL     F1
0FB8 B32F      =3486           MOV     R0,#HDNSTY      ;GET THE HIGH DENSITY
0FBA E5        =3488           SEL     MB0
0FBB F400      =3489           CALL    DLOAD           ;PARAMETER
0FBD F5        =3490           SEL     MB1
0FBE 34E0      =3491           CALL    STRDAC          ;AND FORMAT THE DAC
0FC0 83        =3492           RET
               =3493
```

```
OFC1 85      =3494 GETHEX: CLR    F0
OFC2 AA      =3495         MOV    R2,A
OFC3 47      =3496         SWAP   A
OFC4 530F    =3497 GH1:    ANL    A,#0FH
OFC6 E5      =3498         SEL    MB0
OFC7 D498    =3499         CALL   SGPTRN
OFC9 F5      =3500         SEL    MB1
OFCA A1      =3501         MOV    @R1,A
OFCB 19      =3502         INC    R1
OFCC FA      =3503         MOV    A,R2
OFCD 95      =3504         CPL    F0
OFCE B6C4    =3505         JF0    GH1
OFD0 83      =3506         RET
             =3507
             =3508 ; OFF PAGE TRANSFER TABLE
             =3509
OFD1 A42F    =3510 NOTST1: JMP    NOTST
             3511          END

SSEMBLY COMPLETE,  NO ERRORS
```

What is claimed is:

1. A video image recording device for photographically recording video generated images having a brightness level for exposing a photographic emulsion within limits of an exposure range, further comprising:
   first index value display means for displaying selected values of a first index, each of which corresponds to a particular value of video image display screen light output;
   second index value display means for displaying selected values of a second index, each of which corresponds to a particular value of video image display screen light output, said first and second index values representing intensity limitations for said image brightness level;
   a first index value display control means for manually controlling the magnitude of the index value displayed by said first index value display means;
   second index value display control means for manually controlling the magnitude of the index value displayed by said second index value display means, whereby an operator may select and display desired index values representing brightness level requirements for said images;
   a first plurality of memory storage locations for storing plural representations of particular values of said first index; and
   a second plurality of memory storage locations for storing plural representations of particular values of said second index, whereby said video recording device is provided with information for determining the brightness levels of said images for specific films.

2. A video image recording device as claimed in claim 1 in which each of said index values is equal to its corresponding value of video image display screen light output expressed in predetermined standard units.

3. A video image recording device as claimed in claim 1, further comprising manually operable storage control means for initiating the storage in selected ones of said storage locations of representations of index values displayed on said index display means.

4. A video image recording device as claimed in claim 1, further comprising:
   video image display means having an image display screen;
   manually operable displayed video image polarity reversing means for selectively reversing the polarity of the image displayed on said display screen; and
   means for correspondingly altering the index values displayed on said index value display means when the polarity of the image displayed on said image display screen is changed by the operation of said manually operable displayed video image polarity reversing means.

5. A video image recording device for photographically recording displayed images generated by video signals, comprising:
   video image display means including a video image display screen and first and second video image parameter control means;
   first sampling means for sampling a video input signal and determining its amplitude at a first known portion of said video signal amplitude excursion;
   second sampling means for sampling a video input signal and determining the amplitude at a second known portion of said video signal amplitude excursion;
   image signal sample synthesizing means responsive to said sampled amplitudes of said video signal for producing a high image signal sample, the magnitude of which corresponds to the magnitude of said first sampled amplitude of the image signal portion of said video signal, and a low image signal sample the amplitude of which corresponds to the amplitude of said second sampled amplitude of the image signal portion of said video signal; and
   servocontrol means for systematically operating said first and second video image parameter control means to substantially equate the light output of said display screen when excited by a synthetic video signal having said high image signal sample as its image signal portion to a corresponding stored light output value and to substantially equate the light output of said display screen when excited by a synthetic video signal having said low image signal sample as its image signal portion to a corresponding stored light output value.

6. A video image recording device as claimed in claim 5, further comprising manually operable control means for selecting at least one of said stored light output values.

7. A video image recording device as claimed in claim 6 in which said manually operable control means comprises two separate manually operable control means each of which varies one of said stored light output values.

8. A video image recording device as claimed in claim 6 in which said manually operable control means comprises a single manually operable control for adjusting the difference between said predetermined levels.

9. The method of compensating for recorded image drift in a video image recording device which includes video input signal receiving means and video image display means having a video image display screen and first and second video image parameter control means, comprising the steps of:
sampling said video input signal to determine the respective magnitudes of the image signal portion at two distinct amplitude levels thereof;
sequentially exciting said video image display device with first and second synthetic video signals having respective image portions, the substantially constant magnitudes of each of which are representative of said respective magnitudes;
measuring the respective light outputs of said video image display screen during the periods of excitation of said video image display means by said first and second synthetic video signals; and
repeatedly and systematically adjusting said first and second video image parameters to substantially equate said respective light outputs to corresponding stored light output values.

10. The method of compensating as claimed in claim 9 in which said two amplitude levels are said video signal peak image signal level voltage, and back porch image signal level voltage.

11. The method of compensating for recorded image drift as claimed in claim 9, further comprising the steps of altering said synthetic video signal amplitudes to emphasize particular data ranges in photographs made from said image display screen.

12. In a system for recording images generated by a video display monitor, said monitor including a video signal input receiving a video signal, and having separate brightness and contrast control inputs, apparatus for maintaining said image brightness within a range to produce a desired exposure of a photographic recording film emulsion comprising:
a user-programmable memory for receiving first and second index values corresponding to a maximum and minimum image intensity level for producing a known exposure of said photographic film;
means for sampling and holding first and second amplitude levels of said video signal corresponding to a first and second fraction of said video signal amplitude excursion;
means for measuring said video monitor image brightness;
processor means connected to said means for measuring, to said video monitor brightness and contrast control inputs, to said means for sampling, and to said memory, said processor being programmed to apply said sampled amplitude levels in succession to said video monitor input, and to compare the image brightness produced in response to said applied input voltages with a brightness level represented by said index values, and to generate a signal for said video monitor brightness and contrast inputs which reduces the difference between said measured brightness levels and said represented brightness level whereby said video signal amplitude excursion produces a desired exposure of said film emulsion.

13. An apparatus of claim 12 further comprising means for selecting the polarity of an image to be displayed on said monitor.

14. The apparatus of claim 13 further comprising an input multiplexer for selecting one of a plurality of video signals for display on said monitor.

15. The apparatus of claim 13 wherein said user-programmable memory includes indices for each displayed image polarity.

16. The apparatus of claim 15 wherein said memory is user-programmable.

17. In a system for exposing a photographic emulsion to a CRT display-generated image, said display having contrast and brightness inputs for controlling the exposure of said photographic film, an apparatus for controlling the exposure of said photographic emulsion comprising:
a memory for storing first and second indexes identifying first and second exposure limits for said photographic emulsion;
means for displaying numerical values representing said indexes;
sampling means for sampling a video signal supplying image information for generating said CRT image, said sampling means providing first and second amplitude levels representing predetermined percentages of said video signal;
photodetector means for providing a signal indicative of the brightness of said CRT display;
means for sequentially applying first and second synthetic signals of said first and second sampled levels to said CRT display input whereby first and second representative brightness levels are produced; and
servocontrol means coupled between said photodetector, memory means, and said display, said servocontrol means adjusting said display brightness and contrast until said photodetector light output indicates a brightness level for each synthetic signal which produces an exposure of said film emulsion identified by said first and second indexes.

18. The apparatus of claim 17 further comprising video signal multiplex means for selecting and applying one of a plurality of video signals to said CRT display.

19. The apparatus of claim 17 further comprising means for inverting the image polarity of said display-generated image.

20. The apparatus of claim 17 wherein one of said sampled levels corresponds to the amplitude level of said video signal back porch level.

* * * * *